United States Patent Office 3,126,386
Patented Mar. 24, 1964

3,126,386
LOWER ALKYL-18-O-ALIPHATIC DESERPIDATES AND INTERMEDIATES THEREFOR
Michael Mullen Robison, Berkeley Heights, and Robert Armistead Lucas, Mendham, N.J., assignors to Ciba Corporation, a corporation of Delaware
No Drawing. Filed Dec. 5, 1960, Ser. No. 73,494
15 Claims. (Cl. 260—286)

The present invention concerns 3-epi-allo-yohimbane compounds having the nucleus of the formula:

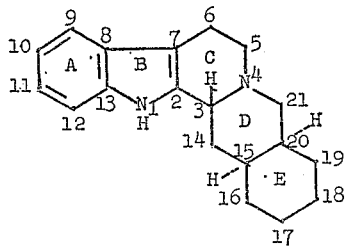

More particularly, it relates to 18-etherified hydroxy-3-epi-allo-yohimbane 16-carboxylic acid esters, salts, N-oxides or salts of N-oxides of such compounds. Apart from the groups in the 16-position and in the 18-position, the compounds of the present invention may contain additional substituents. For example, a cyano group, or more especially a lower alkoxy group may be attached to the 17-position having preferably the α-configuration. Other substituents, preferably attached to the positions of the aromatic nucleus, i.e., ring A, of the molecule, which are available for substitution, more specifically to the 9-position, the 10-position, the 11-position and/or the 12-position, are represented, for example, by aliphatic hydrocarbon, such as lower alkyl and the like, etherified hydroxyl, such as lower alkoxy, cycloalkyloxy, cycloalkyl-lower alkoxy, carbocyclic aryloxy, carbocyclic aryl-lower alkoxy, lower alkylene dioxy and the like, esterified hydroxyl, such as lower alkoxy-carbonyloxy, lower alkanoyloxy, halogeno and the like, etherified mercapto, such as lower alkylmercapto and the like, nitro, amino, such as N,N-di-substituted amino and the like, substituted aliphatic hydrocarbon, such as substituted lower alkyl, for example, halogeno-lower alkyl, particularly trifluoromethyl, or any other suitable substituent. Other substituents, particularly aliphatic hydrocarbon radicals, such as lower alkyl, may also be attached to positions of other nuclei, particularly of the heterocyclic nucleus C, more specifically to the 5-position and/or the 6-position.

More especially, the invention is directed to compounds of the formula:

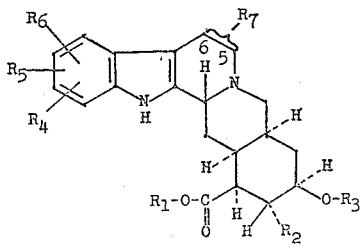

in which $R_1$ represents primarily lower alkyl, as well as substituted lower alkyl, such as, for example, monocyclic carbocyclic aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkyl-amino-lower alkyl and the like, $R_2$ stands primarily for lower alkoxy, as well as cyano, $R_3$ represents an aliphatic radical, e.g. lower alkyl, lower alkenyl, lower alkynyl, cycloalkyl, cycloalkenyl and the like, a substituted aliphatic radical, containing, for example, cycloalkyl, carbocyclic aryl, e.g. phenyl and the like, hydroxyl, etherified hydroxyl, e.g. lower alkoxy and the like, esterified hydroxyl, e.g. lower alkoxy-carbonyloxy, lower alkanoyloxy, carbocyclic aryl-carbonyloxy, carbocyclic aryl-lower aliphatic hydrocarbon-carbonyloxy, halogeno and the like, acyl, e.g. lower alkanoyl, carbo-lower alkoxy and the like, etherified mercapto, e.g. lower alkyl-mercapto and the like, tertiary amino, e.g. N,N-di-lower alkyl-amino and the like, a heterocyclic, particularly a monocyclic heterocyclic, radical or any other analogous group as substituents suitable for being attached to an aliphatic radical, or carbocyclic aryl, e.g. monocyclic carbocyclic aryl and the like, each of the radicals $R_4$, $R_5$ and $R_6$ stands for hydrogen, aliphatic hydrocarbon, particularly lower alkyl, substituted aliphatic hydrocarbon, particularly substituted lower alkyl, such as halogeno-lower alkyl, especially trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-di-substituted amino and the like, or, whenever two of the groups $R_4$, $R_5$ and $R_6$ are attached to two adjacent positions and taken together, for lower alkylene dioxy, and $R_7$, attached to one of the positions 5 and 6, stands for hydrogen or lower alkyl, salts, N-oxides or salts of N-oxides of such compounds, as well as process for the preparation of such compounds.

The invention is also directed to compounds of the formula:

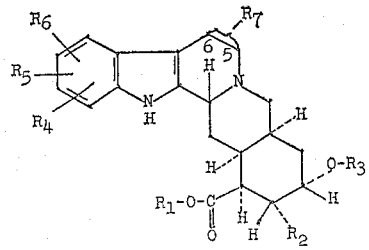

in which each of the groups $R_1$, $R_2$, $R_3$, $R_4$, $R_5$, $R_6$ and $R_7$ have the previously given meaning, salts, N-oxides or salts of N-oxides thereof, as well as process for the preparation of such compounds.

The radical of the alcohol portion of the ester grouping attached to the 16-position of the molecule, which in the above formulae, is represented by the group $R_1$, stands above all for lower alkyl containing from one to seven, preferably from one to four, carbon atoms; such groups are particularly methyl, ethyl, n-propyl, isoproyl, n-butyl, isobutyl, secondary butyl, tertiary butyl, as well as n-pentyl, isopentyl, n-hexyl, n-heptyl and the like.

The esterifying portion of the ester grouping attached to the 16-position of the molecule, represented, for example, by the radical $R_1$ in the above formulae, may also stand for substituted lower alkyl, such as, for example, monocyclic carbocyclic aryl-lower alkyl, in which lower alkyl contains from one to four carbon atoms, such as phenyl-lower alkyl, e.g. benzyl, 1-phenyl-ethyl, 2-phenyl-ethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted lower alkyl radicals, as represented, for example, by the group $R_1$ in the above formulae, are, for example, lower alkyl radicals substituted by functional groups, such as etherified hydroxy, particularly lower alkoxy containing preferably from one to four carbon atoms, e.g. methoxy, ethoxy, n-propyloxy, isopropyloxy, n-butyloxy and the like, tertiary amino, such as N,N-di-lower alkyl-amino, in which lower alkyl contains from one to four carbon atoms, e.g. N,N-dimethylamino, N-ethyl-N-methylamino, N,N-diethylamino, N,N-di-n-propylamino, N,N-di-isopropylamino and the like, as well as 1-N,N-lower alkylene-imino, in which lower alkylene contains from four to six ring carbon atoms, e.g. 1-pyrrolidino, 1-piperidino, 1-N,N-hexamethyleneimino and the like, 1-N,N-lower oxa-alkylene-imino, in which lower oxa-alkylene contains preferably four ring carbon atoms, e.g. 4-morpholino and the like, or 1-N,N-lower aza-alkylene-imino, in which lower aza-alkylene contains from four to six ring carbon atoms, particularly 4-lower alkyl-1-piperazino, e.g. 4-methyl-1-piperazino, 4-ethyl-1-piperazino and the like. The lower alkyl portion in a lower alkyl radical, substituted by functional groups, as represented, for example, by etherified hydroxy-lower alkyl, tertiary amino-lower alkyl and the like, may be represented by a lower alkylene radical, which contains from two to four carbon atoms, and separates the described substituent, such as etherified hydroxyl, tertiary amino and the like, from the carbon atom of the carboxy group by at least two carbon atoms. Preferably, such lower alkylene radical contains from two to three carbon atoms and separates the substituent, such as the etherified hydroxyl group and the like, from the carboxy group by the same number of carbon atoms. The alkylene radicals are primarily 1,2-ethylene, 1-methyl-1,2-ethylene, 2-methyl-1,2-ethylene, 1,3-propylene, 1,4-butylene and the like. Lower alkyl radicals containing a functional group, which radicals are represented by $R_1$ in the above formulae, may be, for example, 2-lower alkoxy-ethyl, e.g. 2-methoxyethyl, 2-ethoxyethyl and the like, 2-lower alkoxy-propyl, e.g. 2-methoxypropyl and the like, 3-lower alkoxy-propyl, e.g. 3-methoxypropyl, 3-ethoxypropyl and the like, 2-N,N-di-lower alkyl-ethyl, e.g. 2-N,N-dimethylaminoethyl, 2-N,N-diethylaminoethyl and the like, 2-N,N-di-lower alkyl-amino-propyl, e.g. 2-N,N-dimethyl-aminopropyl and the like, 3-N,N-di-lower alkyl-aminopropyl, e.g. 3-N,N-di-methyl-aminopropyl, 3-N,N-diethylaminopropyl and the like, 2-(1-N,N-lower alkylene-imino)-ethyl, e.g. 2-(1-pyrrolidino)-ethyl, 2-(1-piperidino)-ethyl and the like, 3-(1-N,N-lower alkyleneimino)-propyl, e.g. 3-(1-piperidino)-propyl and the like.

The substituent attached to the 17-position, as represented by the group $R_2$ in the above formulae, may stand for cyano. It primarily represents lower alkoxy which contains preferably from one to four carbon atoms, and stands for ethoxy, n-propyloxy, isopropyloxy, n-butyloxy, isobutyloxy and the like, but above all for methoxy.

The etherified hydroxyl group attached to the 18-position and represented, for example, by the grouping $R_3$—O in the previously given formulae, is preferably etherified by an aliphatic radical. The latter, represented in the above formula by the group $R_3$, stands, above all, for lower alkyl, containing from one to ten, preferably from one to seven, carbon atoms, such as, for example, methyl, ethyl, n-propyl, isopropyl, n-butyl, isobutyl, secondary butyl, tertiary butyl, n-pentyl, isopentyl, neopentyl, n-hexyl, isohexyl, n-heptyl and the like.

Other etherified 18-hydroxyl groups have as the etherifying portions, represented, for example, by the radical $R_3$ in the above-given formulae, other aliphatic radicals, such as, for example, lower alkenyl, particularly lower allylic alkenyl, containing preferably from three to five carbon atoms, e.g. allyl, 2-methyl-allyl, 2-butenyl, 3-methyl-2-butenyl, 2-pentenyl and the like, lower alkynyl, e.g. propargyl and the like, or cyclo-aliphatic radicals, such as cycloalkyl containing from three to eight, preferably from five to six, ring carbon atoms, e.g. cyclopentyl or cyclohexyl, as well as cyclopropyl, cycloheptyl, cyclo-octyl and the like, or cycloalkenyl, containing preferably from five to six ring carbon atoms, e.g. 3-cyclopentenyl, 2-cyclohexenyl and the like.

Aliphatic radicals etherifying the 18-hydroxyl group, as represented by $R_3$ in the above formulae, may contain substituents, such as, for example, cycloaliphatic radicals. Resulting substituted aliphatic radicals may be represented by cycloaliphatic-aliphatic radicals, for example, by cycloalkyl-lower alkyl, in which cycloalkyl contains from three to eight, especially from five to six, ring carbon atoms, and lower alkyl contains from one to four carbon atoms, e.g. cyclopentylmethyl, 1-cyclopentylethyl, 2-cyclopentylethyl, cyclohexylmethyl, 2-cyclohexylethyl and the like, cycloalkyl-lower alkenyl, in which cycloalkyl has the above-given meaning and lower alkenyl contains preferably from three to five carbon atoms, e.g. 3-cyclopentyl-allyl and the like.

Other substituted aliphatic radicals contain as substituents carbocyclic aryl groups and represent, for example, carbocyclic aryl aliphatic radicals, such as monocyclic carbocyclic aryl-lower alkyl, particularly phenyl-lower alkyl, e.g. benzyl, diphenylmethyl, 1-phenylethyl, 2-phenylethyl and the like, as well as carbocyclic-lower alkenyl, such as monocyclic carbocyclic aryl-lower alkenyl, particularly phenyl-lower alkenyl, e.g. 3-phenylallyl and the like, and analogous radicals, in which the carbocyclic aryl nucleus is substituted, by one or more than one of the same or different substituents, for example, by lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, halogeno-lower alkyl, e.g. trifluoromethyl and the like, nitro, amino, such as N,N-di-lower alkyl-amino, e.g. N,N-dimethylamino and the like, or any other suitable substituent.

Other substituted aliphatic radicals, particularly lower alkyl groups, represented in the above formulae by the group $R_3$, may be substituted by functional groups, such as hydroxyl or etherified hydroxyl. Aliphatic radicals containing such substituents are, for example, hydroxy-aliphatic radicals, such as hydroxy-lower alkyl, e.g. 2-hydroxy-ethyl, 2-hydroxy-propyl and the like, or etherified hydroxy-aliphatic radicals, such as lower alkoxy-lower alkyl, in which lower alkoxy contains from one to four carbon atoms, and stands, for example, for methoxy, ethoxy, n-propyloxy, isopropyloxy, n-butyloxy and the like, which lower alkoxy-lower alkyl groups may be represented by 2-lower alkoxy-ethyl, e.g. 2-methoxyethyl, 2-ethoxyethyl and the like, 2-lower alkoxy-propyl, e.g. 2-methoxy propyl, 2-ethoxypropyl and the like, 3-lower alkoxypropyl, e.g. 3-methoxypropyl, 3-ethoxypropyl and the like. Other etherified hydroxyl groups, which may substitute aliphatic, particularly lower alkyl, radicals are, for example, lower alkenyloxy, e.g. allyloxy and the like, cycloalkyloxy, e.g. cyclopentyloxy, cyclohexyloxy and the like, cycloalkenyloxy, e.g. 3-cyclohexenyl and the like, cycloalkyl-lower alkoxy, e.g. cyclopentylmethyloxy, 2-cyclohexylethyloxy and the like.

Additional substituted aliphatic, especially substituted lower alkyl, radicals contain as substituents, esterified hydroxyl groups, such as lower alkoxy-carbonyloxy, e.g. methoxy-carbonyloxy, ethoxy-carbonyloxy and the like, lower alkanoyloxy, e.g. acetoxy, propionyloxy and the like, carbocyclic aryl-carbonyloxy, particularly monocyclic carbocyclic aryl-carbonyloxy, e.g. benzoyloxy, and benzoyloxy in which the carbocyclic aryl portion is substituted in one or more than one position by substituents, such as, for example, lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, halogeno-lower alkyl, e.g. trifluoromethyl and the like, nitro, amino, such as N,N-di-lower alkyl-amino, e.g. N,N-dimethylamino and the like, or any other suitable substituents, carbocyclic aryl-lower aliphatic hydrocarbon-carbonyloxy, such as monocyclic carbocyclic aryl-lower alkanoyloxy or monocyclic carbocyclic aryl-lower alkenoyloxy, e.g. phenylacetoxy, 3-phenylpropionyloxy, cinnamoyloxy and the like and these radicals substituted in the carbocyclic nucleus by one or more than one of the same or of different substituents, such as those mentioned hereinbefore, or halogeno (representing a hydroxyl group esterified with a hydrohalic acid), e.g. fluoro and the like. Aliphatic, particularly lower alkyl, radicals containing esterified hydroxyl groups are, for example, 2-lower alkoxy-carbonyloxy-ethyl,
e.g. 2-methoxy-carbonyloxy-ethyl and the like,
2-lower alkanoyloxy-ethyl,
e.g. 2-acetylethyl,
2-propionyl-ethyl and the like,
2-monocyclic carbocyclic aryl-carbonyloxy-ethyl,
e.g. 2-benzoyloxy-ethyl,
2-(3,4,5-trimethoxy-benzoyl)-ethyl,
2-(4-ethoxycarbonyl-syringoyloxy)-ethyl and the like,
2-(monocyclic carbocyclic aryl-lower alkanoyloxy)-ethyl,
e.g. 2-[3-(3,4,5-trimethoxy-phenyl)-propionyloxy]-ethyl and the like,
2-(monocyclic carbocyclic aryl-lower alkenoyloxy)-ethyl,
e.g. 2-cinnamoyloxy-ethyl and the like,
halogeno-lower alkyl,
e.g. 2-trifluoroethyl and the like,
or the corresponding 2-esterified hydroxypropyl, 3-esterified hydroxy-propyl groups and the like.

Other aliphatic radicals etherifying the 18-hydroxyl group and represented, for example, by $R_3$ in the above formulae, are substituted, for example, by acyl, particularly lower alkanoyl, e.g. acetyl, propionyl and the like, or carbo-lower alkoxy, e.g. carbomethoxy, carboethoxy and the like, etherified mercapto, such as lower alkyl-mercapto, e.g. methylmercapto, ethylmercapto and the like, amino, particularly tertiary amino, such as N,N-di-lower alkyl-amino, e.g. N,N-dimethylamino, N-ethyl-N-methyl-amino, N,N-di-n-propyl-amino, N,N-di-isopropylamino, N,N-dibutylamino and the like, N,N-lower alkyleneimino, in which alkylene contains from four to six carbon atoms, e.g. 1-pyrrolidino, 1-piperidino, 1-N,N-hexamethyleneimino and the like, N,N-lower oxa-alkylene-imino, in which alkylene contains, primarily, four carbon atoms, e.g. 4-morpholino and the like, N,N-lower aza-alkylene-imino, in which alkylene contains from four to six ring carbon atoms, particularly 4-lower alkyl-1-piperazino, e.g. 4-methyl-1-piperazino, 4-ethyl-1-piperazino and the like, or any other functional group suitable for being attached to an aliphatic hydrocarbon radical. Such substituted aliphatic radicals are, therefore, primarily lower alkanoyl-lower alkyl, e.g. acetylmethyl, propionylmethyl and the like, carbo-lower alkoxy-lower alkyl, e.g. carbomethoxymethyl, carbethoxymethyl and the like, lower alkyl-mercapto-lower alkyl, e.g. methyl-mercapto-methyl, 2-ethylmercapto-ethyl and the like, tertiary amino-lower alkyl, such as 2-N,N-di-lower alkyl-amino-ethyl,
e.g. 2-N,N-dimethylaminoethyl,
2-N,N-diethylaminoethyl and the like,
2-N,N-di-lower alkyl-amino propyl,
e.g. 2-N,N-dimethylaminopropyl,
2-N,N-diethylaminopropyl and the like,
3-N,N-di-lower alkyl-amino-propyl,
e.g. 3-N,N-dimethylaminopropyl,
3-N,N-diethylaminopropyl and the like,
2-N,N-lower alkylene-imino-ethyl,
e.g. 2-(1-pyrrolidino)-ethyl,
2-(1-piperidino)-ethyl and the like,
3-N,N-lower alkylene-imino-propyl,
e.g. 3-(1-pyrrolidino)-propyl,
3-(1-piperidino)-propyl and the like,
2-(4-lower alkyl-1-piperazino)-ethyl,
e.g. 2-(4-methyl-1-piperazino)-ethyl,
2-(4-ethyl-1-piperazino)-ethyl and the like,
3-(4-lower alkyl-1-piperazino)-propyl,
e.g. 3-(4-methyl-1-piperazino)-propyl,
3-(4-ethyl-1-piperazino)-propyl and the like,
as well as other analogous aliphatic radicals substituted by functional groups.

Aliphatic radicals may also contain heterocyclic groups as substituents. Such groups are, for example, monocyclic heterocyclic aryl groups, such as pyridyl, e.g. 2-pyridyl, 4-pyridyl and the like, thienyl, e.g. 2-thienyl and the like, monocyclic heterocyclic aliphatic groups, such as tetrahydrofuranyl, e.g. 2-tetrahydrofuranyl and the like. These substituted aliphatic radicals may be represented, for example, by pyridyl-lower alkyl, e.g. 2-pyridylmethyl and the like, tetrahydrofuranyl-lower alkyl, e.g. 2-tetrahydrofuranylmethyl and the like.

Etherifying groups in an 18-etherified hydroxyl group, such as in a group of the formula $R_3$—O— in the above formulae, may also be represented by carbocyclic aryl groups, particularly monocyclic carbocyclic aryl, such as phenyl and phenyl substituted by one or more than one of the same of different substituents, such as lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, halogeno-lower alkyl, e.g. trifluoromethyl and the like, nitro, amino, such as N,N-di-lower alkyl-amino, e.g. N,N-dimethylamino and the like or any other suitable substituents. These carbocyclic aryl radicals etherifying the 18-hydroxyl group may be represented, for example, by phenyl, 3-methyl-phenyl, 4-methoxy-phenyl, 3,4,5-trimethoxy-phenyl, 3,4-dichloro-phenyl, 4-bromo-phenyl, O-ethoxycarbonyl-syringoyl, 3-N,N-dimethylamino-phenyl and the like.

Substituents attached to any of the positions available for substitution in ring A, particularly those represented by the groups $R_4$, $R_5$ and $R_6$ (each of which may also stand for hydrogen) in the previously given formulae, may be, for example, lower aliphatic hydrocarbon, especially lower-alkyl, containing preferably from one to four carbon atoms, e.g. methyl, ethyl, n-propyl, isopropyl, n-butyl and the like, or functional groups, such as, for example, etherified hydroxyl, particularly lower alkoxy, containing preferably from one to four carbon atoms, e.g. methoxy, ethoxy, n-propyloxy, isopropyloxy, n-butyloxy, isobutyloxy and the like, as well as cycloalkyloxy, in which cycloalkyl contains from three to eight, preferably from five to six, ring carbon atoms, e.g. cyclopentyloxy, cyclohexyloxy and the like, cycloalkyl-lower alkoxy, in which cycloalkyl contains from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenyl-methoxy, 2-phenylethoxy and the like, esterified hydroxyl, particularly lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, containing preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, halogeno, e.g. fluoro, chloro, bromo, iodo and the like, halogeno-lower alkyl, particularly trifluoromethyl and the like, or any other suitable functional group. A substituent may also be attached to two adjacent positions of ring A and form a fused-on ring; for example, two of the radicals $R_4$, $R_5$ and $R_6$ in the formulae, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C, which are available for substitution, are primarily aliphatic hydrocarbon, such as lower alkyl, containing preferably from one to four carbon atoms, particularly methyl, as well as ethyl, n-propyl, isopropyl and the like. The radical $R_7$ in the previously given formulae, which stands primarily for hydrogen, may, therefore, also represent lower alkyl, particularly methyl, as well as ethyl and the like.

Salts of the compounds of this invention are primarily therapeutically acceptable acid addition salts, particularly those with inorganic acids, such as mineral acids, e.g. hydrochloride, hydrobromic, sulfuric, phosphoric acids and the like, as well as with organic acids, e.g. acetic, tartaric, methane sulfonic acid and the like.

Also included within the scope of the present invention are the N-oxides of the above-mentioned compounds, as well as the therapeutically acceptable acid addition salts of these N-oxides, such as the addition salts with the above-mentioned inorganic, particularly mineral, and organic acids.

In view of the fact that several asymmetric carbon atoms are present in the compounds of this invention, the latter may be obtained in the form of a mixture of racemates, racemates or optically pure compounds.

The compounds of the present invention have sedative and tranquilizing effects on the central nervous system; some of them also show antihypertensive properties. Compared with the antihypertensive and sedative effects of naturally occurring Rauwolfia alkaloids, such as, for example, reserpine, deserpidine, rescinnamine and the like, the compounds of this invention generally appear to have more predominant sedative effects accompanied by negligible antihypertensive activities.

Furthermore, it has also been found that, contrary to the naturally occurring compounds, which show a slow onset of pharmacological action and an often uncontrollably long-lasting effect, the compounds of this invention act quickly and the activity is of definite duration, thus making the recovery after treatment more complete and easily controllable. It has also been found that the therapeutically acceptable salts, particularly those with mineral acids, e.g. hydrochloric acid and the like, of these compounds are to a high degree water-soluble, and are, therefore, extremely useful in the preparation of pharmaceutical compositions, particularly of aqueous solutions for injection and aqueous oral preparations, e.g. elixirs and the like.

The compounds of the present invention can, therefore, be used primarily as sedative and tranquilizing agents to relieve states of hyperactivity, tension and agitation, as, for example, associated with mental disturbances, anxiety and the like. Certain of the above-described compounds may also be used as antihypertensive compounds to counteract hypertensive conditions, such as, for example, renal hypertension, toxemia and the like.

Furthermore, the compounds of this invention are suitable in calming laboratory test animals, such as monkeys, cats and the like, as well as in the veterinary field to quiet animals, particularly chickens, turkeys and the like, as well as other domestic animals to facilitate handling during vaccination, shipment and the like.

In addition the compounds of this invention have shown strong antifibrillatory effects, which are particularly pronounced in compounds containing an 18α-etherified hydroxyl group, i.e. compounds of the 18-epi-series. These compounds are, therefore, suitable in the treatment of cardiac irregularities, including extrasystoles, auricular fibrillation and the like.

A preferred group of compounds having the above-given properties is represented by the formula:

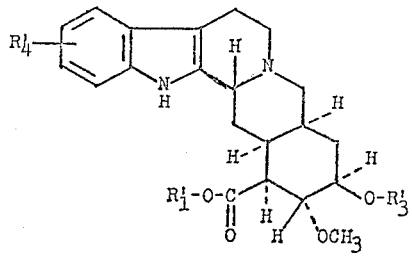

in which each of the groups $R_1'$ and $R_3'$ represents lower alkyl, containing preferably from one to seven carbon atoms, e.g. methyl, ethyl, n-propyl, isopropyl, n-butyl, isobutyl, n-pentyl, n-hexyl and the like, and $R_4'$ represents lower alkoxy containing from one to four carbon atoms, particularly methoxy, as well as ethoxy, n-propyloxy, isopropyloxy, n-butyloxy and the like, whereby $R_4'$ is preferably attached to the 10-position or the 11-position, therapeutically acceptable acid addition salts, N-oxides or therapeutically acceptable acid addition salts of N-oxides thereof.

These compounds are represented by the lower alkyl 18-O-lower alkyl-reserpates, in which lower alkyl contains from one to four carbon atoms, and is represented by methyl, ethyl, n-propyl, isopropyl, n-butyl, isobutyl and the like, therapeutically acceptable acid addition salts, N-oxides or therapeutically acceptable acid addition salts of N-oxides thereof. These compounds have pronounced sedative and tranquilizing effects of fast onset and easily controllable duration, accompanied by negligible antihypertensive properties and may be represented by methyl 18-O-methyl-reserpate,
methyl 18-O-ethyl-reserpate,
methyl 18-O-n-propyl-reserpate,
methyl 18-O-isopropyl-reserpate,
methyl 18-O-n-butyl reserpate,
methyl 18-O-n-pentyl-reserpate,
ethyl 18-O-methyl-reserpate,
ethyl 18-O-ethyl-reserpate,
ethyl 18-O-n-propyl-reserpate,
ethyl 18-O-n-butyl-reserpate,
n-propyl 18-O-methyl-reserpate,
n-propyl 18-O-ethyl-reserpate,
isopropyl 18-O-methyl-reserpate,
isopropyl 18-O-n-propyl-reserpate,
n-butyl 18-O-methyl-reserpate,
n-butyl 18-O-ethyl-reserpate,
isobutyl 18-O-methyl-reserpate,
n-pentyl 18-O-methyl-reserpate,
n-hexyl 18-O-methyl-reserpate and the like, or therapeutically acceptable acid addition salts of these compounds, such as the hydrochlorides and the like.

Other compounds having the aforementioned formula are, for example, lower alkyl 18-O-lower alkyl-9-methoxy-deserpidates, e.g. methyl 9-methoxy-18-O-methyl-deserpidate, methyl 18-O-ethyl-9-methoxy-deserpidate, methyl 9-methoxy-18-O-n-propyl-deserpidate, ethyl 9-methoxy-18-O-methyl-deserpidate and the like, lower alkyl 18-O-lower alkyl-10-methoxy-deserpidates, e.g. methyl 10-methoxy-18-O-methyl-deserpidate, methyl 18-O-ethyl-10-methoxy-deserpidate, methyl 10-methoxy-18-O-n-propyl-deserpidate, ethyl 10-methoxy-18-O-methyl-deserpidate, n-propyl 10-methoxy-18-O-methyl-deserpidate, isopropyl 10-methoxy-18-O-methyl-deserpidate and the like, lower alkyl 11-ethoxy-18-O-lower alkyl-deserpidates, e.g. methyl 11-ethoxy-18-O-methyl-deserpidate, methyl 11-ethoxy-18-O-ethyl-deserpidate and the like, lower alkyl 18-O-lower alkyl-11-n-propyloxy-deserpidates, e.g. methyl 18-O-methyl-11-n-propyloxy-deserpidate, methyl 18-O-ethyl-11-n-propyloxy-deserpidate and the like, lower alkyl 11-isopropyloxy-18-O-lower alkyl-deserpidates, e.g. methyl 11-isopropyloxy-18-O-methyl-deserpidate, ethyl 11-isopropyloxy-18-O-methyl-deserpidate and the like, lower alkyl 11-n-butyloxy-18-O-lower alkyl-deserpidates, e.g. methyl 11-n-butyloxy-18-O-methyl-deserpidate, methyl 11-n-butyloxy-18-O-ethyl-deserpidate and the like, lower alkyl 18-O-lower alkyl-12-methoxy-deserpidates, e.g. methyl 12-methoxy-18-O-methyl-deserpidate, ethyl 12-methoxy-18-O-methyl-deserpidate and the like, or therapeutically acceptable acid addition salts thereof.

An additional preferred group of compounds are the lower alkyl 18-O-lower alkyl-deserpidates, in which lower alkyl contains preferably from one to seven carbon atoms, and is represented by methyl, ethyl, n-propyl, isopropyl, n-butyl, isobutyl and the like, therapeutically acceptable acid addition salts, N-oxides or therapeutically acceptable acid addition salts of N-oxides thereof. Specific members of this group are, for example, methyl 18-O-methyl-deserpidate, methyl 18-O-ethyl-deserpidate, methyl 18-O-n-propyl-deserpidate, methyl 18-O-isopropyl-deserpidate, methyl 18-O-n-butyl-deserpidate, methyl 18-O-secondary butyl-deserpidate, ethyl 18-O-methyl-deserpidate, ethyl 18-O-ethyl-deserpidate, ethyl 18-O-n-propyl-deserpidate, n-propyl 18-O-methyl-deserpidate, n-propyl 18-O-ethyl-deserpidate, isopropyl 18-O-methyl-deserpidate, isopropyl 18-O-n-butyl-deserpidate, n-butyl 18-O-methyl-deserpidate, secondary butyl 18-O-methyl-deserpidate, n-pentyl 18-O-methyl-deserpidate and the like, or therapeutically acceptable acid addition salts thereof.

Other compounds having the useful pharmacological properties previously mentioned, are, for example, lower alkyl 18-O-lower alkyl-5-methyl-reserpates, e.g. methyl 5-methyl-18-O-methyl-reserpate, methyl 18-O-ethyl-5-methyl-reserpate, ethyl 5-methyl-18-O-methyl-reserpate and the like, lower alkyl 18-O-lower alkyl-6-methyl-reserpates, e.g. methyl 6-methyl-18-O-methyl-reserpate, methyl 18-O-n-butyl-6-methyl-reserpate, ethyl 6-methyl-18-O-methyl-reserpate and the like, lower alkyl 18-O-lower alklyl-6-methyl-deserpidates, e.g. methyl 6-methyl-18-O-methyl-deserpidate, methyl 6-methyl-18-O-n-propyl-deserpidate, ethyl 6-methyl-18-O-methyl-deserpidate and the like, lower alkyl 18-O-lower alkyl-9-methyl-deserpidates, e.g. methyl 9-methyl-18-O-methyl-deserpidate, methyl 9-methyl-18-O-ethyl-deserpidate, n-propyl 9-methyl-18-O-methyl-deserpidate and the like, lower alkyl 18-O-lower alkyl-11-methyl-deserpidates, e.g. methyl 11-methyl-18-O-methyl-deserpidate, ethyl 11-methyl-18-O-methyl-deserpidate, ethyl 11-methyl-18-O-n-butyl-deserpidate and the like, lower alkyl 18-O-lower alkyl-10-methoxy-reserpates, e.g. methyl 10-methoxy-18-O-methyl-reserpate, methyl 18-O-ethyl-10-methoxy-reserpate, ethyl 10-methoxy-18-O-n-propyl-reserpate and the like, lower alkyl 9,10-dimethoxy-18-O-lower alkyl-reserpates, e.g. methyl 9,10-dimethoxy-18-O-methyl-reserpate, methyl 9,10-dimethoxy-18-O-ethyl-reserpate, ethyl 9,10-dimethoxy-18-O-methyl-reserpate, and the like, lower alkyl 18-O-lower alkyl-10,11-methylenedioxy-deserpidates, e.g. methyl 18-O-methyl-10,11-methylenedioxy-deserpidate, ethyl 18-O-methyl-10,11-methylenedioxy-deserpidate and the like, lower alkyl 10-benzyloxy-18-O-lower alkyl-deserpidates, e.g. methyl 10-benzyloxy-18-O-methyl-deserpidate, methyl 10-benzyloxy-18-O-ethyl-deserpidate, ethyl 10-benzyloxy-18-O-methyl-deserpidate and the like, lower alkyl 11-benzyloxy-18-O-lower alkyl-deserpidates, e.g. methyl 11-benzyloxy-18-O-methyl-deserpidate, methyl 11-benzyloxy-18-O-ethyl-deserpidate, ethyl 11-benzyloxy-18-O-methyl-deserpidate and the like, lower alkyl 18-O-lower alkyl-11-methylmercapto-deserpidates, e.g. methyl 18-O-methyl-11-methylmercapto-deserpidate, methyl 18-O-ethyl-11-methylmercapto-deserpidate, ethyl 18-O-methyl-11-methylmercapto-deserpidate and the like, lower alkyl 11-ethyl-mercapto-18-O-lower-alkyl-deserpidates, e.g. methyl 11-ethylmercapto-18-O-methyl-deserpidate, ethyl 18-O-ethyl-11-ethyl-mercapto-deserpidate, n-propyl 11-ethylmercapto-18-O-methyl-deserpidate and the like, lower alkyl 11-fluoro-18-O-lower alkyl-deserpidates, e.g. methyl 11-fluoro-18-O-methyl-deserpidate, methyl 11-fluoro-18-O-ethyl-deserpidate, ethyl 11-fluoro-18-O-methyl-deserpidate and the like, lower alkyl 10-chloro-18-O-lower alkyl-deserpidates, e.g. methyl 10-chloro-18-O-methyl-deserpidate, methyl 10-chloro-18-O-ethyl-deserpidate, ethyl 10-chloro-18-O-n-butyl-deserpidate and the like, lower alkyl 10-bromo-18-O-lower alkyl-reserpates, e.g. methyl 10-bromo-18-O-methyl-reserpate, methyl 10-bromo-18-O-ethyl-reserpate, ethyl 10-bromo-18-O-ethyl-reserpate and the like, lower alkyl -17α-desmethoxy-17α-ethoxy-18-O-lower alkyl-reserpates, e.g. methyl 17α-desmethoxy-17α-ethoxy-18-O-methyl-reserpate, methyl 17α-desmethoxy-17α-ethoxy-18-O-ethyl-reserpate and the like, lower alkyl 17α-desmethoxy-18-O-lower alkyl-17α-n-propyloxy reserpates, e.g. methyl 17α-desmethoxy-18-O-methyl-17α-n-propyloxy-reserpate, ethyl 17α-desmethoxy-18-O-methyl-17α-n-propyloxy-reserpate and the like, lower alkyl 17α-desmethoxy-17α-isopropyloxy-18-O-lower alkyl-reserpates, e.g. methyl 17α-desmethoxy-17α-isopropyloxy-18-O-methyl-reserpate, methyl 17α-desmethoxy-18-O-ethyl-17α-isopropyloxy-reserpate and the like, lower alkyl 17α-desmethoxy-17α-ethoxy-18-O-lower alkyl-deserpidates, e.g. methyl 17α-desmethoxy-17α-ethoxy-18-O-methyl-deserpidate, methyl 17α-desmethoxy-17α-ethoxy-18-O-ethyl-deserpidate, ethyl 17α-desmethoxy-17α-ethoxy-18-O-ethyl-deserpidate and the like, lower alkyl 17α-cyano-17α-desmethoxy-18-O-lower alkyl-reserpates, e.g. methyl 17α-cyano-17α-desmethoxy-18-O-methyl-reserpate, methyl 17α-cyano-17α-desmethoxy-18-O-ethyl-reserpate and the like, lower alkyl 17α-cyano-17α-desmethoxy-18-O-lower alkyl-deserpidates, e.g. methyl 17α-cyano-17α-desmethoxy-18-O-methyl-deserpidates and the like, or analogous compounds, and the therapeutically acceptable acid addition salts thereof.

Also mentioned as preferred groups of compounds within the scope of the invention are, for example, lower alkoxy-lower alkyl 18-O-lower alkyl-reserpates and lower alkoxy-lower alkyl 18-O-lower alkyl-deserpidates, or the therapeutically acceptable acid addition salts thereof. Lower alkyl of the lower alkoxy-lower alkyl portion represents a lower alkylene radical containing from two to three carbon atoms, which separates the lower alkoxy group from the carbon atom of the carboxyl group by the same number of carbon atoms, and lower alkoxy has from one to four carbon atoms, and the lower alkyl group attached to the oxygen atom of the 18-position contains preferably from one to four carbon atoms. The lower alkoxy-lower alkyl portion stands, for example, for 2-methoxyethyl, 2-ethoxyethyl, 2-methoxypropyl, 3-methoxypropyl and the like, and lower alkyl may stand for methyl, ethyl, n-propyl, isopropyl, n-butyl, isobutyl and the like. Specific compounds of this group are, for example, 2-methoxyethyl 18-O-methyl-reserpate, 2-methoxyethyl 18-O-ethyl-reserpate, 2-ethoxyethyl 18-O-methyl-reserpate, 2-ethoxyethyl 18-O-n-propyl-reserpate, 2-methoxypropyl 18-O-methyl-reserpate, 3-methoxypropyl 18-O-methyl-reserpate, 2-methoxyethyl 18-O-methyl-deserpidate, 2-methoxyethyl 18-O-ethyl-deserpidate, 2-ethoxyethyl 18-O-methyl-deserpidate and the like, or therapeutically acceptable acid addition salts thereof.

An additional group of preferred compounds is represented by the N,N-di-lower alkyl-amino-lower alkyl 18-O-lower alkyl-reserpates and N,N-di-lower alkyl-amino-lower alkyl 18-O-lower alkyl-deserpidates, and the therapeutically acceptable acid addition salts thereof. N,N-di-lower alkyl-amino may stand for N,N-dimethylamino, N-ethyl-N-methylamino, N,N-diethylamino and the like, and lower alkyl, to which N,N-di-lower alkyl-amino is attached, stands for a lower alkylene radical containing from two to three carbon atoms, which separates N,N-di-lower alkyl-amino from the carbon atom of the carboxyl group by from two to three carbon atoms. The N,N-di-lower alkyl amino-portion stands, for example, for 2-N, N-dimethylaminoethyl, 2-N,N-diethylaminoethyl, 2-N,N-dimethylaminopropyl, 3-N,N-dimethylaminopropyl and the like. Specific compounds of this group are, for example, 2-N,N-dimethylaminoethyl 18-O-methyl-reserpate, 2-N,N-dimethylaminoethyl 18-O-ethyl-reserpate, 2-N,N-diethylaminoethyl 18-O-methyl-reserpate, 3-N,N-dimethylaminopropyl 18-O-methyl-reserpate, 2-N,N-dimethylaminoethyl 18-O-methyl-deserpidate, 2-N,N-dimethylaminoethyl 18-O-ethyl-deserpidate, 2-N,N-dimethylaminopropyl 18-O-methyl-deserpidate and the like, or therapeutically acceptable acid addition salts thereof.

Another group of preferred compounds having the above-given properties is represented by the formula:

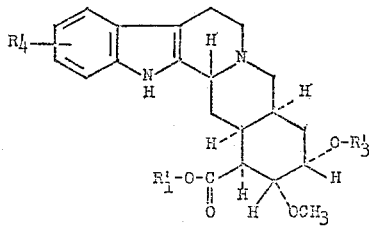

in which each of the groups $R_1'$ and $R_3'$ represents lower alkyl, containing preferably from one to seven carbon atoms, e.g. methyl, ethyl, n-propyl, isopropyl, n-butyl, isobutyl, secondary butyl, n-pentyl, isopentyl, n-hexyl, n-heptyl and the like, and $R_4'$ represents lower alkoxy containing from one to four carbon atoms, particularly methoxy, as well as ethoxy, n-propyloxy, isopropyloxy, n-butyloxy and the like, whereby $R_4'$ is preferably attached to the 10-position or the 11-position, therapeutically acceptable acid addition salts, N-oxides or therapeutically acceptable acid addition salts of such N-oxides thereof.

These compounds are represented by the lower alkyl 18-epi-O-lower alkyl-reserpates, in which lower alkyl contains from one to four carbon atoms, and represents methyl, ethyl, n-propyl, isopropyl, n-butyl, isobutyl and the like, therapeutically acceptable acid addition salts, N-oxides or therapeutically acceptable acid addition salts of such N-oxides thereof. These compounds having pronounced sedative and tranquilizing effect with a fast onset and an easily controllable duration of action, accompanied by negligible antihypertensive properties, as well as strong anti-fibrillatory activities, may be represented, for example, by methyl 18-epi-O-methyl-reserpate, methly 18-epi-O-ethyl-reserpate, methyl 18-epi-O-n-propyl-reserpate, methyl 18-epi-O-isopropyl-reserpate, methyl 18-epi-O-n-butyl-reserpate, methyl 18-epi-O-isobutyl-reserpate, methyl 18-epi-O-n-pentyl-reserpate, ethyl 18-epi-O-n-hexyl-reserpate, ethyl 18-epi-O-methyl-reserpate, ethyl 18-epi-O-ethyl-reserpate, ethyl 18-epi-O-n-propyl-reserpate, ethyl 18-epi-O-n-butyl-reserpate, n-propyl 18-epi-O-methyl-reserpate, n-propyl 18-epi-O-ethyl-reserpate, isopropyl 18-epi-O-methyl reserpate, isopropyl 18-epi-O-n-propyl-reserpate, n-butyl 18-epi-O-methyl-reserpate, n-butyl 18-epi-O-ethyl-reserpate, isobutyl 18-epi-O-methyl-reserpate, n-pentyl 18-epi-O-methyl-reserpate, n-hexyl 18-epi-O-methyl-reserpate and the like, or therapeutically acceptable acid addition salts, such as the hydrochlorides and the like, of these compounds.

Other compounds of the aforementioned formula are, for example, lower alkyl 18-epi-O-lower alkyl-9-methoxy-deserpidates, e.g. methyl 9-methoxy-18-epi-O-methyl-deserpidate, methyl 18-epi-O-ethyl-9-methoxy-deserpidate, methyl 9-methoxy-18-epi-O-n-propyl-deserpidate, ethyl 9-methoxy-18-epi-O-methyl-deserpidate and the like, lower alkyl 18-epi-O-lower alkyl-10-methoxy-deserpidates, e.g. methyl 10-methoxy-18-epi-O-methyl-deserpidate, methyl 18-epi-O-ethyl-10-methoxy-deserpidate, methyl 10-methoxy-18-epi-O-n-propyl-deserpidate, ethyl 10-methoxy-18-epi-O-methyl-deserpidate, n-propyl 10-methoxy-18-epi-O-methyl-deserpidate, isopropyl 10-methoxy-18-epi-O-methyl-deserpidate and the like, lower alkyl 11-ethoxy-18-epi-O-lower alkyl-deserpidates, e.g. methyl 11-ethoxy-18-epi-O-methyl-deserpidate, methyl 11-ethoxy-18-epi-O-ethyl-deserpidate and the like, lower alkyl 18-epi-O-lower alkyl-11-n-propyloxy-deserpidates, e.g. methyl 18-epi-O-methyl-11-n-propyloxy-deserpidate, methyl 18-epi-O-ethyl-11-n-propyloxy-deserpidate and the like, lower alkyl 11-isopropyloxy-18-epi-O-lower alkyl-deserpidates, e.g. methyl 11-isopropyloxy-18-epi-O-methyl-deserpidate, ethyl 11-isopropyloxy-18-epi-O-methyl-deserpidate and the like, lower alkyl 11-n-butyloxy-18-epi-O-lower alkyl-deserpidates, e.g. methyl 11-n-butyloxy-18-epi-O-methyl-deserpidate, methyl 11-n-butyloxy-18-epi-O-ethyl-deserpidate and the like, lower alkyl 18-epi-O-lower alkyl-12-methoxy-deserpidates, e.g. methyl 12-methoxy-18-epi-O-methyl-deserpidate, ethyl 12-methoxy-18-epi-O-methyl-deserpidate and the like, or therapeutically acceptable acid addition salts thereof.

An additional preferred group of compounds are the lower alkyl 18-epi-O-lower alkyl-deserpidates, in which lower alkyl contains preferably from one to seven carbon atoms, and is represented by methyl, ethyl, n-propyl, isopropyl, n-butyl, isobutyl and the like, therapeutically acceptable acid addition salts, N-oxides and therapeutically acceptable acid addition salts of N-oxides thereof. Specific members of this group are, for example, methyl 18-epi-O-methyl-deserpidate, methyl 18-epi-O-ethyl-deserpidate, methyl 18-epi-O-n-propyl-deserpidate, methyl 18-epi-O-isopropyl-deserpidate, methyl 18-epi-O-n-butyl-deserpidate, methyl 18-epi-O-secondary butyl-deserpidate, ethyl 18-epi-O-methyl-deserpidate, ethyl 18-epi-O-ethyl-deserpidate, ethyl 18-epi-O-n-propyl-deserpidate, n-propyl 18-epi-O-methyl-deserpidate, n-propyl 18-epi-O-ethyl-deserpidate, isopropyl 18-epi-O-methyl-deserpidate, isopropyl 18-epi-O-n-butyl-deserpidate, n-butyl 18-epi-O-methyl-deserpidate, secondary butyl 18-epi-O-methyl-deserpidate, n-pentyl 18-epi-O-methyl-deserpidate and the like, or therapeutically acceptable acid addition salts thereof.

Other compounds having the useful pharmacological properties previously mentioned, are, for example, lower alkyl 18-epi-O-lower alkyl-5-methyl-reserpates,
e.g. methyl 5-methyl-18-epi-O-methyl-reserpate,
methyl 18-epi-O-ethyl-5-methyl-reserpate,
ethyl 5-methyl-18-epi-O-methyl-reserpate and the like,
lower alkyl 18-epi-O-lower alkyl-6-methyl-reserpates,
e.g. methyl 6-methyl-18-epi-O-methyl-reserpate,
methyl 18-epi-O-n-butyl-6-methyl-reserpate,
ethyl 6-methyl-18-epi-O-methyl-reserpate and the like,
lower alkyl 18-epi-O-lower alkyl-6-methyl-deserpidates,
e.g. methyl 6-methyl-18-epi-O-methyl-deserpidate,
methyl 6-methyl-18-epi-O-n-propyl-deserpidate,
ethyl 6-methyl-18-epi-O-methyl-deserpidate and the like,
lower alkyl 18-epi-O-lower alkyl-9-methyl-deserpidates,
e.g. methyl 9-methyl-18-epi-O-methyl-deserpidate,
methyl 9-methyl-18-epi-O-ethyl-deserpidate,
n-propyl 9-methyl-18-epi-O-methyl-deserpidate and the like,
lower alkyl 18-epi-O-lower alkyl-11-methyl-deserpidates,
e.g. methyl 11-methyl-18-epi-O-methyl-deserpidate,
ethyl 11-methyl-18-epi-O-methyl-deserpidate,
ethyl 11-methyl-18-epi-O-n-butyl-deserpidate and the like,
lower alkyl 18-epi-O-lower alkyl-10-methoxy-reserpates,
e.g. methyl 10-methoxy-18-epi-O-methyl-reserpate,
methyl 18-epi-O-ethyl-10-methoxy-reserpate,
ethyl 10-methoxy-18-epi-O-n-propyl-reserpate and the like,
lower alkyl 9,10-dimethoxy-18-epi-O-lower alkyl-reserpates,
e.g.methyl 9,10-dimethoxy-18-epi-O-methyl-reserpate,
methyl 9,10-dimethoxy-18-epi-O-ethyl-reserpate,
ethyl 9,10-dimethoxy-18-epi-O-methyl-reserpate and the like,
lower alkyl 18-epi-O-lower alkyl-10,11-methylenedioxy-deserpidates,
e.g. methyl 18-epi-O-methyl-10,11-methylenedioxy-deserpidate, ethyl 18-epi-O-methyl-10,11-methylenedioxy-deserpidate and the like,
lower alkyl 10-benzyloxy-18-epi-O-lower alkyl-deserpidates,
e.g. methyl 10-benzyloxy-18-epi-O-methyl-deserpidate,
methyl 10-benzyloxy-18-epi-O-ethyl-deserpidate,
ethyl 10-benzyloxy-18-epi-O-methyl-deserpidate and the like,
lower alkyl 11-benzyloxy-18-epi-O-lower alkyl-deserpidates,
e.g. methyl 11-benzyloxy-18-epi-O-methyl-deserpidate,
methyl 11-benzyloxy-18-epi-O-ethyl-deserpidate,
ethyl 11-benzyloxy-18-epi-O-methyl-deserpidate and the like,
lower alkyl 18-epi-O-lower alkyl-11-methylmercapto-deserpidates,
e.g. methyl 18-epi-O-methyl-11-methylmercapto-deserpidate,
methyl 18-epi-O-ethyl-11-methylmercapto-deserpidate,
ethyl 18-epi-O-methyl-11-methylmercapto-deserpidate and the like,
lower alkyl 11-ethylmercapto-18-epi-O-lower alkyldeserpidates,
e.g. methyl 11-ethylmercapto-18-epi-O-methyl-deserpidate,
ethyl 18-epi-O-ethyl-11-ethylmercapto-deserpidate,
n-propyl 11-ethylmercapto-18-epi-O-methyl-deserpidate and the like,
lower alkyl 11-fluoro-18-epi-O-lower alkyl-deserpidates,
e.g. methyl 11-fluoro-18-epi-O-methyl-deserpidate,
methyl 11-fluoro-18-epi-O-ethyl-deserpidate,
ethyl 11-fluoro-18-epi-O-methyl-deserpidate and the like,
lower alkyl 10-chloro-18-epi-O-lower alkyl deserpidates,
e.g. methyl 10-chloro-18-epi-O-methyl-deserpidate,
methyl 10-chloro-18-epi-O-ethyl-deserpidate,
ethyl 10-chloro-18-epi-O-n-butyl-deserpidate and the like,
lower alkyl 10-bromo-18-epi-O-lower alkyl-reserpates,
e.g. methyl 10-bromo-18-epi-O-methyl-reserpate,
methyl 10-bromo-18-epi-O-ethyl-reserpate,
ethyl 10-bromo-18-epi-O-ethyl-reserpate and the like,
lower alkyl 17α-desmethoxy-17α-ethoxy-18-epi-O-lower alkyl-reserpates,
e.g. methyl 17α-desmethoxy-17α-ethoxy-18-epi-O-methyl-reserpate,
methyl 17α-desmethoxy-17α-ethoxy-18-epi-O-ethyl-reserpate and the like,
lower alkyl 17α-desmethoxy-18-epi-O-lower alkyl-17α-n-propyloxy-reserpates,
e.g. methyl 17α-desmethoxy-18-epi-O-methyl-17α-n-propyloxy-reserpate,
ethyl 17α-desmethoxy-18-epi-O-methyl-17α-n-propyloxy-reserpate and the like,
lower alkyl 17α-desmethoxy-17α-isopropyloxy-18-epi-O-lower alkyl-reserpates,
e.g. methyl 17α-desmethoxy-17α-isopropyloxy-18-epi-O-methyl-reserpate,
methyl 17α-desmethoxy-18-epi-O-ethyl-17α-isopropyloxy-reserpate and the like,
lower alkyl 17α-desmethoxy-17α-ethoxy-18-epi-O-lower alkyl-deserpidates,
e.g. methyl 17α-desmethoxy-17α-ethoxy-18-epi-O-methyl-deserpidate,
methyl 17α-desmethoxy-17α-ethoxy-18-epi-O-ethyl-deserpidate,
ethyl 17α-desmethoxy-17α-ethoxy-18-epi-O-ethyl-deserpidate and the like,
lower alkyl 17α-cyano-17α-desmethoxy-18-epi-O-lower alkyl-reserpates,
e.g. methyl 17α-cyano-17α-desmethoxy-18-epi-O-methyl-reserpate,
methyl 17α-cyano-17α-desmethoxy-18-epi-O-ethyl-reserpate and the like,
lower alkyl 17α-cyano-17α-desmethoxy-18-epi-O-lower alkyl-deserpidates,
e.g. 17α-cyano-17α-desmethoxy-18-epi-O-methyl-deserpidate,
methyl 17α-cyano-17α-desmethoxy-18-epi-O-ethyl deserpidate and the like,
or analogous compounds, and therapeutically acceptable acid addition salts thereof.

Also mentioned as preferred compounds within the scope of the invention are, for example, lower alkoxy-lower alkyl 18-epi-O-lower alkyl-reserpates and lower alkoxy-lower alkyl 18-epi-O-lower alkyl-deserpidates, or therapeutically acceptable acid addition salts thereof. Lower alkyl in the lower alkoxy-lower alkyl portion represents lower alkylene containing from two to three carbon atoms, which separates the lower alkoxy group from the carbon atom of the carboxyl group by the same number of carbon atoms, and lower alkoxy has from one to four carbon atoms, and the lower alkyl group attached to the oxygen atom of the 18-position contains preferably from one to four carbon atoms. The lower alkoxy-lower alkyl portion represents, for example, 2-methoxyethyl, 2-ethoxyethyl, 2-methoxypropyl, 3-methoxypropyl and the like, and lower alkyl may stand for methyl, ethyl, n-propyl, isopropyl, n-butyl, isobutyl and the like. Specific compounds of this group are, for example, 2-methoxyethyl 18-epi-O-methyl-reserpate,
2-methoxyethyl 18-epi-O-ethyl-reserpate,
2-ethoxyethyl 18-epi-O-methyl-reserpate,
2-ethoxyethyl 18-epi-n-propyl-reserpate,
2-methoxypropyl 18-epi-O-methyl-reserpate,
3-methoxypropyl 18-epi-O-methyl-reserpate,
2-methoxyethyl 18-epi-O-methyl-deserpidate,
2-methoxyethyl 18-epi-O-ethyl-deserpidate,
2-ethoxyethyl 18-epi-O-methyl-deserpidate and the like, or therapeutically acceptable acid addition salts thereof.

An additional group of compounds is represented by the N,N-di-lower alkyl-amino-lower alkyl 18-epi-O-lower alkyl-reserpates and N,N - di - lower alkyl-amino-lower alkyl 18-epi-O-lower alkyl-deserpidates, and therapeutically acceptable acid addition salts thereof. N,N-di-lower alkyl-amino represents, for example, N,N-dimethylamino, N-ethyl-N-methylamino, N,N-diethylamino and the like, and lower alkyl, to which N,N-di-lower alkyl-amino is attached, represents lower alkylene containing from two to three carbon atoms, which separates N,N-di-lower alkyl-amino from the carbon atom of the carboxyl group by from two to three carbon atoms. The N,N-di-lower alkyl amino-lower alkyl portion represents, for example, 2-N,N-dimethylaminoethyl, 2-N,N-diethylaminoethyl, 2-N,N-dimethylaminopropyl, 3-N,N-dimethylaminopropyl and the like. Specific compounds of this group are, for example,
2-N,N-dimethylaminoethyl 18-epi-O-methyl-reserpate,
2-N,N-dimethylaminoethyl 18-epi-O-ethyl-reserpate,
2-N,N-diethylaminoethyl 18-epi-O-methyl-reserpate,
3-N,N-dimethylaminopropyl 18-epi-O-methyl-reserpate,
2-N,N-dimethylaminoethyl 18-epi-O-methyl-deserpidate,
2-N,N-dimethylaminoethyl 18-epi-O-ethyl-deserpidate,
2-N,N-dimethylaminopropyl 18-epi-O-methyl-deserpidate and the like or therapeutically acceptable acid addition salts thereof.

The compounds of this invention may be used as medicaments in the form of pharmaceutical preparations, which contain the new compounds or derivatives thereof, such as therapeutically acceptable acid addition salts, N-oxides or therapeutically acceptable acid addition salts of N-oxides thereof, in admixture with a pharmaceutical organic or inorganic, solid or liquid carrier suitable for enteral or parenteral administration. For making up the preparations there can be employed inert substances, which are compatible with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known inert carrier used in medicaments. The pharmaceutical preparation may be in solid form, for example, as tablets, capsules, dragees and the like, or in liquid form, for example, as solutions, suspension, emulsions and the like. If desired, they may contain additional substances, such as preserving, stabilizing, wetting, emulsifying agents and the like, salts for varying the osmotic pressure, buffers or any other auxiliary substances. They may also contain, in combination, other therapeutically useful substances.

Compounds of this invention can be formed by etherifying in an 18-hydroxy-3-epi-allo-yohimbane 16-carboxylic acid ester, particularly in a compound having one of the following formulae:

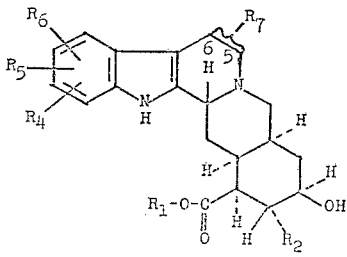

or

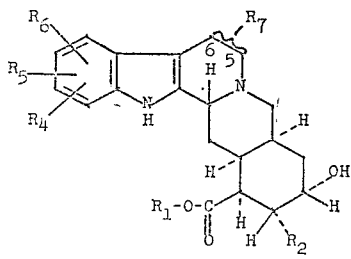

in which $R_1$, $R_2$, $R_4$, $R_5$, $R_6$ and $R_7$ have the previously given meaning, a salt, an N-oxide or a salt of an N-oxide thereof, the free hydroxyl group attached to the 18-position by treatment with a diazo-compound in the presence of a strong inorganic Lewis acid, and, if desired, converting a resulting salt into the free base, and/or, if desired, converting a resulting compound into a salt, an N-oxide or a salt of an N-oxide thereof, and/or, if desired, converting a resulting mixture of isomers into the single isomers.

A salt of the starting material or of an N-oxide thereof, is an addition salt with an acid, primarily a salt with an inorganic, such as a mineral, acid, e.g. hydrochloric, hydrobromic, sulfuric, phosphoric acid and the like. An acid addition salt may also be a salt with the strong inorganic Lewis acid catalyzing the etherification reaction, e.g. fluoboric acid and the like; such salt may be formed during the reaction.

The starting material, a salt, an N-oxide or a salt of an N-oxide thereof is reacted with a diazo compound of the formula $R_3$—$N_2$, in which $R_3$ has the previously given meaning, particularly with an aliphatic diazo-hydrocarbon, for example, a lower diazo-alkane, e.g. diazomethane, diazoethane, n-diazopropane, diazoisopropane, n-diazobutane, diazoisobutane, n-diazopentane and the like, as well as with a substituted aliphatic diazo-hydrocarbon, such as an etherified hydroxy-lower diazo-alkane, particularly a lower alkoxy-lower diazo-alkane, a tertiary amino-lower diazo-alkane, particularly an N,N-di-lower alkylamino-lower diazo-alkane and the like, or any other suitable diazo reagent, in the presence of a strong inorganic Lewis acid. Fluoboric acid, which may be employed in the form of a concentrated aqueous solution (for example, as an about 12 N to an about 16 N aqueous solution), represents the preferred reagent. Other Lewis acid reagents may be, for example, perchloric acid (preferably in anhydrous form) and the like. Due to the salt-forming properties of free starting material, the Lewis acid, catalyzing the etherification of the 18-hydroxyl group, is used in excess of one mol, whenever the free base is present; an about one to an about two hundred, preferably an about ten to an about fifty, percent excess appears to be sufficient to promote the etherification reaction.

The reaction is carried out in the presence of an organic solvent, which is inert towards the starting material, the diazo reagent and the Lewis acid. Appropriate diluents are, for example, halogenated lower aliphatic hydrocarbons, e.g. methylene chloride, chloroform, ethylene chloride, trichloroethane, tetrachloroethane and the like, ethers, e.g. diethyl ether, tetrahydrofuran and the like, lower alkyl lower alkanoates, e.g. methyl acetate, ethyl acetate and the like, acetonitrile or any other useful solvent, as well as mixtures of solvents, such as those mentioned hereinabove. A solution of the diazo reagent in an inert solvent, such as an ether, e.g. diethyl ether and the like, or a halogenated hydrocarbon, e.g. methylene chloride and the like, or a mixture of solvents, may be added to the mixture of the starting material and the Lewis acid, preferably kept in solution. The diazo compound may also be distilled out of a solution into the solution of the mixture of the starting material and the Lewis acid. Furthermore, the latter mixture may also be given to a solution of the diazo reagent.

The reaction may be carried out at room temperature; however, cooling of the reaction mixture to below room temperature, for example, to from about 10° to about —20°, especially to from about 0° to about —15°, may be advantageous. If necessary, the reaction may be carried out in the atmosphere of an inert gas, e.g. nitrogen and the like.

An excess of the diazo reagent present at the end of the reaction may be destroyed, for example, by adding an acid, preferably an easily esterifiable organic carboxylic acid, e.g. acetic, benzoic acid and the like.

The desired product may be isolated and separated from any by-products according to standard procedures, e.g. extraction, adsorption and elution, crystallization, etc. and purified, for example, by recrystallization, if necessary, after treatment of a solution thereof with an adsorbent, e.g. aluminum oxide, charcoal, diatomaceous earth and the like.

The above-described procedure may be illustrated by the treatment of a lower alkyl reserpate or a lower alkyl 18-epi-reserpate with a lower diazo-alkane in the presence of a strong Lewis acid, such as fluoboric acid and the like, to form the desired lower alkyl 18-O-lower alkyl-reserpate and lower alkyl 18-epi-O-lower alkyl-reserpate, respectively, which, if desired, may be converted into an acid addition salt, particularly a mineral acid, e.g. hydrochloric acid and the like, addition salt thereof. For example, upon treatment of methyl reserpate or methyl 18-epi-reserpate with diazomethane, diazoethane and the like, in the presence of fluoboric acid the methyl 18-O-methyl-reserpate, methyl 18-O-ethyl-reserpate and the like, and methyl 18-epi-O-methyl-reserpate, methyl 18-epi-O-ethyl-reserpate, and the like, respectively, may be prepared.

The starting materials used in the above procedure may be obtained, for example, by reacting an 18-organic sulfonyloxy-3-epi-allo-yohimbane 16-carboxylic acid ester, particularly a compound having one of the formulae:

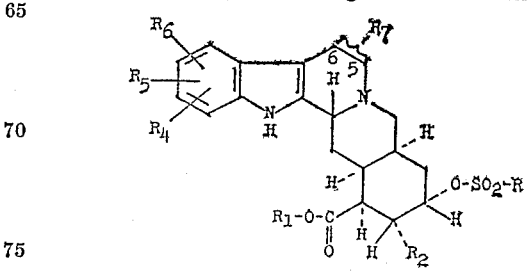

or

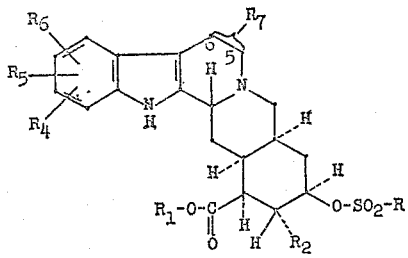

in which $R_1$, $R_2$, $R_4$, $R_5$, $R_6$ and $R_7$ have the previously given meaning, and R represents an organic radical, particularly monocyclic carbocyclic aryl, such as phenyl, or primarily substituted phenyl, a salt, an N-oxide or a salt of an N-oxide thereof, with water to form the desired 18-hydroxy-3-epi-allo-yohimbane 16-carboxylic acid ester, such as the compound of the previously given formula, and, if desired, converting a resulting compound into a salt, an N-oxide or a salt of an N-oxide thereof.

Substituted phenyl groups representing R contain preferably electron-withdrawing substituents, particularly halogeno, such as bromo, as well as chloro, iodo and the like; nitro or any other suitable electron-withdrawing group, as well as methyl and the like, may also serve as substituents. These substituents may be attached to the 2-position, or more especially to the 3- or the 4-position, as well as in two or more than two of these positions simultaneously. R in the above formulae stands, therefore, primarily for halogeno-phenyl, particularly bromo-phenyl and the like, nitro-phenyl, as well as phenyl and the like. It may also stand for another organic radical, such as an aliphatic radical, for example, lower alkyl, e.g. methyl, ethyl and the like.

Hydrolysis of the organic sulfonyloxy group in the resulting 18-organic sulfonyloxy-3-epi-allo-yohimbane 16-carboxylic acid ester, may be carried out by treatment with water, preferably in the presence of an amine, especially a tertiary amine, such as, for example, an N,N,N-tri-lower alkyl-amine, e.g. N,N,N-trimethylamine, N-ethyl-N,N-dimethylamine, N,N,N-triethylamine and the like, as well as an N,N,N',N'-tetra-lower alkylalkylenediamine, e.g. N,N,N',N'-tetramethyl-1,6-hexylenediamine and the like, a 1-lower alkyl-N,N-alkylene-imine, e.g. 1-methyl-pyrrolidine, 1-methyl-piperidine, 1-ethyl-piperidine and the like, a 4-lower alkyl-morpholine, e.g. 4-methyl-morpholine, 4-ethyl-morpholine and the like, monocyclic azacyclic aryl compounds, such as pyridine, collidine and the like, or any other suitable reagent. Preferably, hydrolysis is achieved by heating the mixture to an elevated temperature, if necessary, under pressure or in the atmosphere of an inert gas, e.g. nitrogen. The hydrolysis reaction proceeds with inversion, i.e. an 18α-organic sulfonyloxy-3-epi-allo-yohimbane 16-carboxylic acid ester yields upon hydrolysis according to the above procedure an 18β-hydroxy-3-epi-allo-yohimbane 16-carboxylic acid ester, or an 18β-organic sulfonyloxy-3-epi-allo-yohimbane 16-carboxylic acid ester yields an 18α-hydroxy-3-epi-allo-yohimbane 16-carboxylic acid ester, respectively.

The above 18-organic sulfonyloxy-3-epi-allo-yohimbane 16-carboxylic acid esters are known or may be prepared according to known methods, for example, by esterification of the 18-hydroxy-3-epi-allo-yohimbane 16-carboxylic acid esters with an organic sulfonyl halide, particularly a monocyclic aryl sulfonyl halide, such as benzene sulfonyl chloride, or particularly benzene sulfonyl chloride, in which the benzene ring is substituted with an electron-withdrawing substituent, such as halogeno, such as bromo, or chloro, iodo and the like, nitro, or any other suitable substituent, such as methyl and the like, in the presence of a base, particularly an organic tertiary base, e.g. pyridine, collidine and the like. In the esterification step, the base, such as, for example, pyridine and the like may also serve as the diluent; other suitable, inert solvents may be added, if necessary. The reaction is carried out under cooling or at room temperature, preferably under the exclusion of moisture.

In view of the fact that during the hydrolysis of 18-organic sulfonyloxy-3-epi-allo-yohimbane 16-carboxylic acid esters according to the above procedure epimerization occurs at the carbon atom representing the 18-position, the 18-hydroxy-3-epi-allo-yohimbane 16-carboxylic acid ester used as the starting material for the preparation of the corresponding 18-carbocyclic aryl-sulfonyloxy compounds and the 18-hydroxy-3-epi-allo-yohimbane 16-carboxylic acid esters obtained from the hydrolysis of the latter, have different configurations for the 18-hydroxyl group. For example, upon esterification of methyl reserpate to the methyl 18-O-(4-bromo-phenyl-sulfonyl)-reserpate and hydrolysis of the latter with water, preferably in the presence of N,N,N-triethylamine and the like, the methyl 18-epi-reserpate is formed. The procedure is particularly suited for the manufacture of 18α-hydroxy-3-epi-allo-yohimbane 16-carboxylic acid esters, which can thus be derived from 18β-hydroxy-3-epi-allo-yohimbane 16-carboxylic acid esters having the configuration present in naturally occurring starting materials or in compounds prepared according to known totally synthetic procedures.

The starting materials may also be prepared, for example, by alcoholysis of an 18-esterified hydroxy-3-epi-allo-yohimbane 16-carboxylic acid ester, particularly of a compound having one of the formulae:

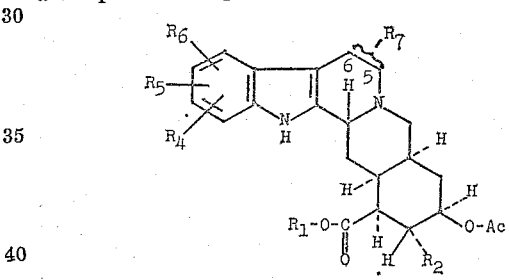

or

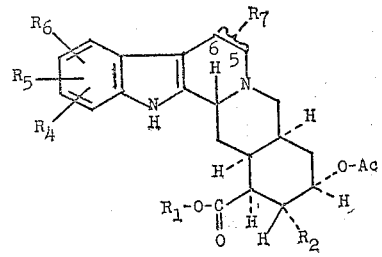

in which $R_1$, $R_2$, $R_4$, $R_5$, $R_6$ and $R_7$ have the previously given meaning, and Ac stands for the acyl radical of an organic carboxylic acid, a salt, an N-oxide or a salt of an N-oxide thereof. Alcoholysis is carried out by treatment with an alcohol, such as an alcohol of the formula $R_1$—OH, in which $R_1$ has the previously given meaning, in the presence of an alcoholysis reagent, such as an alkali metal, e.g. sodium, potassium and the like, compound of the alcohol used in the alcoholysis or any other suitable alcoholysis catalyst; the reaction is preferably completed at an elevated temperature.

The alcoholysis reaction is particularly suited for the preparation of 18-hydroxy-3-epi-allo-yohimbane 16-carboxylic acid esters, which can be derived from naturally occuring esters of the above type, especially lower alkyl reserpates, e.g. methyl reserpate, ethyl reserpate, n-propyl reserpate and the like, as well as lower alkyl deserpidates, e.g. methyl deserpidate and the like.

18β-hydroxyl-3-epi-allo-yohimbane 16-carboxylic acid esters may also be prepared, for example, by subjecting a (16→18)-lactone of an 18β-hydroxy-3-epi-allo-yohimbane 16β-carboxylic acid, such as a compound of the formula:

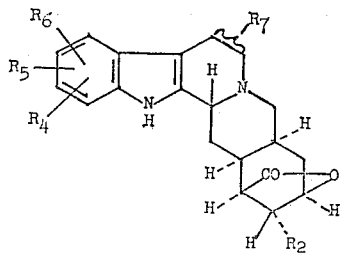

in which $R_2$, $R_4$, $R_5$, $R_6$ and $R_7$ have the previously given meaning, a salt, an N-oxide or a salt of an N-oxide thereof, to alcoholysis with a lower alkanol or a substituted lower alkanol, such as an etherified hydroxy-lower alkanol, a tertiary amino-lower alkanol and the like, particularly an alcohol of the formula $R_1$—OH, in which $R_1$ has the above-given meaning, in the presence of an alcoholysis catalyst. The alcoholysis reaction may be carried out, for example, by treating the lactone compound used as the starting material with a lower alkanol, or a substituted lower alkanol, such as a carbocyclic aryl-lower alkanol, an etherified hydroxy-lower alkanol, a tertiary amino-lower alkanol and the like, in the presence, for example, of an alkali metal, e.g. sodium, potassium and the like, compound of the alcohol used in the alcoholysis, or any other suitable alcoholysis catalyst, e.g. potassium cyanide, benzyl trimethyl ammonium hydroxide and the like. Although this reaction may proceed under cooling or at room temperature, the mixture is advantageously heated, if necessary, in the atmosphere of an inert gas, e.g. nitrogen.

The above alcoholysis reaction is particularly suited for the preparation of starting materials, which are easily accessible through known totally synthetic procedures.

The 18-etherified hydroxy-3-epi-allo-yohimbane 16-carboxylic acid esters, salts, N-oxides or salts of N-oxides thereof, may also be prepared, for example, by reacting an 18-organic sulfonyloxy-3-epi-allo-yohimbane 16-carboxylic acid ester, particularly a compound of one of the formulae:

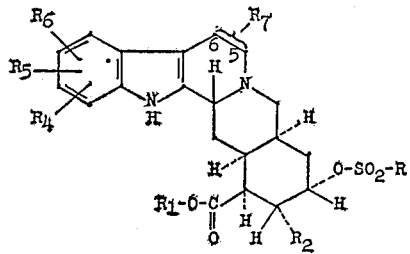

and

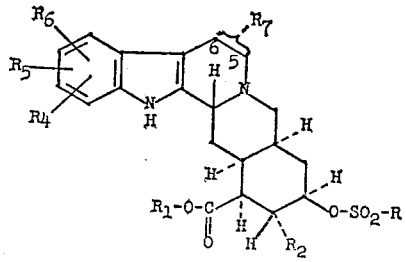

in which $R_1$, $R_2$, $R_4$, $R_5$, $R_6$ and $R_7$ have the previously given meaning, and R stands for an organic radical, a salt, an N-oxide or a salt of an N-oxide thereof, with a hydroxylated compound, particularly a compound of the formula $R_3$—OH, in which $R_3$ has the previously given meaning, and, if desired, carrying out the optional steps.

The group R in the above formula has the previously given meaning and is preferably a monocyclic carbocyclic aryl group, which may be represented by phenyl, or, more particularly, by substituted phenyl. The latter is prefer-ably a phenyl radical substituted in the 2-position, 3-position and/or the 4-position by an electron-withdrawing substituent, particularly halogeno, primarily bromo, as well as fluoro, chloro or iodo, nitro, as well as carbo-lower alkoxy, e.g. carbomethoxy, carbethoxy and the like, carbamyl, cyano or any other suitable groups. Lower alkyl, especially methyl and the like, may also be a suitable substituent. The group R may, therefore, be represented by phenyl, or primarily by halogeno-phenyl, e.g. 4-bromo-phenyl and the like, nitro-phenyl, e.g. 3-nitro-phenyl, 4-nitro-phenyl and the like, cyano-phenyl, e.g. 4-cyano-phenyl, as well as di-substituted or tri-substituted phenyl radicals containing such groups. R may also stand for other organic radicals, such as an aliphatic radical, for example, lower alkyl, e.g. methyl, ethyl and the like.

Alcoholysis, particularly with a compound of the formula $R_3$—OH, such as with a lower alkanol, e.g. methanol, ethanol, n-propanol, isopropanol, n-butanol and the like, a lower alkenol, e.g. 2-propenol and the like or any other suitable hydroxylated compound may be carried out in the absence, but more preferably in the presence of an alcoholysis reagent. Such reagent is represented by an amine, such as a tertiary amine, especially an aliphatic tertiary amine, such as an N,N,N-tri-lower alkyl-amine, e.g. N,N,N-trimethylamine, N-ethyl-N,N-dimethylamine, N,N,-diethyl-N-methylamine, N,N,N,-triethylamine and the like, an N,N,N',N'-tetra-lower alkyl-lower alkylene-diamine, e.g. N,N,N',N'-tetramethyl-1,5-pentylene-diamine, N,N,N',N'-tetramethyl-1,6-hexylene-diamine, N,N,N',N' - tetraethyl-1,6-hexylenediamine, N,N,N',N'-tetramethyl-1,7-heptylene-diamine and the like, a 1-lower alkyl-N,N-alkylene-imine, in which alkylene contains from four to six carbon atoms, e.g. 1-methyl-pyrrolidine, 1-methyl-piperidine, 1-ethyl-piperidine, 1-methyl-N,N-hexamethylene-imine and the like, 4-lower alkyl-morpholine, e.g. 4-methyl-morpholine, 4-ethyl-morpholine and the like, 1,4-di-lower alkyl-piperazine, e.g. 1,4-dimethyl-piperazine and the like, or any other suitable aliphatic tertiary amine, as well as heterocyclic compounds containing a tertiary nitrogen atom, e.g. pyridine, collidine and the like, or any other suitable organic amine.

The alcoholysis may be carried out using the hydroxylated compound, particularly the compound of the formula $R_3$—OH, for example, a lower alkanol, as the diluent; any other inert solvent, such as, for example, p-dioxane and the like, may be added to ensure complete solution. The reaction is preferably completed at an elevated temperature, if necessary under an increased pressure, or in the atmosphere of an inert gas, such as nitrogen.

The above procedure may be illustrated by the reaction of a lower alkyl 18-O-(halogeno-phenyl)-sulfonyl-reserpate, such as methyl 18-O-(4-bromo-phenyl)-sulfonyl-reserpate and the like, or of a lower alkyl 18-O-(nitro-phenyl)-sulfonyl-reserpate, e.g. methyl 18-O-(4-nitro-phenyl)sulfonyl-reserpate, methyl 18-O-(3-nitro-phenyl)-sufonyl-reserpate and the like, with a lower alkanol, e.g. methanol, ethanol, n-propanol, isopropanol and the like, preferably in the presence of a tertiary amine, e.g. N,N,N-triethylamine, pyridine and the like, to form the desired lower alkyl 18-epi-O-lower alkyl-reserpate, e.g. methyl 18-epi-O-methyl-reserpate, methyl 18-epi-O-ethyl-reserpate, methyl 18-epi-O-n-propyl-reserpate, methyl 18-epi-O-iso-propyl-reserpate and the like. Or, upon treatment of a lower alkyl 18-epi-O-(halogeno-phenyl)-sulfonyl-reserpate, e.g. methyl 18-epi-O-(4-bromo-phenyl)-reserpate and the like, or of a lower alkyl 18-epi-O-(nitro-phenyl)-sulfonyl-reserpate, e.g. methyl 18-epi-O-(4-nitro-phenyl)-sulfonyl-reserpate, methyl 18-epi-O-(3-nitro-phenyl)-sulfonyl-reserpate and the like, with a lower alkanol, e.g. methanol, ethanol, n-propanol, isopropanol and the like, preferably in the presence of a tertiary amine, e.g. N,N,N-triethylamine, pyridine and the like, the lower alkyl 18-O-lower alkyl-reserpates, e.g. methyl 18-O-methyl-reserpate, methyl 18-O-ethyl-reserpate, methyl 18-O-n-propyl-reserpate, methyl 18-O-isopropyl-reserpate and the like, can be prepared.

The 18-organic sulfonyloxy-3-epi-allo-yohimbane 16-carboxylic acid esters, salts, N-oxides or salts of N-oxides may be prepared as previously shown, for example, by esterification of an 18-hydroxy-3-epi-allo-yohimbane 16-carboxylic acid ester.

New and particularly suitable as intermediates are the 18β-(halogeno-phenyl)-sulfonyloxy-3-epi-allo-yohimbane 16-carboxylic acid esters and the 18β-(nitro-phenyl)-sulfonyloxy-3-epi-allo-yohimbane 16-carboxylic acid esters, particularly the compounds of the formula:

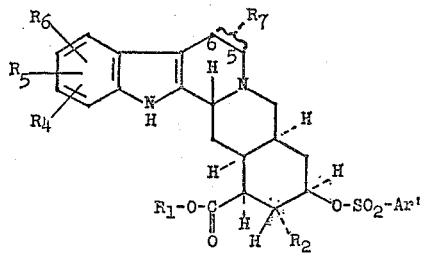

in which $R_1$, $R_2$, $R_4$, $R_5$, $R_6$ and $R_7$ have the previously given meaning, and $Ar'$ represents halogeno-phenyl or nitro-phenyl, salts, N-oxides and salts of N-oxides thereof, which compounds are intended to be included within the scope of this application. These compounds are preferred intermediates used in the conversion of compounds with the 18β-configuration into those having the 18α-configuration, i.e. the conversion of compounds derived from natural sources or from known totally synthetic procedures into compounds of the 18-epi-series, either according to the above-described alcoholysis or the previously shown hydrolysis to the desired 18α-hydroxy-3-epi-allo-yohimbane 16-carboxylic acid esters used as intermediates in the etherification procedure.

Especially important intermediates are the compounds of the formula:

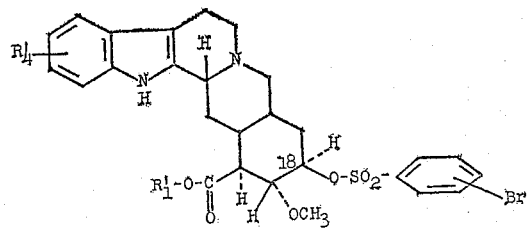

in which $R_1'$ represents lower alkyl, and $R_4'$ stands for lower alkoxy, which substituents have been defined more extensively hereinbefore, and in which bromo is preferably located in the 4-position of the phenyl portion of the 18β-(halogeno-phenyl)-sulfonyloxy group, and acid addition salts of such compounds. Members of this group are the lower alkyl 18-O-(bromo-phenyl)-sulfonyl-reserpates, e.g. methyl 18-O-(4-bromo-phenyl)-sulfonyl-reserpate, ethyl 18-O-(4-bromo-phenyl)-sulfonyl-reserpate, n-propyl 18-O-(4-bromo-phenyl)-sulfonyl-reserpate and the like, lower alkyl 18-O-(bromo-phenyl)-sulfonyl-10-methoxy-deserpidate, e.g. methyl 18-O-(4-bromo-phenyl)-sulfonyl-10-methoxy-deserpidate, ethyl 18-O-(4-bromo-phenyl)-sulfonyl-10-methoxy-deserpidate and the like, or any other analogous compound having the above formula.

Other important intermediates are, for example, lower alkyl 18-O-(bromo-phenyl)-sulfonyl-deserpidates, e.g. methyl 18-O-(4-bromo-phenyl)-sulfonyl-deserpidate, ethyl 18-O-(4-bromo-phenyl)-sulfonyl-deserpidate and the like, as well as other lower alkyl 18-O-(bromo-phenyl)-sulfonyl-deserpidate compounds useful as intermediates for the preparation of the previously mentioned lower alkyl 18-epi-deserpidate compounds.

Another group of important intermediates used for the conversion of compounds with the 18β-configuration into derivatives of the 18α-series are those of the formula:

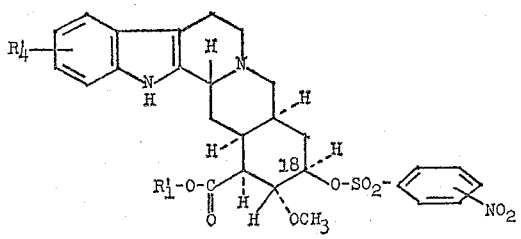

in which $R_1'$ stands for lower alkyl, and $R_4'$ represents lower alkoxy, which substituents have been described more closely hereinbefore, and in which the nitro group is preferably located in the 3- or 4-position of the phenyl portion of the 18β-(nitro-phenyl)-sulfonyloxy substituent, and acid addition salts of such compounds. Members of this group of compounds are the lower alkyl 18-O-(nitro-phenyl)-sulfonyl-reserpates, e.g. methyl 18-O-(4-nitro-phenyl)-sulfonyl-reserpate, methyl 18-O-(3-nitro-phenyl)-sulfonyl-reserpate, ethyl 18-O-(4-nitro-phenyl)-sulfonyl-reserpate, ethyl 18-O-(3-nitro-phenyl)-sulfonyl-reserpate, n-propyl 18-O-(4-nitro-phenyl)-sulfonyl-reserpate, n-propyl 18-O-(3-nitro-phenyl)-sulfonyl-reserpate, isopropyl 18-O-(4-nitro-phenyl)-sulfonyl-reserpate, isopropyl 18-O-(3-nitro-phenyl)-sulfonyl-reserpate and the like, lower alkyl 10-methoxy-18-O-(nitro-phenyl)-deserpidate, e.g. methyl 10-methoxy-18-O-(4-nitro-phenyl)-sulfonyl-deserpidate, methyl 10-methoxy-18-O-(3-nitro-phenyl)-sulfonyl-deserpidate, ethyl 10-methoxy-18-O-(4-nitro-phenyl)-sulfonyl-deserpidate, ethyl 10-methoxy-18-O-(3-nitro-phenyl)-sulfonyl-deserpidate, n-propyl 10-methoxy-18-O-(4-nitro-phenyl)-sulfonyl-deserpidate, n-propyl 10-methoxy-18-O-(3-nitro-phenyl)-sulfonyl-deserpidate, isopropyl 10-methoxy-18-O-(4-nitro-phenyl)-sulfonyl-deserpidate, isopropyl 10-methoxy-18-O-(3-nitro-phenyl)-sulfonyl-deserpidate and the like, or any other compound having the above formula.

Other important intermediates are, for example, lower alkyl 18-O-(nitro-phenyl)-sulfonyl-deserpidates, e.g. methyl 18-O-(3-nitro-phenyl)-sulfonyl-deserpidate, methyl 18-O-(4-nitro-phenyl)-sulfonyl-deserpidate, ethyl 18-O-(3-nitro-phenyl)-sulfonyl-deserpidate, ethyl 18-O-(4-nitro-phenyl)-sulfonyl-deserpidate, n-propyl 18-O-(3-nitro-phenyl)-sulfonyl-deserpidate, n-propyl 18-O-(4-nitro-phenyl)-sulfonyl-deserpidate, isopropyl 18-O-(3-nitro-phenyl)-sulfonyl-deserpidate, isopropyl 18-O-(4-nitro-phenyl)-sulfonyl-deserpidate, and the like, as well as other lower alkyl 18-O-(nitro-phenyl)-sulfonyl-deserpidate compounds useful as intermediates for the preparation of the previously mentioned lower alkyl 18-epi-deserpidate compounds.

The compounds of the present invention may also be prepared by removing in a Δ³-18-etherified hydroxy-allo-yohimbene 16β-carboxylic acid ester or a salt of such compound, particularly in a compound having one of the formulae:

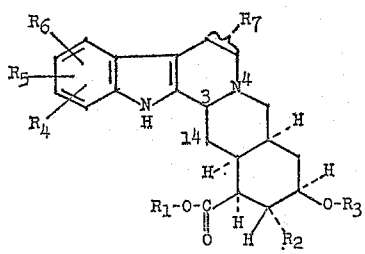

or

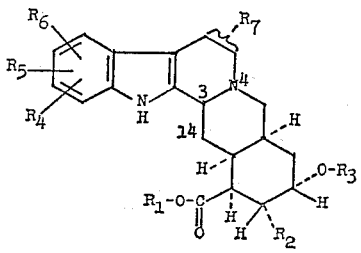

in which $R_1$, $R_2$, $R_3$, $R_4$, $R_5$, $R_6$ and $R_7$ have the previously given meaning, and in which a double bond extends from the 3-position, or salts thereof, the double bond extending from the 3-position by reduction and, if desired, carrying out the optional steps.

In the above starting materials the double bond extends probably from the 3-position to the 14-position, or, in the salts thereof, from the 3-position to the 4-position. The anion in the above-mentioned salts stands primarily for the anion of a strong inorganic acid, particularly a mineral acid, such as a hydrohalic acid, e.g. hydrochloric, hydrobromic acid and the like, or phosphoric acid, a halogenophosphoric acid, e.g. chlorophosphoric acid and the like, or perchloric acid or any other suitable acid. It may also represent the anion of an organic acid; a salt with an organic acid may be present whenever a solution of the starting material in an organic acid, e.g. acetic acid and the like, is used in the above-described removal procedure.

The removal of the double bond may be carried out by reduction, particularly by treating a solution of the starting material in an acid, such as, for example, acetic acid (preferably in the form of aqueous acetic acid), perchloric acid and the like, with a metal. Together with the acid, the metal furnishes the reducing reagent capable of reducing the double bond; zinc, in the presence of an acid, e.g. acetic, perchloric acid and the like, yields a very useful reducing reagent. Zinc in the presence of perchloric acid, which may be used in an aqueous mixture or in admixture with another acid, e.g. acetic acid, represents the preferred reagent; this reagent is particularly suitable, because the rate of reduction is fast and any contact of the starting material, as well as the reduction product with the acidic medium can be kept to a minimum. Organic diluents, such as ethers, e.g. tetrahydrofuran, p-dioxan and the like, lower alkanones, e.g. acetone and the like, or any other suitable solvent may be present as additional diluents, if desired, together with water. The reduction may be carried out at room temperature, or, if necessary, under cooling or at an elevated temperature.

The product of the reduction procedure may be isolated, for example, by neutralizing the acidic reaction mixture with an alkaline reagent, e.g. ammonia and the like, if desired, after removing the solvent or part of it, and extracting the organic material with a suitable solvent, e.g. methylene chloride and the like, or by any other appropriate isolation method.

The above procedure may be illustrated, for example, by the treatment of a lower alkyl 18-O-lower alkyl-Δ³-dehydro-reserpate, e.g. methyl 18-O-methyl-Δ³-dehydro-reserpate, methyl 18-O-ethyl-Δ3-dehydro-reserpate and the like, or of a lower alkyl 18-epi-O-lower alkyl-Δ³-dehydro-reserpate, e.g. methyl 18-epi-O-methyl-Δ³-dehydro-reserpate, methyl 18-epi-O-ethyl-Δ³-dehydro-reserpate, methyl 18-epi-O-n-propyl-Δ³-dehydro-reserpate and the like, in which the double bond extends from the 3-position, or a salt thereof, with zinc in the presence of an acid, e.g. acetic, perchloric acid and the like, and isolation of the desired lower alkyl 18-O-lower alkyl-reserpates, e.g. methyl 18-O-methyl-reserpate, methyl 18-O-ethyl-reserpate and the like, and lower alkyl 18-epi-O-lower alkyl-reserpates, e.g. methyl 18-epi-O-methyl-reserpate, methyl 18-epi-O-ethyl-reserpate, methyl 18-epi-O-n-propyl-reserpate and the like.

The starting materials, which are used in the above procedure and have the previously given formula, are new and are intended to be included within the scope of the present invention. A preferred group of starting materials having the previously given formula, may be represented by the compounds of the formula:

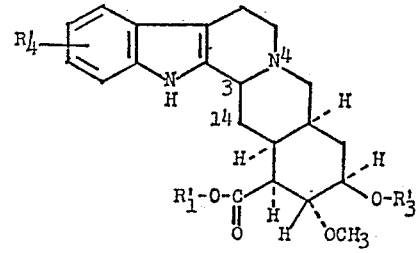

in which each of the groups $R_1'$ and $R_3'$ stands for lower alkyl, containing preferably from one to four carbon atoms, e.g. methyl ethyl, n-propyl, isopropyl, n-butyl and the like, and $R_4'$ stands for lower alkoxy, containing preferably from one to four carbon atoms, particularly methoxy, as well as ethoxy, n-propyloxy, n-butyloxy and the like, whereby $R_4'$ is preferably attached to the 10-position or the 11-position, and in which a double bond extends from the 3-position to the 14-position, and salts of such compounds, in which a double bond extends from the 3-position to the 4-position, especially salts containing as the anion portion an anion derived from an inorganic, particularly a mineral, acid, such as one of those mentioned hereinabove, e.g. hydrohalic acids, e.g. hydrochloric, hydrobromic acid and the like, phosphoric acid, halogeno-phosphoric acids, e.g. chlorophosphoric acid and the like, or perchloric acid or any other suitable inorganic acid, as well as organic acids, e.g. acetic acid and the like. Specific compounds of this group of starting materials are, for example, lower alkyl 18-O-lower alkyl-Δ³-dehydro-reserpates, e.g.
methyl 18-O-methyl-Δ³-dehydro-reserpate,
methyl 18-O-ethyl-Δ³-dehydro-reserpate,
methyl 18-O-n-propyl-Δ³-dehydro-reserpate,
methyl 18-O-isopropyl-Δ³-dehydro-reserpate,
methyl 18-O-n-butyl-Δ³-dehydro-reserpate,
ethyl 18-O-methyl-Δ³-dehydro-reserpate,
ethyl 18-O-ethyl-Δ³-dehydro-reserpate,
n-propyl 18-O-methyl-Δ³-dehydro-reserpate,
isopropyl 18-O-methyl-Δ³-dehydro-reserpate,
n-butyl 18-O-methyl-Δ³-dehydro-reserpate and the like,
lower alkyl 18-O-lower alkyl-10-methoxy-Δ³-dehydro-deserpidates, e.g.
methyl 10-methoxy-18-O-methyl-Δ³-dehydro-deserpidate,
methyl 18-O-ethyl-10-methoxy-Δ³-dehydro-deserpidate,
methyl 18-O-n-butyl-10-methoxy-Δ³-dehydro-deserpidate,
ethyl 10-methoxy-18-O-methyl-Δ³-dehydro-deserpidate,
ethyl 10-methoxy-18-O-n-propyl-Δ³-dehydro-deserpidate,
n-propyl 10-methoxy-18-O-methyl-Δ³-dehydro-deserpidate,
isopropyl 10-methoxy-18-O-methyl-Δ³-dehydro-deserpidate and the like, in which compounds the double bond probably extends from the 3-position to the 14-position, and salts of such compounds, in which the double bond extends from the 3-position to the 4-position, as well as lower alkyl 18-O-lower alkyl-9-methoxy-Δ³-dehydro-reserpates, e.g.
methyl 9-methoxy-18-O-methyl-Δ³-dehydro-deserpidate,
methyl 18-O-ethyl-9-methoxy-Δ³-dehydro-deserpidate,
ethyl 9-methoxy-18-O-methyl-Δ³-dehydro-deserpidate and the like, lower alkyl 11-ethoxy-18-O-lower alkyl-Δ³-dehydro-deserpidates, e.g.

methyl 11-ethoxy-18-O-methyl-Δ³-dehydro-desperidate,
methyl 11-ethoxy-18-O-ethyl-Δ³-dehydro-desperidate,
n-propyl 11-ethoxy-18-O-methyl-Δ³-dehydro-deserpidate and the like,
lower alkyl 18-O-lower alkyl-11-n-propyloxy-Δ³-dehydro-deserpidates, e.g.
methyl 18-O-methyl-11-n-propyloxy-Δ³-dehydro-deserpidate,
methyl 18-O-ethyl-11-n-propyloxy-Δ³-dehydro-deserpidate,
ethyl 18-O-methyl-11-n-propyloxy-Δ³-dehydro-deserpidate and the like,
lower alkyl 11-isopropyloxy-18-O-lower alkyl-Δ³-dehydro-deserpidates, e.g.
methyl 11-isopropyloxy-18-O-methyl-Δ³-dehydro-deserpidate,
methyl 11-isopropyloxy-18-O-n-propyl-Δ³-dehydro-deserpidate,
ethel-11-isopropyloxy-18-O-methyl-Δ³-dehydro-deserpidate and the like,
lower alkyl 11-n-butyloxy-18-O-lower alkyl-Δ³-dehydro-deserpidates, e.g.
methyl 11-n-butyloxy-18-O-methyl-Δ³-dehydro-deserpidate,
methyl 11-n-butyloxy-18-O-ethyl-Δ³-dehydro-deserpidate,
n-propyl 11-n-butyloxy-18-O-methyl-Δ³-dehydro-deserpidate and the like,
lower alkyl 18-O-lower alkyl-12-methoxy-Δ³-dehydro-deserpidates, e.g.
methyl 12-methoxy-18-O-methyl-Δ³-dehydro-deserpidate,
ethyl 12-methoxy-18-O-n-propyl-Δ³-dehydro-deserpidate and the like, in which compounds the double bond probably extends from the 3-position to the 14-position, and salts of these compounds, in which the double bond extends from the 3-position to the 4-position.

Another group of very useful intermediates are, for example, lower alkyl 18-O-lower alkyl-Δ³-dehydro-deserpidates, e.g.
methyl 18-O-methyl-Δ³-dehydro-deserpidate,
methyl 18-O-ethyl-Δ³-dehydro-deserpidate,
methyl 18-O-n-butyl-Δ³-dehydro-deserpidate,
ethyl 18-O-methyl-Δ³-dehydro-deserpidate,
ethyl 18-O-n-propyl-Δ³-dehydro-deserpidate,
n-propyl 18-O-methyl-Δ³-dehydro-deserpidate,
isopropyl 18-O-methyl-Δ³-dehydro-deserpidate,
n-butyl 18-O-methyl-Δ³-dehydro-deserpidate and the like, in which compounds the double bond probably extends from the 3-position to the 14-position, and the salts of these compounds, in which the double bond extends from the 3-position to the 4-position. Salts of the above-mentioned compounds contains as anions preferably those of the previously mentioned acids, particularly those of inorganic acids.

Additional important intermediates useful in the above procedure are, for example, lower alkyl 18-O-lower alkyl-5-methyl-Δ³-dehydro-reserpates, e.g. methyl 5-methyl-18-O-methyl-Δ³-dehydro-reserpate,
methyl 18-O-ethyl-5-methyl-Δ³-dehydro-reserpate,
ethyl 5-methyl-18-O-methyl-Δ³-dehydro-reserpate and the like,
lower alkyl 18-O-lower alkyl-6-methyl-Δ³-dehydro-resperpates,
e.g. methyl 6-methyl-18-O-methyl-Δ³-dehydro-reserpate,
methyl 6-methyl-18-O-n-propyl-Δ³-dehydro-reserpate,
ethyl 5-methyl-18-O-methyl-Δ³-dehydro-reserpate and the like,
lower alkyl 18-O-lower alkyl-6-methyl-Δ³-dehydro-deserpidates,
e.g. methyl 6-methyl-18-O-methyl-Δ³-dehydro-deserpidate,
methyl 18-O-ethyl-6-methyl-Δ³-dehydro-deserpidate,
ethyl 6-methyl-18-O-methyl-Δ³-dehydro-deserpidate and the like,
lower alkyl 18-O-lower alkyl-9-methyl-Δ³-dehydro-deserpidates,
e.g. methyl 9-methyl-18-O-methyl-Δ³-dehydro-deserpidate,
methyl 18-O-isopropyl-9-methyl-Δ³-dehydro-deserpidate,
methyl 9-methyl-18-O-methyl-Δ³-dehydro-deserpidate and the like,
lower alkyl 18-O-lower alkyl-11-methyl-Δ³-dehydro-deserpidates,
e.g. methyl 11-methyl-18-O-methyl-Δ³-dehydro-deserpidate,
methyl 18-O-ethyl-11-methyl-Δ³-dehydro-deserpidate,
ethyl 11-methyl-18-O-methyl-Δ³-dehydro-deserpidate and the like,
lower alkyl 18-O-lower alkyl-10-methoxy-Δ³-dehydro-reserpates,
e.g. methyl 10-methoxy-18-O-methyl-Δ³-dehydro-reserpate,
methyl 18-O-ethyl-10-methoxy-Δ³-dehydro-reserpate,
n-propyl 10-methoxy-18-O-methyl-Δ³-dehydro-reserpate and the like,
lower alkyl 9,10-dimethoxy-18-O-lower alkyl-Δ³-dehydro-reserpates,
e.g. methyl 9,10-dimethoxy-18-O-methyl-Δ³-dehydro-reserpate,
methyl 9,10-dimethoxy-18-O-ethyl-Δ³-dehydro-reserpate,
ethyl 9,10-dimethoxy-18-O-methyl-Δ³-dehydro-reserpate and the like,
lower alkyl 18-O-lower alkyl-10,11-methylenedioxy-Δ³-dehydro-deserpidates,
e.g. methyl 18-O-methyl-10,11-methylenedioxy-Δ³-dehydro-deserpidate,
methyl 10,11-methylenedioxy-18-O-n-propyl-Δ³-dehydro-deserpidate,
ethyl 18-O-methyl-10,11-methylenedioxy-Δ³-dehydro-deserpidate and the like,
lower alkyl 18-O-lower alkyl-11-methylmercapto-Δ³-dehydro-deserpidates,
e.g. methyl 18-O-methyl-11-methylmercapto-Δ³-dehydro-deserpidate,
methyl 18-O-ethyl-11-methylmercapto-Δ³-dehydro-desirpidate,
n-propyl 18-O-methyl-11-methylmercapto-Δ³-dehydro-deserpidate and the like,
lower alkyl 11-ethylmarcapto-18-O-lower alkyl-Δ³-dehydro-deserpidates,
e.g. methyl 11-ethylmarcapto-18-O-methyl-Δ³-dehydro-deserpidate,
methyl 18-O-ethyl-11-ethylmercapto-Δ³-dehydro-deserpidate,
ethyl 11-ethylmarcapto-18-O-methyl-Δ³-dehydro-deserpidate and the like,
lower alkyl 11-fluoro-18-O-lower alkyl-Δ³-dehydro-deserpidates,
e.g. methyl-11-fluoro-18-O-methyl-Δ³-dehydro-deserpidate,
methyl 11-fluoro-18-O-n-propyl-Δ³-dehydro-deserpidate,
isopropyl 11-fluoro-18-O-methyl-Δ³-dehydro-deserpidate and the like,
lower alkyl 10-chloro-18-O-lower alkyl-Δ³-dehydro-deserpidates,
e.g. methyl 10-chloro-18-O-methyl-Δ³-dehydro-deserpidate,
methyl 10-chloro-18-O-ethyl-Δ³-dehydro-deserpidate,
ethyl 10-chloro-18-O-methyl-Δ³-dehydro-deserpidate and the like,
lower alkyl 10-bromo-18-O-lower alkyl-Δ³-dehydro-reserpates,
e.g. methyl 10-bromo-18-O-methyl-Δ³-dehydro-reserpate,
methyl 10-bromo-18-O-ethyl-Δ³-dehydro-reserpate,
ethyl 10-bromo-18-O-methyl-Δ³-dehydro-reserpate and the like,
lower alkyl 17α-desmethoxy-17α-ethoxy-18-O-lower alkyl-Δ³-dehydro-reserpates,
e.g. methyl 17α-desmethoxy-17α-ethoxy-18-O-methyl-Δ³-dehydro-reserpate, methyl 17α-desmethoxy-17α-ethoxy-18-O-ethyl-Δ³-dehydro-reserpate,
n-propyl 17α-desmethoxy-17α-ethoxy-18-O-methyl-Δ³-dehydro-reserpate and the like,
lower alkyl 17α-desmethoxy-18-O-lower alkyl-17α-n-propyloxy-Δ³-dehydro-reserpates,
e.g. methyl 17α-desmethoxy-18-O-methyl-17α-n-propyloxy-Δ³-dehydro-reserpate,
methyl 17α-desmethoxy-18-O-n-propyl-17α-n-propyloxy-Δ³-dehydro-reserpate,
ethyl 17α-desmethoxy-18-O-methyl-17α-n-propyloxy-Δ³-dehydro-reserpate and the like,
lower alkyl 17α-desmethoxy-17α-ethoxy-18-O-lower alkyl-Δ³-dehydro-reserpidates,
e.g. methyl 17α-desmethoxy-17α-ethoxy-18-O-methyl-Δ³-dehydro-deserpidate,
methyl 17α-desmethoxy-17α-ethoxy-18-O-n-propyl-Δ³-dehydro-desirpidate,
ethyl 17α-desmethoxy-17α-ethoxy-18-O-methyl-Δ³-dehydro-deserpidate and the like,
lower alkyl 17α-cyano-17α-desmethoxy-18-O-lower alkyl-Δ³-dehydro-reserpates,
e.g. methyl 17α-cyano-17α-desmethoxy-18-O-methyl-Δ³-dehydro-reserpate,
methyl 17α-cyano-17α-desmethoxy-18-O-ethyl-Δ³-dehydro-reserpate,
ethyl 17α-cyano-17α-desmethoxy-18-O-methyl-Δ³-dehydro-reserpate and the like,
lower alkyl 17α-cyano-17α-desmethoxy-18-O-lower alkyl-Δ³-dehydro-deserpidates,
e.g. methyl 17α-cyano-17α-desmethoxy-18-O-methyl-Δ³-dehydro-deserpidate,
methyl 17α-cyano-17α-desmethoxy-18-O-n-propyl-Δ³-dehydro-deserpidate,
n-propyl 17α-cyano-17α-desmethoxy-18-O-methyl-Δ³-dehydro-deserpidate and the like, or analogous compounds, in which the double bond probably extends from the 3-position to the 14-position, and salts of these compounds, in which the double bond extends from the 3-position to the 4-position. Upon reduction of the double bond extending from the 3-position, these compounds can be converted into the desired compounds of this invention.

An additional group of important compounds may be represented by the formula:

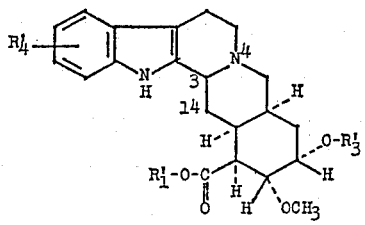

in which each of the groups $R_1'$ and $R_3'$ stands for lower alkyl, containing preferably from one to four carbon atoms, e.g. methyl, ethyl, n-propyl, isopropyl, n-butyl and the like, and $R_4'$ stands for lower alkoxy, containing preferably from one to four carbon atoms, particularly methoxy, as well as ethoxy, n-propyloxy, n-butyloxy and the like, whereby $R_4'$ is preferably attached to the 10-position or the 11-position, and in which a double bond extends from the 3-position to the 14-position, and salts of such compounds, in which a double bond extends from the 3-position to the 4-position, especially salts containing as the anion portion an anion derived from an inorganic, particularly a mineral, acid, such as one of those mentioned hereinabove, e.g. hydrohalic acids, e.g. hydrochloric, hydrobromic acid and the like, phosphoric acid, halogeno-phosphoric acids, e.g. chlorophosphoric acid and the like, or perchloric acid or any other suitable inorganic acid, as well as organic acids, e.g. acetic acid and the like. Specific compounds of this group of starting materials are, for example, lower alkyl 18-epi-O-lower alkyl-Δ³-dehydro-reserpates, e.g. methyl 18-epi-O-methyl-Δ³-dehydro-reserpate,
methyl 18-epi-O-ethyl-Δ³-dehydro-reserpate,
methyl 18-epi-O-n-propyl-Δ³-dehydro-reserpate,
methyl 18-epi-O-isopropyl-Δ³-dehydro-reserpate,
methyl 18-epi-O-n-butyl-Δ³-dehydro-reserpate,
ethyl 18-epi-O-methyl-Δ³-dehydro-reserpate,
ethyl 18-epi-O-ethyl-Δ³-dehydro-reserpate,
n-propyl 18-epi-O-methyl-Δ³-dehydro-reserpate,
n-propyl 18-epi-O-ethyl-Δ³-dehydro-reserpate,
isopropyl 18-epi-O-methyl-Δ³-dehydro-reserpate,
n-butyl 18-epi-O-methyl-Δ³-dehydro-reserpate,
isobutyl 18-epi-O-methyl-Δ³-dehydro-reserpate,
n-pentyl 18-epi-O-ethyl-Δ³-dehydro-reserpate and the like,
lower alkyl 18-epi-O-lower alkyl-10-methoxy-Δ³-dehydro-deserpidates,
e.g. methyl 10-methoxy-18-epi-O-methyl-Δ³-dehydro-deserpidate,
methyl 18-epi-O-ethyl-10-methoxy-Δ³-dehydro-deserpidate,
methyl 10-methoxy-18-epi-O-n-propyl-Δ³-dehydro-deserpidate,
methyl 18-epi-O-isopropyl-10-methoxy-Δ³-dehydro-deserpidate,
ethyl 10-methoxy-18-epi-O-methyl-Δ³-dehydro-deserpidate,
n-propyl 10-methoxy-18-epi-O-methyl-Δ³-dehydro-deserpidate,
n-propyl 18-epi-O-ethyl-10-methoxy-Δ³-dehydro-deserpidate,
isopropyl 10-methoxy-18-epi-O-methyl-Δ³-dehydro-deserpidate and the like, in which compounds the double bond probably extends from the 3-position to the 14-position, and salts of such compounds, in which the double bond extends from the 3-position to the 4-position, as well as lower alkyl 18-epi-O-lower alkyl-9-methoxy-Δ³-dehydro-deserpidates, e.g. methyl 9-methoxy-18-epi-O-methyl-Δ³-dehydro-deserpidate,
methyl 18-epi-O-ethyl-9-methoxy-Δ³-dehydro-deserpidate,
methyl 9-methoxy-18-epi-O-n-propyl-Δ³-dehydro-deserpidate,
ethyl 9-methoxy-18-epi-O-methyl-Δ³-dehydro-deserpidate and the like,
lower alkyl 11-ethoxy-18-epi-O-lower alkyl-Δ³-dehydro-deserpidates,
e.g. methyl 11-ethoxy-18-epi-O-methyl-Δ³-dehydro-deserpidate,
methyl 11-ethoxy-18-epi-O-ethyl-Δ³-dehydro-deserpidate and the like,
lower alkyl 18-epi-O-lower alkyl-11-n-propyloxy-Δ³-dehydro-deserpidates,
e.g. methyl 18-epi-O-methyl-11-n-propyloxy-Δ³-dehydro-deserpidate,
methyl 18-epi-O-ethyl-11-n-propyloxy-Δ³-dehydro-deserpidate and the like,
lower alkyl 11-isopropyloxy-18-epi-O-lower alkyl-Δ³-dehydro-deserpidates,
e.g. methyl 11-isopropyloxy-18-epi-O-methyl-Δ³-dehydro-deserpidate,
methyl 18-epi-O-ethyl-11-isopropyloxy-Δ³-dehydro-deserpidate and the like,
lower alkyl 11-n-butyloxy-18-epi-O-lower alkyl-Δ³-dehydro-deserpidates,
e.g. methyl 11-n-butyloxy-18-epi-O-methyl-Δ³-dehydro-deserpidate,
methyl 11-n-butyloxy-18-epi-O-ethyl-deserpidate and the like,
lower alkyl 18-epi-O-lower alkyl-12-methoxy-Δ³-dehydro-deserpidates,
e.g. methyl 12-methoxy-18-epi-O-methyl-Δ³-dehydro-deserpidate, methyl 18-epi-O-ethyl-12-methoxy-Δ³-dehydro-deserpidate,
ethyl 18-epi-O-ethyl-12-methoxy-Δ³-dehydro-deserpidate and the like, in which compounds the double bond extends probably from the 3-position to the 14-position, or salts thereof, in which the double bond extends from the 3-position to the 4-position.

An additional preferred group of compounds are the lower alkyl 18-epi-O-lower alkyl-Δ³-dehydro-deserpidates, in which lower alkyl contains preferably from one to four carbon atoms, and is represented primarily by methyl, as well as ethyl, n-propyl, isopropyl, n-butyl, isobutyl and the like, in which compounds the double bond extends probably from the 3-position to the 14-position, and salts thereof, in which the double bond extends from the 3-position to the 4-position. Specific members of this group are, for example, methyl 18-epi-O-methyl-Δ³-dehydro-deserpidate,
methyl 18-epi-O-ethyl-Δ³-dehydro-deserpidate,
methyl 18-epi-O-n-propyl-Δ³-dehydro-deserpidate,
methyl 18-epi-O-isopropyl-Δ³-dehydro-deserpidate,
methyl 18-epi-O-n-butyl-Δ³-dehydro-deserpidate,
methyl 18-epi-O-secondary butyl-Δ³-dehydro-deserpidate,
ethyl 18-epi-O-methyl-Δ³-dehydro-deserpidate,
ethyl 18-epi-O-ethyl-Δ³-dehydro-deserpidate,
ethyl 18-epi-O-n-propyl-Δ³-dehydro-deserpidate,
n-propyl 18-epi-O-ethyl-Δ³-dehydro-deserpidate,
n-propyl 18-epi-O-ethyl-Δ³-dehydro-deserpidate,
isopropyl 18-epi-O-methyl-Δ³-dehydro-deserpidate,
isopropyl 18-epi-O-n-butyl-Δ³-dehydro-deserpidate,
n-butyl 18-epi-O-methyl-Δ³-dehydro-deserpidate,
secondary butyl 18-epi-O-methyl-Δ³-dehydro-deserpidate,
n-pentyl 18-epi-O-methyl-Δ³-dehydro-deserpidate and the like.

Other compounds which may be used as intermediates in the above procedure are, for example, lower alkyl 18-epi-O-lower alkyl-5-methyl-Δ³-dehydro-reserpates, e.g. methyl 5-methyl-18-epi-O-methyl-Δ³-dehydro-reserpate,
methyl 18-epi-O-ethyl-5-methyl-Δ³-dehydro-reserpate,
ethyl 5-methyl-18-epi-O-methyl-Δ³-dehydro-reserpate and the like,
lower alkyl 18-epi-O-lower alkyl-6-methyl-Δ³-dehydro-reserpates,
e.g. methyl 6-methyl-18-epi-O-methyl-Δ³-dehydro-reserpate,
methyl 18-epi-O-ethyl-6-methyl-Δ³-dehydro-reserpate,
ethyl 6-methyl-18-epi-O-n-propyl-Δ³-dehydro-reserpate and the like,
lower alkyl 18-epi-O-lower alkyl-6-methyl-Δ³-dehydro-deserpidates,
e.g. methyl 6-methyl-18-epi-O-methyl-Δ³-dehydro-deserpidate,
methyl 6-methyl-18-epi-O-n-propyl-Δ³-dehydro-deserpidate,
ethyl 18-epi-O-isopropyl-6-methyl-Δ³-dehydro-deserpidate and the like,
lower alkyl 18-epi-O-lower alkyl-9-methyl-Δ³-dehydro-deserpidates,
e.g. methyl 9-methyl-18-epi-O-methyl-Δ³-dehydro-deserpidate,
methyl 9-methyl-18-epi-O-ethyl-Δ³-dehydro-deserpidate,
n-propyl 18-epi-O-ethyl-9-methyl-Δ³-dehydro-deserpidate and the like,
lower alkyl 18-epi-O-lower alkyl-11-methyl-Δ³-dehydro-deserpidates,
e.g. methyl 11-methyl-18-epi-O-methyl-Δ³-dehydro-deserpidate,
methyl 18-epi-O-ethyl-11-methyl-Δ³-dehydro-deserpidate,
ethyl 11-methyl-18-epi-O-n-propyl-Δ³-dehydro-deserpidate and the like,
lower alkyl 18-epi-O-lower alkyl-10-methoxy-Δ³-dehydro-reserpates, e.g. methyl 10-methoxy-18-epi-O-methyl-Δ³-dehydro-reserpate,
methyl 18-epi-O-ethyl-10-methoxy-Δ³-dehydro-reserpate,
ethyl 10-methoxy-18-epi-O-n-propyl-Δ³-dehydro-reserpate and the like,
lower alkyl 9,10-dimethoxy-18-epi-O-lower alkyl-Δ³-dehydro-reserpates,
e.g. methyl 9,10-dimethoxy-18-epi-O-methyl-Δ³-dehydro-reserpate,
methyl 9,10-dimethoxy-18-epi-O-ethyl-Δ³-dehydro-reserpate,
n-propyl 9,10-dimethoxy-18-epi-O-ethyl-Δ³-dihydro-reserpate and the like,
lower alkyl 18-epi-O-lower alkyl-10,11-lower alkylenedioxy-Δ³-dehydro-deserpidates,
e.g. methyl 18-epi-O-methyl-10,11-methylenedioxy-Δ³-dehydro-deserpidate,
methyl 18-epi-O-ethyl-10,11-methylenedioxy-Δ³-dehydro-deserpidate and the like,
lower alkyl 10-benzyloxy-18-epi-O-lower alkyl-Δ³-dehydro-deserpidates,
e.g. methyl 10-benzyloxy-18-epi-O-methyl-Δ³-dehydro-deserpidate,
methyl 10-benzyloxy-18-epi-O-ethyl-Δ³-dehydro-deserpidate,
ethyl 10-benzyloxy-18-epi-O-methyl-Δ³-dehydro-deserpidate and the like,
lower alkyl 11-benzyloxy-18-epi-O-lower alkyl-Δ³-dehydro-deserpidates,
e.g. methyl 11-benzyloxy-18-epi-O-methyl-Δ³-dehydro-deserpidate,
methyl 11-benzyloxy-18-epi-O-ethyl-Δ³-dehydro-deserpidate,
ethyl 11-benzyloxy-18-epi-O-methyl-Δ³-dehydro-deserpidate and the like,
lower alkyl 18-epi-O-lower alkyl-11-methylmercapto-Δ³-dehydro-deserpidates,
e.g. methyl 18-epi-O-methyl-11-methylmercapto-Δ³-dehydro-deserpidate,
methyl 18-epi-O-ethyl-11-methylmercapto-Δ³-dehydro-deserpidate,
ethyl 18-epi-O-methyl-11-methylmercapto-Δ³-dehydro-deserpidate and the like,
lower alkyl 11-ethylmercapto-18-epi-O-lower alkyl-Δ³-dehydro-reserpidates,
e.g. methyl 11-ethylmercapto-18-epi-O-methyl-Δ³-dehydro-deserpidate,
ethyl 18-epi-O-ethyl-11-ethylmercapto-Δ³-dehydro-deserpidate,
n-propyl 11-ethylmercapto-18-epi-O-n-propyl-Δ³-dehydro-deserpidate and the like,
lower alkyl 10-chloro-18-epi-O-power alkyl-Δ³-dehydro-deserpidates,
e.g. methyl 10-chloro-18-epi-O-methyl-Δ³-dehydro-deserpidate,
methyl 10-chloro-18-epi-O-ethyl-Δ³-dehydro-deserpidate,
ethyl 10-chloro-18-epi-O-n-butyl-Δ³-dehydro-deserpidate and the like,
lower alkyl 11-fluoro-18-epi-O-lower alkyl-Δ³-dehydro-deserpidates,
e.g. methyl 11-fluoro-18-epi-O-methyl-Δ³-dehydro-deserpidate,
methyl 11-fluoro-18-epi-O-n-propyl-Δ³-dehydro-deserpidate,
ethyl 11-fluoro-18-epi-O-isopropyl-Δ³-dehydro-deserpidate and the like,
lower alkyl 10-bromo-18-epi-O-lower alkyl-Δ³-dehydro-reserpates,
e.g. methyl 10-bromo-18-epi-O-methyl-Δ³-dehydro-reserpate,
methyl 10-bromo-18-epi-O-ethyl-Δ³-dehydro-reserpate,
ethyl 10-bromo-18-epi-O-ethyl-Δ³-dehydro-reserpate and the like,
lower alkyl 17α-desmethoxy-17α-ethoxy-18-epi-O-lower alkyl-Δ³-dehydro-reserpates, e.g. methyl 17α-desmethoxy-17α-ethoxy-18-epi-O-methyl-Δ³-dehydro-reserpate,
methyl 17α-desmethoxy-17α-ethoxy-18-epi-O-ethyl-Δ³-dehydro-reserpate and the like,
lower alkyl 17α-desmethoxy-18-epi-O-lower alkyl-17α-n-propyloxy-Δ³-dehydro-reserpate,
e.g. methyl 17α-desmethoxy-18-epi-O-methyl-17α-n-propyloxy-Δ³-dehydro-reserpate,
ethyl 17α-desmethoxy-18-epi-O-n-propyl-17α-n-propyloxy-Δ³-dehydro-reserpate and the like,
lower alkyl 17α-desmethoxy-17α-isopropyloxy-18-epi-O-lower alkyl-Δ³-dehydro-reserpates,
e.g. methyl 17α-desmethoxy-17α-isopropyloxy-18-epi-O-methyl-reserpate,
methyl 17α-desmethoxy-18-epi-O-ethyl-17α-isopropyloxy-Δ³-dehydro-reserpate and the like,
lower alkyl 17α-desmethoxy-17α-ethoxy-18-epi-O-lower alkyl-Δ³-dehydro-deserpidate,
e.g. methyl 17α-desmethoxy-17α-ethoxy-18-epi-O-methyl-Δ³-dehydro-deserpidate,
methyl 17α-desmethoxy-17α-ethoxy-18-epi-O-ethyl-Δ³-dehydro-deserpidate,
ethyl 17α-desmethoxy-17α-ethoxy-18-epi-O-ethyl-Δ³-dehydro-deserpidate and the like,
lower alkyl 17α-cyano-17α-desmethoxy-18-epi-O-lower alkyl-Δ³-dehydro-reserpates,
e.g. methyl 17α-cyano-17α-desmethoxy-18-epi-O-ethyl-Δ³-dehydro-reserpate,
ethyl 17α-cyano-17α-desmethoxy-18-epi-O-methyl-Δ³-dehydro-reserpate and the like,
lower alkyl 17α-cyano-17α-desmethoxy-18-epi-O-lower alkyl-Δ³-dehydro-deserpidates,
e.g. methyl 17α-cyano-17α-desmethoxy-18-epi-O-methyl-Δ³-dehydro-deserpidate,
methyl 17α-cyano-17α-desmethoxy-18-epi-O-n-propyl-Δ³-dehydro-deserpidate,
n-propyl 17α-cyano-17α-desmethoxy-18-epi-O-ethyl-Δ³-dehydro-deserpidate and the like, in which compounds the double bond probably extends from the 3-position to the 14-position, and salts thereof, in which the double bond extends from the 3-position to the 4-position. The anions of the salts are those derived from inorganic or organic acids such as those described hereinbefore, e.g. hydrochloric, perchloric, chloro-phosphoric acid and the like.

In the above-described starting materials, the free compounds probably have the following partial formula:

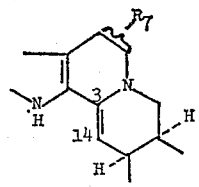

i.e. the double bond extends from the 3-position to the 14-position, whereas the corresponding salts have the partial formula:

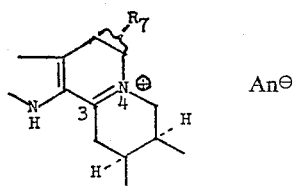

in which An⊖ represents the anion of an acid. The conversion of one form into the other may be carried out according to known methods. For example, a free compound yields the salt upon reaction with an acid, or by treatment of the salt with a base, particularly ammonia, as well as an alkali metal carbonate, e.g. sodium, potassium carbonate or hydrogen carbonate and the like, the free compound may be obtained. In the previously described method, acidic conditions prevail, and whenever the starting material is given to the reaction mixture in the form of the free compound, the salt is formed in situ.

The above-mentioned starting materials may be prepared, for example, by reacting an 18-etherified hydroxy-3-oxo-2,3-secoallo-yohimbane 16-carboxylic acid ester, particularly in a compound having one of the formulae:

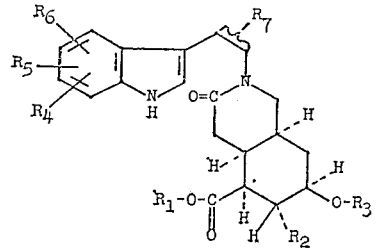

or

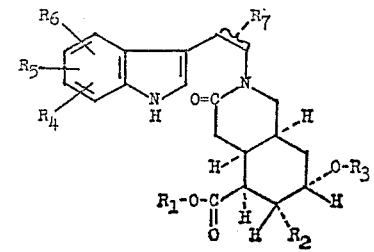

in which $R_1$, $R_2$, $R_3$, $R_4$, $R_5$, $R_6$ and $R_7$ have the previously given meaning, with a ring-closing reagent, and, if desired, converting a resulting salt into the free compound, and/or, if desired, converting a free compound into a salt thereof.

Ring closure of the above-described 2,3-seco-allo-yohimbane compounds may be carried out according to known methods, for example, by treatment with an acidic ring closing reagent, for example, a phosphoric acid, e.g. polyphosphoric acid and the like, a phosphorus halide, e.g. phosphorus trichloride, phosphorus pentachloride, or advantageously a phosphorus oxyhalide, e.g. phosphorus oxychloride and the like.

The 2,3-seco-allo-yohimbane compounds used as the intermediates in the preparation of the Δ³-allo-yohimbane starting materials may be prepared according to different procedures. For example, in an 18-hydroxy-3-oxo-2,3-seco-allo-yohimbane 16-carboxylic acid ester, particularly in a compound having one of the formulae:

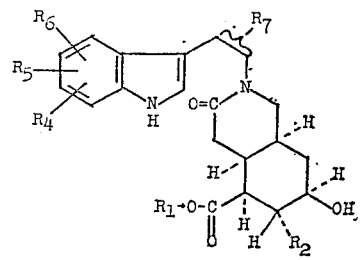

or

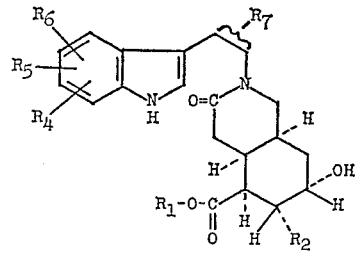

in which $R_1$, $R_2$, $R_4$, $R_5$, $R_6$ and $R_7$ have the previously given meaning, the free hydroxyl group may be etherified. Etherification may be carried out according to the previously mentioned etherification procedure described in detail; lower diazo-alkanes, e.g. diazomethane, diazoethane and the like, in the presence of fluoboric acid or any other suitable Lewis acid are the preferred reagents. Etherification may also be achieved according to other known procedures, for example, by treatment with other reagents suitable for the etherification of a secondary hydroxyl group. Such reagents are, for example, reactive esters formed by aliphatic hydroxy-hydrocarbon compounds, such as lower alkanols, particularly methanol, as well as ethanol and the like, or by substituted aliphatic hydroxy-hydrocarbon compounds with strong acids, such as inorganic acids, e.g. hydrochloric, hydrobromic, hydriodic, sulfuric acid and the like, or with organic acids, particularly strong organic sulfonic acids, e.g. p-toluene sulfonic acid and the like, which reagents are preferably used in the presence of reagents facilitating the etherification procedure. Especially useful are di-lower alkyl sulfates, such as dimethyl sulfate, diethyl sulfate and the like, which reagents are preferably used in the presence of a base, such as an alkali metal hydroxide, e.g. sodium hydroxide, potassium hydroxide and the like, lower alkyl halides, such as methyl, ethyl, n-propyl or n-butyl chloride, bromide or iodide and the like, which reagents are preferably used in the presence of a basic reagent, such as, for example, silver oxide and the like, or any other suitable etherification procedure.

The above etherification procedure is particularly suitable for the preparation of 3-oxo-2,3-seco-alloy-yohimbane compounds with an 18-ether group having the β-configuration, i.e. compounds which can be prepared directly from products obtained according to known totally synthetic methods.

The intermediate 3-oxo-2,3-seco-allo-yohimbane compounds may also be prepared by esterifying in an 18-hydroxy-3-oxo-2,3-seco-allo-yohimbane 16-carboxylic acid ester, particularly in a compound having one of the previously given formulae, the free hydroxyl group, by treatment with an organic sulfonic acid halide, such as a carbocyclic aryl sulfonyl halide, particularly a monocyclic carbocyclic aryl sulfonyl halide, as well as an aliphatic sulfonic acid halide, for example, a compound of the formula R—SO$_2$—Hal, in which R has the previously given meaning and Hal stands for halogeno, particularly chloro and treating a resulting 18-organic sulfonyloxy-3-oxo-2,3-seco-allo-yohimbane 16- carboxylic acid ester, particularly a compound having one of the formulae:

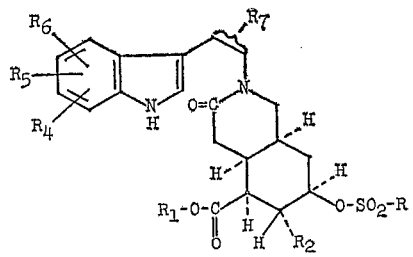

or

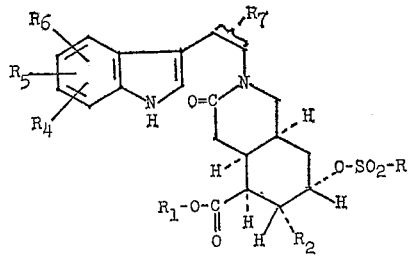

in which $R_1$, $R_2$, $R_4$, $R_5$, $R_6$, $R_7$ and R have the previously given meaning, with an organic hydroxylated compound, particularly a compound of the formula $R_3$—OH, in which $R_3$ has the previously given meaning. Esterification with an organic sulfonic acid halide, for example, with a (halogeno-phenyl)-sulfonyl chloride or a (nitro-phenyl)-sulfonyl chloride, is carried out as previously shown, for example, in the presence of an organic base, e.g. pyridine and the like. Alcoholysis of the ester grouping may be achieved according to the procedure described hereinbefore; a lower alkanol, especially in the presence of an organic tertiary amine, e.g. N,N,N-diethyl-amine, pyridine and the like, represents the preferred reagent. As has been shown hereinbefore, alcoholysis of the 18-organic sulfonyloxy group causes inversion at the 18-carbon atom.

This procedure is particularly suitable for the preparation of 3-oxo-2,3-seco-yohimbane compounds with an 18-ether grouping having the α-configuration, i.e. compounds, which can be prepared through a procedure involving inversion using products obtained according to known totally synthetic methods.

The 18α-hydroxy - 3 - oxo-2,3-seco-allo-yohimbane 16-carboxylic acid esters, which compounds can be used either in the above etherification procedure to form the 18α-etherified hydroxy-3-oxo-2,3-seco-allo-yohimbane 16-carboxylic acid esters or in the esterification to the 18α-organic sulfonyloxy - 3 - oxo-2,3-seco-allo-yohimbane 16-carboxylic acid esters, may be obtained by hydrolysis of the 18β-organic sulfonyloxy - 3 - oxo-2,3-seco-allo-yohimbane 16-carboxylic acid esters with water, preferably in the presence of an organic tertiary amine. Such hydrolysis procedure is carried out according to methods previously described in detail.

The 18-etherified hydroxy-3-oxo-2,3-seco-allo-yohimbane 16-carboxylic acid esters may also be prepared, for example, by ring closure of an 18-etherified hydroxy-3-lower alkoxy-3-oxo-2,3;3,4-bis-seco-allo-yohimbane 16-carboxylic acid ester, particularly of a compound having one of the formulae:

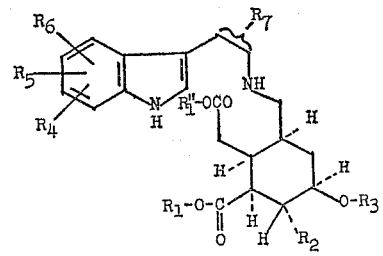

or

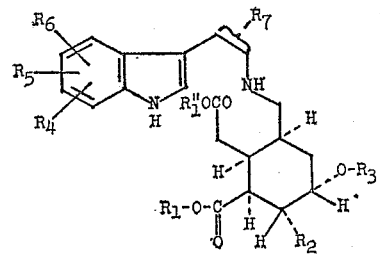

in which $R_1$, $R_2$, $R_3$, $R_4$, $R_5$, $R_6$ and $R_7$ have the previously given meaning, and $R_1''$ represents lower alkyl, or a salt thereof. Ring closure may be achieved according to known methods, for example, by treatment of the ester with a dehydrating agent, such as, for example, a carboxylic acid anhydride, e.g. acetic acid anhydride and the like.

The above used intermediates used for the preparation of the 18-etherified hydroxy-3-oxo-2,3-seco-allo-yohimbane 16-carboxylic acid esters, may be obtained, for example, by etherifying in a 3β-hydroxy-7-oxo-1,2β,3α,4,7,8, 9α,10α-octahydro-naphthalene 1-carboxylic acid ester, particularly a compound of the formula:

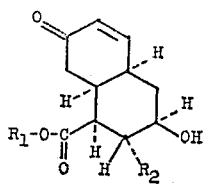

in which $R_1$ and $R_2$ have the previously given meaning, the free hydroxyl group according to previously given methods used for the etherification of secondary hydroxyl groups, to form a 3β-etherified hydroxy-7-oxo-1,2β,3α,4,7,8,9α,10α-octahydro-naphthalene 1-carboxylic acid ester, particularly a compound of the formula:

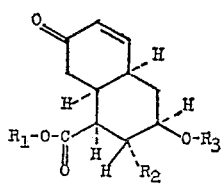

in which $R_1$, $R_2$ and $R_3$ have the previously given meaning. Or, a 3β-hydroxy-7-oxo-1,2β,3α,4,7,8,9α,10α-octahydro-naphthalene 1-carboxylic acid ester, such as a compound having the above-given formula, may be reacted with an organic sulfonic acid halide, such as a compound of the formula R—SO₂—Hal, in which R and Hal have the previously given meaning, preferably a monocyclic carbocyclic aryl-sulfonyl chloride, in the presence of an organic base, and treating a resulting 3β-organic sulfonyloxy-7-oxo - 1,2β,3α,4,7,8,9α,10α - octahydro-naphthalene 1-carboxylic acid ester, particularly the compound of the formula:

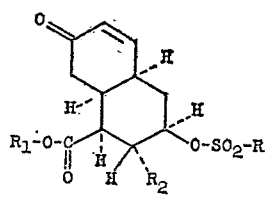

in which $R_1$, $R_2$ and R have the previously given meaning, with an organic hydroxylated compound, especially a compound of the formula $R_3$—OH, in which $R_3$ has the previously given meaning, preferably in the presence of an organic tertiary base to form a 3α-etherified hydroxy-7-oxo - 1,2β,3β,4,7,8,9α,10α-octahydro-naphthalene 1-carboxylic acid ester, particularly a compound of the formula:

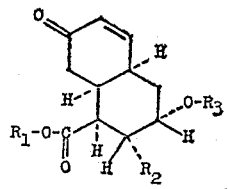

in which $R_1$, $R_2$ and $R_3$ have the previously given meaning. The above shown 3-etherified hydroxy-7-oxo-1,2β,3,4,7,8,9α,10α-octahydro-naphthalene 1-carboxylic acid esters, having particularly the previously given formulae, are then oxidized, for example, with osmium tetroxide in an aqueous solution, followed by treatment with sodium chlorate, to form a 5α,6α-dihydroxy-3-etherified hydroxy-7-oxo - 1,2β,3,4,5β,7,8,9α,10α - decahydro-naphthalene 1-carboxylic acid ester, particularly a compound having one of the formula:

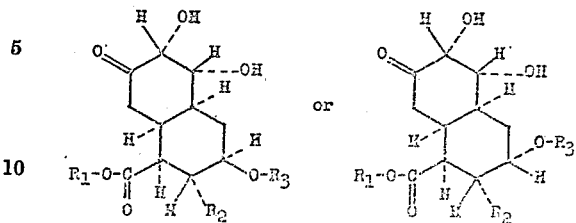

in which $R_1$, $R_2$ and $R_3$ have the above-given meaning, which diol is then oxidatively split, for example, by treatment with periodic acid hydrate in an aqueous medium, to form a 5β-aldehydo-3-etherified hydroxy-6β-carboxymethyl-1,2β,3,4,5α,6α-hexahydro-benzene 1-carboxylic acid ester, especially a compound having one of the formulae:

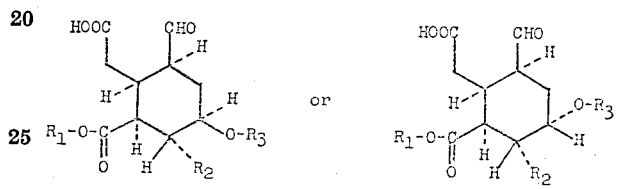

in which $R_1$, $R_2$ and $R_3$ have the previously given meaning. The free carboxyl group of the carboxymethyl portion is then esterified, for example, with a lower diazoalkane, e.g. diazomethane, diazoethane and the like, to form the desired 5β-aldehydo-3-etherified hydroxy-6β-carbo-lower alkoxy - methyl-1,2β,3,4,5α,6α-hexahydro-benzene 1-carboxylic acid ester, such as a compound having the formula:

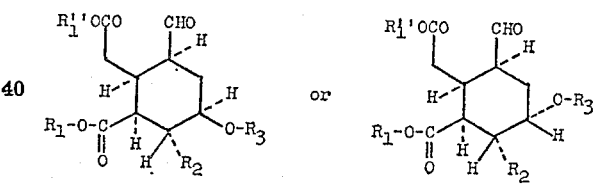

in which $R_1$, $R_2$ and $R_3$ have the previously given meaning, and $R_1''$ represents lower alkyl, particularly methyl, as well as ethyl and the like. This compound is then reacted with a tryptamine, particularly a tryptamine compound of the formula:

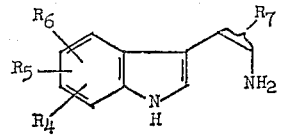

in which $R_4$, $R_5$, $R_6$ and $R_7$ have the above-given meaning, preferably in solution with an inert solvent, e.g. benzene and the like, to yield a $\Delta^{4(21)}$-18-etherified hydroxy-3-lower alkoxy-3-oxo-2,3;3,4-bis-seco-allo-yohimbane 16-carboxylic acid ester, particularly a compound having one of the formulae:

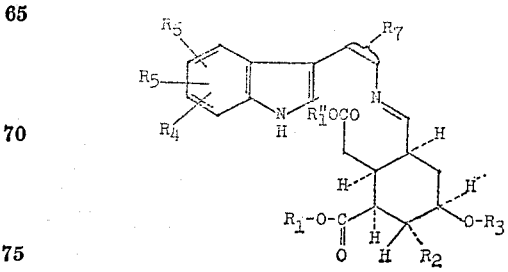

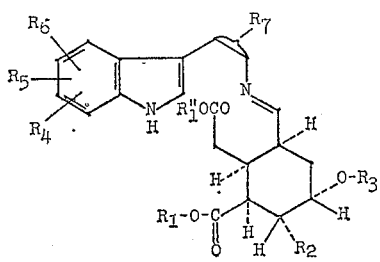

in which $R_1$, $R_1''$, $R_2$, $R_3$, $R_4$, $R_5$, $R_6$ and $R_7$ have the previously given meaning. Upon treatment with a reducing reagent, for example, with a borohydride, e.g. sodium borohydride and the like, in an inert solvent, such as a lower alkanol, e.g. methanol, ethanol and the like, and, if necessary, in the presence of an activator, e.g. aluminum chloride and the like, the Schiff-base type double bond is reduced, and the desired 18-etherified hydroxy-3-lower alkoxy-3-oxo-2,3;3,4-bis-seco-allo-yohimbane 16-carboxylic acid ester, is formed, in which the esterified carboxyl groups may be partially or totally hydrolyzed. Hydrolyzed carboxyl groups may subsequently be re-esterified (for example, by treatment with a lower aliphatic diazohydrocarbon, such as a lower diazoalkane, particularly diazomethane, as well as diazoethane and the like, or any other suitable diazo-reagent).

The 5β-aldehydo-3-etherified hydroxy-6β-carbo-lower alkoxy-methyl-1,2β,3,4,5α,6α-hexahydro-benzene 1-carboxylic acid ester, particularly a compound having one of the previously shown formulae, may also be prepared, for example, by directly etherifying or esterifying with an organic sulfonic acid halide and subsequently alcoholizing with an alcohol in a 3-hydroxy-7-oxo-1,2β,3,4,7,8,9α,10α-octahydro-naphthalene 1-carboxylic acid ester, particularly in a compound having one of the formulae:

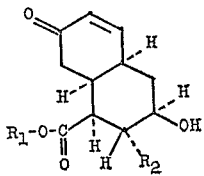

or

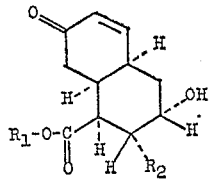

in which $R_1$ and $R_2$ have the previously given meaning, the hydroxyl group attached to the 3-position, which reactions may be carried out according to the previously described methods. A resulting 3-etherified hydroxy-7-oxo-1,2β,3,4,7,8,9α,9α,10α-octahydro - naphthalene 1-carboxylic acid ester, particularly a compound having one of the formulae:

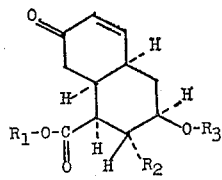

or

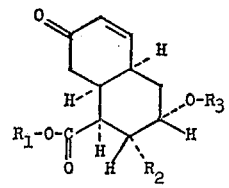

in which $R_1$, $R_2$ and $R_3$ have the previously given meaning, is then subjected to the treatment of ozone in the presence of an inert organic solvent, for example, in glacial acetic acid, ethyl acetate and the like, and at temperatures between about 0° and about −60° to effect ozonation, the excess ozone is removed from the reaction mixture, for example, by bubbling an inert gas, e.g. nitrogen and the like, through the reaction solution, and the resulting ozonide is decomposed by adding water at room temperature to form the desired 5β-aldehydo-3-etherified hydroxy-6β-carboxymethyl-1,2β,3,4,5α,6α-hexahydro-benzene 1-carboxylic acid ester, particularly a compound having one of the formulae:

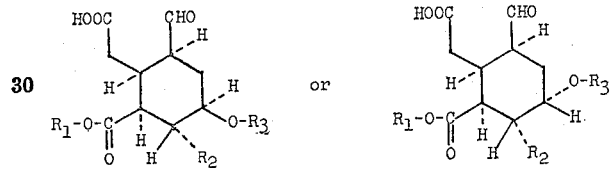

in which $R_1$, $R_2$ and $R_3$ have the previously given meaning, in which compounds the free carboxyl group is then esterified as previously shown to yield the desired intermediate, which is condensed with the tryptamine compound.

The etherification of a free hydroxyl group, with or without simultaneous inversion, may also be carried out at any other suitable step of the above shown procedures leading to the desired intermediates for the preparation of the starting materials.

The Δ³-18-etherified hydroxy-allo-yohimbene 16-carboxylic acid esters or the salts thereof, which compounds are used as starting materials for the preparation of the 18-etherified hydroxy-3-epi-allo-yohimbane 16-carboxylic acid esters according to the previously described procedure, may also be prepared, for example, by ring closure of an 18-organic sulfonyloxy-3-oxo-2,3-seco-allo-yohimbane 16-carboxylic acid ester, particularly a compound having one of the previously shown formulae, and subsequent alcoholysis of a resulting Δ³-18-organic sulfonyloxy-allo-yohimbene 16-carboxylic acid ester, in which the double bond extends probably from the 3-position to the 14-position, or a salt thereof, in which the double bond extends from the 3-position to the 4-position, particularly of a compound having one of the formulae:

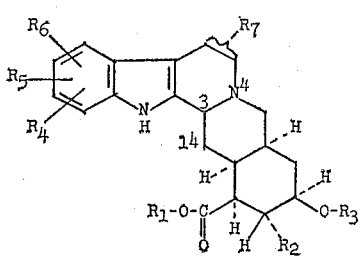

or

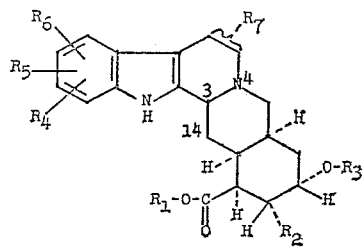

in which $R_1$, $R_2$, $R_3$, $R_4$, $R_5$, $R_6$ and $R_7$ have the previously given meaning, and in which a double bond extends probably from the 3-position to the 14-position, or salts thereof, in which a double bond extends from the 3-position to the 4-position, to yield the desired starting materials, i.e. the $\Delta^3$-18-etherified hydroxy-allo-yohimbene 16-carboxylic acid esters. Ring closure (preferably with phosphorus oxychloride) and alcoholysis (preferably with a lower alkanol in the presence of an organic tertiary amine) are carried out according to methods described in detail hereinbefore.

In the above methods for the preparation of the starting materials, new and important intermediates are being formed, which are intended to be included within the scope of this invention. Particularly useful are the 18-etherified hydroxy-3-oxo-2,3-seco-allo-yohimbane 16-carboxylic acid esters, particularly one of the compounds having the previously shown formula. A preferred group of these intermediates is represented by the formula:

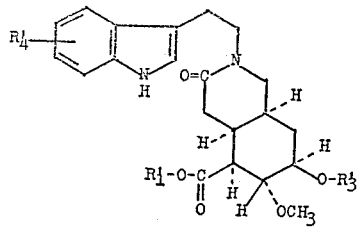

in which each of the radicals $R_1'$ and $R_3'$ have the previously given meaning, i.e. stand for lower alkyl, and $R_4'$ represents lower alkoxy as previously shown. This group is represented by the lower alkyl 18-O-lower alkyl-3-oxo-2,3-seco-reserpates,
e.g. methyl 18-O-methyl-3-oxo-2,3-seco-reserpate,
methyl 18-O-ethyl-3-oxo-2,3-seco-reserpate,
methyl 18-O-n-propyl-3-oxo-2,3-seco-reserpate,
methyl 18-O-isopropyl-3-oxo-2,3-seco-reserpate,
methyl 18-O-n-butyl-3-oxo-2,3-seco-reserpate,
methyl 18-O-isobutyl-3-oxo-2,3-seco-reserpate,
ethyl 18-O-methyl-3-oxo-2,3-seco-reserpate,
ethyl 18-O-ethyl-3-oxo-2,3-seco-reserpate,
ethyl 18-O-n-propyl-3-oxo-2,3-seco-reserpate,
ethyl 18-O-n-butyl-3-oxo-2,3-seco-reserpate,
n-propyl 18-O-methyl-3-oxo-2,3-seco-reserpate,
n-propyl 18-O-ethyl-3-oxo-2,3-seco-reserpate,
isopropyl 18-O-methyl-3-oxo-2,3-seco-reserpate,
isopropyl 18-O-n-propyl-3-oxo-2,3-seco-reserpate,
n-butyl 18-O-methyl-3-oxo-2,3-seco-reserpate,
n-butyl 18-O-ethyl-3-oxo-2,3-seco-reserpate,
isobutyl 18-O-methyl-3-oxo-2,3-seco-reserpate,
n-pentyl 18-O-methyl-3-oxo-2,3-seco-reserpate,
n-hexyl 18-O-methyl-3-oxo-2,3-seco-reserpate and the like.

Other compounds of the aforementioned formula are, for example, the lower alkyl

18-O-lower alkyl-9-methoxy-3-oxo-2,3-seco-deserpidates,
e.g. methyl 9-methoxy-18-O-methyl-3-oxo-2,3-seco-deserpidate,
methyl 18-O-ethyl-9-methoxy-3-oxo-2,3-seco-deserpidate,
ethyl 9-methoxy-18-O-methyl-3-oxo-2,3-seco - deserpidate and the like,
lower alkyl 18-O-lower alkyl-10-methoxy-3-oxo-2,3-seco-deserpidates,
e.g. methyl 10-methoxy-18-O-methyl-3-oxo-2,3-seco-deserpidate,
methyl 18-O-ethyl-10-methoxy-3-oxo-2,3 - seco - deserpidate,
methyl 10-methoxy-18-O-n-propyl-3-oxo-2,3-seco-deserpidate,
ethyl 10-methoxy-18-O-methyl-3-oxo-2,3 - seco - deserpidate,
n-propyl 10-methoxy-18-O-methyl-3-oxo-2,3-seco-deserpidate,
isopropyl 10-methoxy-18-O-methyl-3-oxo-2,3-seco-deserpidate and the like,
lower alkyl 11-ethoxy-18-O-lower alkyl-3-oxo-2,3-seco-deserpidates,
e.g. methyl 11-ethoxy-18-O-methyl-3-oxo-2,3-seco-deserpidate,
methyl 11-ethoxy-18-O-ethyl-3-oxo-2,3-seco - deserpidate and the like,
lower alkyl 18-O-lower alkyl-11-n-propyloxy-3-oxo-2,3-seco-deserpidates,
e.g. methyl 18-O-methyl-11-n-propyloxy-3-oxo-2,3-seco-deserpidate,
methyl 18-O-ethyl-11-n-propyloxy-3-oxo-2,3-seco-deserpidate and the like,
lower alkyl 11-isopropyloxy-18-O-lower alkyl-3-oxo-2,3-seco-deserpidates,
e.g. methyl 11-isopropyloxy-18-O-methyl-3-oxo-2,3-seco-deserpidate,
ethyl 11-isopropyloxy-18-O-methyl-3-oxo-2,3-seco - deserpidate and the like,
lower alkyl 11-n-butyloxy-18-O-lower alkyl - 3 - oxo - 2,3-seco-deserpidates,
e.g. methyl 11-n-butyloxy-18-O-methyl-3-oxo-2,3-seco-deserpidate,
methyl 11-n-butyloxy-18-O-ethyl-3-oxo-2,3-seco - deserpidate and the like,
lower alkyl 18-O-lower alkyl-12-methoxy-3-oxo-2,3-seco-deserpidates,
e.g. methyl 12-methoxy-18-O-methyl-3-oxo-2,3-seco-deserpidate,
ethyl 12-methoxy-18-O-methyl-3-oxo-2,3-seco-deserpidate and the like.

An additional preferred group of compounds is represented by the lower alkyl 18-O-lower alkyl-3-oxo-2,3-seco-deserpidates, in which lower alkyl contains preferably from one to four carbon atoms, and is represented primarily by methyl, as well as ethyl, n-propyl, isopropyl, n-butyl, isobutyl and the like. Specific members of this group are, for example, methyl 18-O-methyl-3-oxo-2,3-seco-deserpidate,
methyl 18-O-ethyl-3-oxo-2,3-seco-deserpidate,
methyl 18-O-n-propyl-3-oxo-2,3-seco-deserpidate,
methyl 18-O-isopropyl-3-oxo-2,3-seco-deserpidate,
ethyl 18-O-methyl-3-oxo-2,3-seco-deserpidate,
n-propyl 18-O-ethyl-3-oxo-2,3-seco-deserpidate,
isopropyl 18-O-methyl-3-oxo-2,3-seco-deserpidate, and the like.

Another preferred group of these intermediates is represented by the formula:

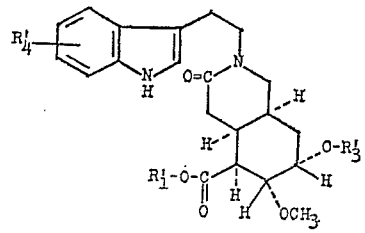

in which $R_1'$, $R_3'$ and $R_4'$ have the previously given meaning which compounds are represented primarily by the lower alkyl 18-epi-O-lower alkyl-3-oxo-2,3-seco-reserpates, e.g. methyl 18-epi-O-methyl-3-oxo-2,3-seco-reserpate, methyl 18-epi-O-n-propyl-3-oxo-2,3-seco-reserpate, methyl 18-epi-O-isopropyl-3-oxo-2,3-seco-reserpate, methyl 18-epi-O-n-butyl-3-oxo-2,3-seco-reserpate, ethyl 18-epi-O-methyl-3-oxo-2,3-seco-reserpate, ethyl 18-epi-O-n-propyl-3-oxo-2,3-seco-reserpate, n-propyl 18-epi-O-methyl-3-oxo-2,3-seco-reserpate, n-propyl 18-epi-O-ethyl-3-oxo-2,3-seco-reserpate, isopropyl 18-epi-O-ethyl-3-oxo-2,3-seco-reserpate, isopropyl 18-epi-O-n-butyl-3-oxo-2,3-seco-reserpate, n-butyl 18-epi-O-methyl-3-oxo-2,3-seco-reserpate and the like.

Other compounds of the aforementioned formula are, for example, the lower alkyl 18-epi-O-lower alkyl-9-methoxy-3-oxo-2,3-seco-deserpidates, e.g.
methyl 9-methoxy-18-epi-O-methyl-3-oxo-2,3-seco-deserpidate,
methyl 18-epi-O-ethyl-9-methoxy-3-oxo-2,3-seco-deserpidate,
methyl 9-methoxy-18-epi-O-n-propyl-3-oxo-2,3-seco-deserpidate,
ethyl 9-methoxy-18-epi-O-methyl-3-oxo-2,3-seco-deserpidate and the like,
lower alkyl 18-epi-O-lower alkyl-10-methoxy-3-oxo-2,3-seco-deserpidates, e.g.
methyl 10-methoxy-18-epi-O-methyl-3-oxo-2,3-seco-deserpidate,
methyl 18-epi-O-ethyl-10-methoxy-3-oxo-2,3-seco-deserpidate,
methyl 10-methoxy-18-epi-O-n-propyl-3-oxo-2,3-seco-deserpidate,
ethyl 10-methoxy-18-epi-O-methyl-3-oxo-2,3-seco-deserpidate,
n-propyl 10-methoxy-18-epi-O-methyl-3-oxo-2,3-seco-deserpidate,
isopropyl 10-methoxy-18-epi-O-methyl-3-oxo-2,3-seco-deserpidate and the like,
lower alkyl 11-ethoxy-18-epi-O-lower alkyl-3-oxo-2,3-seco-deserpidates, e.g.
methyl 11-ethoxy-18-epi-O-methyl-3-oxo-2,3-seco-deserpidate,
methyl 11-ethoxy-18-epi-O-ethyl-3-oxo-2,3-seco-deserpidate and the like,
lower alkyl 18-epi-O-lower alkyl-11-n-propyloxy-3-oxo-2,3-seco-deserpidate, e.g.
methyl 18-epi-O-methyl-11-n-propyloxy-3-oxo-2,3-seco-deserpidate,
methyl 18-epi-O-ethyl-11-n-propyloxy-3-oxo-2,3-seco-deserpidate and the like,
lower alkyl 11-isopropyloxy-18-epi-O-lower alkyl-3-oxo-2,3-seco-deserpidates, e.g.
methyl 11-isopropyloxy-18-epi-O-methyl-3-oxo-2,3-seco-deserpidate,
ethyl 11-isopropyloxy-18-epi-O-methyl-3-oxo-2,3-seco-deserpidate and the like,
lower alkyl 11-n-butyloxy-18-epi-O-lower alkyl-3-oxo-2,3-seco-deserpidates, e.g.
methyl 11-n-butyloxy-18-epi-O-methyl-3-oxo-2,3-seco-deserpidate,
methyl 11-n-butyloxy-18-epi-O-ethyl-3-oxo-2,3-seco-deserpidate and the like,
lower alkyl 18-epi-O-lower alkyl-12-methoxy-3-oxo-2,3-seco-deserpidates, e.g.
methyl 12-methoxy-18-epi-O-methyl-3-oxo-2,3-seco-deserpidate,
ethyl 12-methoxy-18-epi-O-methyl-3-oxo-2,3-seco-deserpidate and the like.

An additional preferred group of compounds is represented by the lower alkyl 18-epi-O-lower alkyl-3-oxo-2,3-seco-deserpidates, in which lower alkyl contains preferably from one to four carbon atoms, and is represented primarily by methyl, as well as ethyl, n-propyl, isopropyl, n-butyl, isobutyl and the like. Specific members of this group are, for example, methyl 18-epi-O-methyl-3-oxo-2,3-seco-deserpidate,
methyl 18-epi-O-ethyl-3-oxo-2,3-seco-deserpidate,
methyl 18-epi-O-n-propyl-3-oxo-2,3-seco-deserpidate,
methyl 18-epi-O-n-butyl-3-oxo-2,3-seco-deserpidate,
ethyl 18-epi-O-methyl-3-oxo-2,3-seco-deserpidate,
ethyl 18-epi-O-ethyl-3-oxo-2,3-seco-deserpidate,
n-propyl 18-epi-O-methyl-3-oxo-2,3-seco-deserpidate,
n-propyl 18-epi-O-n-propyl-3-oxo-2,3-seco-deserpidate,
isopropyl 18-epi-O-methyl-3-oxo-2,3-seco-deserpidate,
n-butyl 18-epi-O-methyl-3-oxo-2,3-seco-deserpidate and the like.

The compounds of the present invention, as well as the starting materials and intermediates used in their formation, may be present in the form of mixtures of racemates, single racemates or antipodes.

Mixtures of racemates of final products or starting materials may be separated into the single racemates on the basis of physico-chemical differences, for example, by fractionated crystallization and the like.

Racemates of intermediates and final products may be resolved into antipodes. Racemates of final products or intermediates, forming acid addition salts, may be resolved, for example, by treating a solution of the free racemic base in an inert solvent, such as, for example, a lower alkanol, e.g. methanol, ethanol and the like, a halogenated lower aliphatic hydrocarbon, e.g. methylenechloride, chloroform and the like, or any other suitable solvent, with one of the optically active forms of an acid containing an asymmetric carbon atom; the acid may be employed in solution, for example, in one of the abovementioned solvents. Especially useful as optically active forms of salt-forming acids having an asymmetric carbon atom are D- and L-tartaric acid, as well as the optically active forms of di-o-toluyl-tartaric, malic, mandelic, camphor-10-sulfonic, quinic acid and the like. A salt may then be isolated, which is formed by the optically active acid with one of the optically active forms of the base. From a resulting salt, the free and optically active compounds may be obtained according to known methods used for the conversion of a salt into a free compound, for example, as outlined hereinbelow. A resulting optically active base may be converted into an acid addition salt with one of the acids mentioned hereinbefore, or into an N-oxide or an acid addition salt of an N-oxide thereof, as shown hereinbelow.

The optically active forms may also be obtained by resolving racemates using biochemical methods.

The compounds of this invention or the N-oxides thereof may be obtained in the form of the free bases or as the salts thereof. A salt, including a salt of an N-oxide, may be converted into the free base, for example, by reacting the former with an alkaline reagent, such as, for example, aqueous ammonia and the like, or an ion exchange resin. A free base or the N-oxide thereof may be converted into the therapeutically useful acid addition salts thereof by treatment with one of the inorganic or organic acids mentioned hereinbefore; the reaction may be carried out, for example, by treating a solution of the free base in an inert solvent, such as a lower alkanol, e.g. methanol, ethanol, propanol, isopropanol and the like, a lower alkanone, e.g. acetone, ethyl methyl ketone and the like, a halogenated aliphatic hydrocarbon, e.g. methylene chloride, chloroform and the like, or any other suitable diluent with the acid or a solution thereof and isolating the resulting salt. The salts may also be obtained as the hemihydrates, monohydrates, sesquihydrates or polyhydrates depending on the conditions used in the formation of the salts.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, or a persulfonic acid, e.g. p-toluene persulfonic acid and the like. Inert solvents used in the preparation of the N-oxides are, for example, halogenated lower alkanes, e.g. methylene chloride, chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

This is a continuation-in-part application of our application Serial No. 46,875, filed August 2, 1960, now abandoned, which in turn is a continuation-in-part application of our application Serial No. 37,097, filed June 20, 1960, which in turn is a continuation-in-part application of our application Serial No. 837,357, filed September 1, 1959, now abandoned, which in turn is a continuation-in-part application of our application Serial No. 830,187, filed July 29, 1959, now abandoned. The present application is also a continuation-in-part application of our application Serial No. 46,911, filed August 2, 1960, now abandoned.

The following examples illustrate the invention and are not to be construed as being limitations thereon. Temperatures are given in degrees centigrade.

*Example 1*

To a solution of 2.48 g. of methyl resperate in 400 ml. of methylene chloride, maintained at −10 to −15°, is added 66 ml. of a fluoboric acid solution while stirring. (The latter is prepared as follows: Commercially available fifty percent aqueous fluoboric acid is concentrated by partial evaporation under reduced pressure to an approximately 14 N solution, determined by titration with a standard sodium hydroxide solution. A stock solution of approximately 0.1 N strength is prepared by dissolving 1 ml. of the concentrated fluoboric acid in a mixture of 110 ml. of absolute ether and 30 ml. of methylene chloride.) A small precipitate forms during the addition, which represents, probably, a salt of methyl reserpate with the acid.

A solution of diazomethane in methylene chloride (69 ml. of an 0.348 N solution) is added to the stirred reaction mixture over a period of about five minutes; during the addition the temperature is maintained at about −10°. The previously-mentioned precipitate dissolves again. An additional 1 ml. of the stock solution is stirred for a few more minutes. 2 ml. of glacial acetic acid is added with the intent to destroy any excess of diazomethane.

The solution is washed twice with five percent aqueous sodium carbonate and once with saturated aqueous sodium chloride, the organic layer is dried over anhydrous sodium sulfate and evaporated under reduced pressure, whereupon 2.24 g. of a tan, solid material can be recovered. The product may be purified as follows: As much as possible of the residue is dissolved in 50–60 ml. of benzene at room temperature; the undissolved material is filtered off. The filtrate is chromatographed on about 40 g. of aluminum oxide (Woelm, neutral, activity I); the desired methyl 18-O-methyl-reserpate is eluted with benzene, containing 0.2 percent of methanol. The oily, yellow solid is washed with cold ether and recrystallized from a 1:3-mixture of benzene and cyclohexane, using charcoal as a decolorizing agent, M.P. 228–231° (with decomposition).

The purification step may also be carried out as follows: 7.5 g. of benzene-soluble material, obtained from the tan, solid product, is dissolved in 100 ml. of benzene and placed on a column containing 240 g. of aluminum oxide (Woelm, neutral activity II–III). The column is washed with about 500 ml. of benzene, and subsequently with about 3,000 ml. of methylene chloride and about 2,000 ml. of methylene chloride containing 0.5 percent of methanol. The fractions obtained with methylene chloride and the first fractions eluted with the methylene chloride-methanol mixture are combined after evaporation of the solvent and the residue is recrystallized using a 1:3-mixture of benzene and cyclohexane and charcoal as an adsorbent. The resulting, pure methyl 18-O-methyl-reserpate melts at 235–237°, $[\alpha]_D^{25}=-111°$ (in chloroform) and is identical with the above-described product.

*Example 2*

Substitution of the diazomethane solution in Example 1 by 113 ml. of an 0.212 N solution of diazoethane, adding said solution to the mixture of 2.48 g. of methyl reserpate and 66 ml. of the standard fluoboric acid solution (as described in Example 1) in methylene chloride over a period of ten minutes and working up the reaction mixture as shown in Example 1, results in the formation of methyl 18-O-ethyl-reserpate which, after recrystallization from a 1:3-mixture of benzene and cyclohexane in the presence of charcoal, melts at 221–222.5° (with decomposition).

*Example 3*

To a solution of 2.67 g. of n-propyl-reserpate and 66 ml. of a fluoboric acid solution (as described in Example 1) in methylene chloride is added 69 ml. of an 0.348 N solution of diazomethane in methylene chloride at below −10°. The reaction mixture is worked up as shown in Example 1 to yield the desired n-propyl 18-O-methyl-reserpate.

The starting material may be prepared as follows: Gaseous n-diazopropane is distilled from its ether solution into a suspension of 20 g. of reserpic acid in a 1:1-mixture of chloroform and ethanol. Any excess of n-diazopropane is decomposed with acetic acid, the solvents are evaporated under reduced pressure and the residue is poured into 800 ml. of water containing 20 ml. of concentrated aqueous ammonia. A white crystalline precipitate is obtained, which is washed with water to yield the n-propyl reserpate, M.P. 164–166°.

*Example 4*

By replacing in Example 1 the methyl reserpate by 2.56 g. of ethyl reserpate and treating a mixture of the latter and a fluoboric acid preparation in methylene chloride with a diazomethane solution as shown in Example 1, the desired ethyl 18-O-methyl-reserpate can be obtained.

*Example 5*

Treatment of a solution of 2.67 g. of isopropyl reserpate and 66 ml. of the standard fluoboric acid preparation in methylene chloride with a diazomethane solution in methylene chloride at below −10° according to the procedure of Example 1, results in the formation of isopropyl 18-O-methyl-reserpate.

The starting material used in the above reaction may be prepared as follows: A mixture of 10 g. of methyl reserpate, 500 ml. of isopropanol and 20 drops of benzyl trimethyl ammonium hydroxide is refluxed for 2½ hours.

After standing at room temperature for several hours, a white precipitate (needles) is formed, which is removed by filtration. The filtrate is evaporated to dryness, the foamy residue is taken up in 500 ml. of water containing 5 ml. of concentrated aqueous ammonia. The aqueous mixture is extracted with methylene chloride, the organic solvent is passed through a column containing a diatomaceous earth preparation and is then evaporated to dryness under reduced pressure. The residue is crystallized by the addition of diethyl ether, the crystalline material is filtered off, dried and identified as isopropyl reserpate, M.P. 214–216°.

Other lower alkyl 18-O-methyl-reserpates, which may be prepared according to the aforementioned procedures are, for example, n-butyl 18-O-methyl-reserpate, isobutyl 18-O-methyl-reserpate, isopentyl 18-O-methyl-reserpate, n-hexyl 18-O-methyl-reserpate and the like. The starting materials used for the preparation of the above compounds are known or may be obtained according to methods used for the known compounds, particularly by treatment of reserpic acid with lower diazo-alkanes; isobutyl reserpate melts at 145–148° and isopentyl reserpate at 135–138°, whereas n-hexyl reserpate has a melting point of 117–118°.

*Example 6*

To a solution of 1.5 g. of methyl 18-O-methyl-reserpate in 25 ml. of acetone is added dropwise concentrated hydrochloric acid while stirring. The addition is carried out at room temperature and is interrupted after the solution becomes acidic to Congo Red test paper. Crystallization occurs upon scratching, the crystalline material is filtered off and washed with cold acetone. 1.5 g. of the methyl 18-O-methyl-reserpate hydrochloride is obtained, M.P. 237–242° (with decomposition).

*Example 7*

To a vigorously stirred solution of 5.0 g. of methyl deserpidate in 800 ml. of methylene chloride, is added a mixture of 158 ml. of diethylether, 43 ml. of methylene chloride and 1.4 ml. of concentrated aqueous fluoboric acid. The solution is then cooled to −11° in an ice-salt bath, and 324 ml. of a solution of diazomethane in methylene chloride is added in such manner that the ratio of diazomethane to methyl deserpidate is 6:1. During the addition the temperature is kept between −7.5° and −11°; stirring is continued for an additional twenty minutes and is then allowed to stand while cooling. After 1½ hours, the reaction mixture is washed with 850 ml. of a 5 percent aqueous sodium carbonate solution and 350 ml. of a saturated aqueous sodium chloride solution, and the aqueous washes are extracted with methylene chloride, the organic extract is combined with the organic reaction solution, and the combined organic solutions are dried over sodium sulfate for 45 minutes. The organic solvent is evaporated, the residue is dissolved in 50 ml. of warm benzene, the insoluble material is filtered off and the filtrate is placed on a column containing 150 g. of aluminum oxide (activity II–III, neutral). The following fractions are collected: 500 ml. of benzene (fraction 1), 3000 ml. of methylene chloride (fractions 2 to 7 at 500 ml. each), 3000 ml. of methylene chloride, containing 0.5 percent of methanol (fractions 8 to 13 at 500 ml. each), 1500 ml. of methanol. Fractions 8 to 13 are combined and recrystallized from diethylether to yield 0.1 g. of methyl 18-O-methyl-deserpidate, M.P. 114–115° C.; [α]$_D^{26}$ = −137° (chloroform).

Methyl deserpidate may be replaced by other lower alkyl deserpidates in the above example, and compounds, such as ethyl 18-O-methyl-deserpidate, n-propyl 18-O-methyl-deserpidate, methyl 18-O-ethyl-deserpidate, methyl 18-n-butyl-deserpidate and the like, are formed upon treatment of the corresponding lower alkyl deserpidates with lower diazo-alkanes according to the procedure of Example 1.

*Example 8*

By reacting a solution of 0.92 g. of 2-methoxyethyl reserpate and 22 ml. of the standard fluoboric acid preparation in methylene chloride with diazomethane as shown in Example 1, the desired 2-methoxyethyl 18-O-methyl-reserpate can be formed.

The starting material may be prepared as follows: To a mixture of 226 g. of a 33 percent aqueous solution of 2-methoxyethylamine and 150 ml. of diethyl ether, kept at 5° to 10° in an ice bath, is added dropwise 54 g. of ethyl chloroformate. 100 g. of a cold 40 percent aqueout solution of sodium hydroxide and a second portion of 54 g. of ethyl chloroformate are given to the mixture, which is stirred for one hour. The ether layer is separated, the aqueous phase is extracted with 100 ml. of diethyl ether, and the two ether solutions are combined and dried over potassium carbonate. The solvent is evaporated under reduced pressure and the ethyl N-(2-methoxyethyl)-carbamate is distilled at 105–106°/17–20 mm.

To a solution of 33 g. of ethyl N-(2-methoxyethyl)-carbamate in 200 ml. of diethyl ether are added 25 g. of cracked ice and a solution of 81 g. of sodium nitrite in 125 ml. of water. While keeping the temperature below 15°, 150 g. of 35 percent aqueous nitric acid is added carefully over a period of one hour. The ether layer is separated, washed with water and aqueous potassium carbonate and then dried over potassium carbonate. The residue, obtained after evaporation of the solvent under reduced pressure, represents the ethyl N-(2-methoxyethyl)-N-nitrosocarbamate, which is used without further purification.

A gently refluxing solution of 5 g. of potassium hydroxide in 15 g. of methanol and 150 ml. of diethyl ether is treated with a solution of 15.5 g. of ethyl N-(2-methoxyethyl)-N-nitroso-carbamate in 50 ml. of diethylether, which is added dropwise over a period of one hour. After refluxing for 5 minutes, 100 ml. of water is added and the yellow ether solution, containing the 2-methoxy-diazoethane, is separated.

The above ether solution of 2-methoxy diazoethane is reacted with small portions of a slurry of reserpic acid in methanol until no further reaction can be observed. A few drops of acetic acid are added, the solution is evaporated under reduced pressure and the residual oil is dissolved in ethyl acetate. Upon addition of petroleum ether a precipitate is formed, which is filtered off, dissolved in methylene chloride, which solution is washed with aqueous ammonia and filtered through a small column containing a diatomaceous earth. The residue, obtained after evaporation of the solvent, is crystallized from ethyl acetate to yield the 2-methoxyethyl reserpate, M.P. 183–185°.

Other compounds which may be prepared according to the previously given procedure by replacing the starting material by other intermediates are, for example, 2-ethoxyethyl 18-O-methyl-reserpate, 2-n-propyloxyethyl 18-O-methyl-reserpate, 2-isopropyloxyethyl 18-O-methyl-reserpate, 3-methoxypropyl 18-O-methyl-reserpate, 2-methoxyethyl 18-O-ethyl-reserpate, 2-methoxyethyl 18-O-n-propyl-reserpate, 2-methoxyethyl 18-O-methyl-deserpidate, 2-methoxyethyl 18-O-ethyl-deserpidate and the like.

*Example 9*

To a solution of 4.55 g. of methyl reserpate in 730 ml. of methylene chloride is given 121 ml. of the concentrated fluoboric acid solution described in Example 1. 150 ml. of an 0.3 molar solution of n-diazobutane is added and the reaction mixture is treated and worked up as shown in Example 1. The resulting methyl 18-O-n-butyl-reserpate is recrystallized from a mixture of benzene and cyclohexane, M.P. 219–221° (with decomposition).

Example 10

A solution of 1.25 g. of methyl 10-methoxy-deserpidate and about 35 ml. of the fluoboric acid preparation described in Example 1 in methylene chloride, when treated with a diazoethane solution in methylene chloride at a temperature below −10° according to the method outlined in Example 1, yields the desired methyl 10-methoxy-18-O-ethyl-desperidate.

Upon treatment with hydrochloric acid according to the method described in Example 6, the methyl 10-methoxy-18-O-ethyl-deserpidate hydrochloride is formed.

Other lower alkyl 18-O-lower alkyl-10-methoxy-deserpidates, such as, for example, methyl 18-O-n-propyl-10-methoxy-deserpidate, methyl 10-methoxy-18-O-n-butyl-deserpidate, ethyl 10-methoxy-18-O-methyl-deserpidate, n-propyl 10-methoxy-18-O-methyl-deserpidate and the like, or the salts thereof, are prepared by treating appropriate lower alkyl 10-methoxy-deserpidates with the desired lower diazo-alkanes according to the method described in detail in Example 1.

Other 18β-etherified hydroxy-17-lower alkoxy-3-epi-allo-yohimbane 16-carboxylic acid esters, which may be prepared according to the method described in Example 1 by selecting the appropriate starting materials, are, for example, lower alkyl 18-O-lower alkyl-5-methyl-reserpates, e.g.
methyl 5-methyl-18-O-methyl-reserpate,
methyl 18-O-ethyl-5-methyl-reserpate,
ethyl 5-methyl-18-O-methyl-reserpate and the like,
lower alkyl 18-O-lower alkyl-5-methyl-deserpidates, e.g.
methyl 5-methyl-18-O-methyl-deserpidate,
methyl 5-methyl-18-O-n-propyl-deserpidate,
ethyl 5-methyl-18-O-methyl-deserpidate and the like,
lower alkyl 18-O-lower alkyl-6-methyl-reserpates, e.g.
methyl 6-methyl-18-O-methyl-reserpate,
methyl 18-O-ethyl-6-methyl-reserpate,
n-propyl 6-methyl-18-O-methyl-reserpate and the like,
lower alkyl 18-O-lower alkyl-9-methyl-deserpidates, e.g.
methyl 9-methyl-18-O-methyl-deserpidate,
methyl 18-O-n-butyl-9-methyl-deserpidate,
ethyl 9-methyl-18-O-methyl-deserpidate and the like,
lower alkyl 18-O-lower alkyl-10-methyl-deserpidates, e.g.
methyl 10-methyl-18-O-methyl-deserpidate,
methyl 18-O-ethyl-10-methyl-deserpidate,
ethyl 10-methyl-18-O-methyl-deserpidate and the like,
lower alkyl 18-O-lower alkyl-11-methyl-deserpidates, e.g.
methyl 11-methyl-18-O-methyl-deserpidate,
methyl-11-methyl-18-O-n-propyl-deserpidate,
n-propyl 11-methyl-18-O-methyl-deserpidate and the like,
lower alkyl 18-O-lower alkyl-9-methoxy-deserpidates, e.g.
methyl 9-methoxy-18-O-methyl-deserpidate,
methyl 18-O-ethyl-9-methoxy-deserpidate,
ethyl 9-methoxy-18-O-methyl-deserpidate and the like,
lower alkoxy 18-O-lower alkyl-10-methoxy-reserpates, e.g.
methyl 10-methoxy-18-O-methyl-reserpate,
methyl 18-O-ethyl-10-methoxy-reserpate,
ethyl 10-methoxy-18-O-methyl-reserpate and the like,
lower alkyl 10-ethoxy-18-O-lower alkyl-deserpidates, e.g.
methyl 10-ethoxy-18-O-methyl-desperpidate,
methyl 10-ethoxy-18-O-n-propyl-deserpidate,
n-propyl 10-ethoxy-18-O-methyl-deserpidate and the like,
lower alkyl 18-O-lower alkyl-12-methoxy-deserpidates, e.g.
methyl 12-methoxy-18-O-methyl-deserpidate,
methyl 18-O-n-butyl-12-methoxy-deserpidate,
n-propyl 12-methoxy-18-O-methyl-deserpidate and the like,
lower alkyl 11-ethoxy-18-O-lower alkyl-deserpidates, e.g.
methyl 11-ethoxy-18-O-methyl-deserpidate,
methyl 11-ethoxy-18-O-ethyl-deserpidate,
ethyl 11-ethoxy-18-O-methyl-deserpidate and the like,
lower alkyl 18-O-lower alkyl-11-n-propyloxy-deserpidates, e.g.
methyl 18-O-methyl-11-n-propyloxy-deserpidate,
methyl 18-O-n-propyl-11-n-propyloxy-deserpidate,
ethyl 18-O-methyl-11-n-propyloxy-deserpidate and the like,
lower alkyl 11-isopropyloxy-18-O-lower alkyl-deserpidates, e.g.
methyl 11-isopropyloxy-18-O-methyl-deserpidate,
methyl 18-O-ethyl-11-isopropyloxy-deserpidate,
n-butyl 11-isopropyloxy-18-O-methyl-deserpidate and the like,
lower alkyl 11-n-butyloxy-18-O-lower alkyl-deserpidates, e.g.
methyl 11-n-butyloxy-18-O-methyl-deserpidate,
methyl 11-n-butyloxy-18-O-ethyl-deserpidate,
ethyl 11-n-butyloxy-18-O-methyl-deserpidate and the like,
lower alkyl 9,10-dimethoxy-18-O-lower alkyl-reserpates, e.g.
methyl 9,10-dimethoxy-18-O-methyl-reserpate,
methyl 9,10-dimethoxy-18-O-n-propyl-reserpate,
n-butyl 9,10-dimethoxy-18-O-methyl-reserpate and the like,
lower alkyl 18-O-lower alkyl-10,11-methylenedioxy-deserpidates, e.g.
methyl 18-O-methyl-10,11-methylenedioxy-deserpidate,
methyl 18-O-ethyl-10,11-methylenedioxy-deserpidate,
ethyl 18-O-methyl-10,11-methylenedioxy-deserpidate and the like,
lower alkyl 10-benzyloxy-18-O-lower alkyl-deserpidates, e.g.
methyl 10-benzyloxy-18-O-methyl-deserpidate,
methyl 10-benzyloxy-18-O-ethyl-deserpidate,
n-propyl 10-benzyloxy-18-O-methyl-deserpidate and the like,
lower alkyl 11-benzyloxy-18-O-lower alkyl-deserpidates, e.g.
methyl 11-benzyloxy-18-O-methyl-deserpidate,
methyl 11-benzyloxy-18-O-ethyl-deserpidate,
ethyl 11-benzyloxy-18-O-methyl-deserpidate and the like,
lower alkyl 18-O-lower alkyl-10-methylmercapto-deserpidates, e.g.
methyl 18-O-methyl-10-methylmercapto-deserpidate,
methyl 10-methylmercapto-18-O-n-propyl-deserpidate,
ethyl 18-O-methyl-10-methylmercapto-deserpidate and the like,
lower alkyl 18-O-lower alkyl-10-methylmercapto-deserpidates, e.g.
methyl 18-O-methyl-11-methylmercapto-deserpidate,
n-propyl 18-O-methyl-11-methylmercapto-deserpidate and the like,
lower alkyl 11-ethylmercapto-18-O-lower alkyl-deserpidates, e.g.
methyl 11-ethylmercapto-18-O-methyl-deserpidate,
methyl 11-ethylmercapto-18-O-n-propyl-deserpidate,
ethyl 11-ethylmercapto-18-O-methyl-deserpidate and the like,
lower alkyl 10-fluoro-18-O-lower alkyl-deserpidates, e.g.
methyl 10-fluoro-18-O-methyl-deserpidate,
ethyl 10-fluoro-18-O-methyl-deserpidate,
ethyl 10-fluoro-18-O-n-propyl-deserpidate and the like,
lower alkyl 10-chloro-18-O-lower alkyl-deserpidates, e.g.
methyl 10-chloro-18-O-methyl-deserpidate,
methyl 10-chloro-18-O-n-propyl-deserpidate,
isopropyl 10-chloro-18-O-methyl-deserpidate and the like,
lower alkyl 10-bromo-18-O-lower alkyl-reserpates, e.g.
methyl 10-bromo-18-O-methyl-reserpate,
methyl 10-bromo-18-O-n-butyl-reserpate,
ethyl 10-bromo-18-O-methyl-reserpate and the like,
lower alkyl 17α-desmethoxy-17α-ethoxy-18-O-lower alkyl-reserpates, e.g.
methyl 17α-desmethoxy-17α-ethoxy-18-O-methyl-reserpate,
methyl 17α-desmethoxy-17α-ethoxy-18-O-n-propyl-reserpate,
n-propyl 17α-desmethoxy-17α-ethoxy-18-O-methyl-reserpate and the like,
lower alkyl 17α-desmethoxy-18-O-lower alkyl-17α-n-propyloxy-reserpates, e.g.

methyl 17α-desmethoxy-18-O-methyl-17α-n-propyloxy-reserpate,
ethyl 17α-desmethoxy-18-O-methyl-17α-n-propyloxy-reserpate and the like,
lower alkyl 17α-desmethoxy-17α-isopropyloxy-18-O-lower alkyl-reserpates, e.g.
methyl 17α-desmethoxy-17α-isopropyloxy-18-O-methyl-reserpate,
methyl 17α-desmethoxy-18-O-ethyl-17α-isopropyloxy-reserpate and the like,
lower alkyl 17α-desmethoxy-17α-ethoxy-18-O-lower alkyl-deserpidates, e.g.
methyl 17α-desmethoxy-17α-ethoxy-18-O-methyl-deserpidate,
methyl 17α-desmethoxy-17α-ethoxy-18-O-isobutyl-deserpidate,
ethyl 17α-desmethoxy-17α-ethoxy-18-O-methyl-deserpidate and the like,
lower alkyl 17α-cyano-17α-desmethoxy-18-O-lower alkyl-reserpates, e.g.
methyl 17α-cyano-17α-desmethoxy-18-O-methyl-reserpate,
methyl 17α-cyano-17α-desmethoxy-18-O-n-propyl-reserpate,
n-propyl 17α-cyano-17α-desmethoxy-18-O-methyl-reserpate and the like,
lower alkyl 17α-cyano-17α-desmethoxy-18-O-lower alkyl-deserpidates, e.g.
methyl 17α-cyano-17α-desmethoxy-18-O-methyl-deserpidate,
methyl 17α-cyano-17α-desmethoxy-18-O-ethyl-deserpidate,
ethyl 17α-cyano-17α-desmethoxy-18-O-methyl-deserpidate and the like,
and acid addition salts thereof.

*Example 11*

To a solution of 1.2 g. of methyl 18-epi-reserpate in 400 ml. of methylene chloride is added 5 ml. of the stock fluoboric acid solution described in Example 1. The reaction mixture is kept at a temperature of about −10° and a solution of an excess of diazobutane in methylene chloride is added. The reaction mixture is worked up as shown in Example 1, and the resulting methyl 18-epi-O-n-butyl-reserpate is obtained, which melts at 224–226° (decomposition).

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield: 5.64 g.

A mixture of 6.34 g. of methyl 18-O-(4-bromo-phenyl-sulfonyl)-reserpate, 100 ml. of water, 300 ml. of p-dioxane and 1.2 g. of N,N,N-triethylamine is heated on the steam-bath for 41 hours under an atmosphere of nitrogen. The organic solvent is evaporated under reduced pressure, during which operation a precipitate is formed, which is filtered off and dissolved in methylene chloride. The resulting organic solution is extracted with several portions of 5 percent aqueous hydrochloric acid until the acidic extracts no longer given a precipitate on addition of ammonium hydroxide. The combined precipitates, resulting from the treatment of the acidic extracts with aqueous ammonia, are washed with water and dried to yield 2.73 g. of methyl 18-epi-reserpate monohydrate, M.P. 220–222° (decomposition). Upon drying at 140° under reduced pressure, the above hydrate can be converted into the solvent-free methyl 18-epi-reserpate, M.P. 220–222°, $[\alpha]_D^{25} = -80.5°$ (in chloroform).

By replacing in the above procedure the methyl reserpate used for the preparation of the starting material by other 18β-hydroxy-3-epi-allo-yohimbane 16-carboxylic acid esters, particularly other 18β-hydroxy-3-epi-allo-yohimbane 16β-carboxylic acid esters and treating them with a reactive derivative of organic sulfonic acid, e.g. 4-bromo-benzene sulfonyl chloride, or any other suitable benzene sulfonyl halide, such as 4-nitro-benzene sulfonyl chloride and the like, and hydrolyzing resulting 18β-carbocyclic aryl-sulfonyloxy - 3 - epi - allo - yohimbane 16-carboxylic acid esters with water preferably in the presence of an organic tertiary amine, e.g. N,N,N-triethylamine and the like, 18α-hydroxy-3-epi-allo-yohimbane 16-carboxylic acid esters, particularly 18α-hydroxy-17α-lower alkoxy-3-epi-allo-yohimbane 16β-carboxylic acid esters other than methyl 18-epi-reserpate can be obtained. From these esters, additional 18α-etherified hydroxy-3-epi-allo-yohimbane 16-carboxylic acid esters can be prepared according to the above procedure, for example, methyl 18-epi-O-ethyl-reserpate, methyl 18-epi-O-n-propyl-reserpate, ethyl 18-epi-O-methyl-reserpate, n-propyl 18-epi-O-methyl-reserpate, n-propyl 18-epi-O-ethyl-reserpate, isopropyl 18-epi-O-methyl-reserpate, n-butyl 18-epi O-methyl-reserpate, methyl 18 - epi-O-methyl-deserpidate, methyl 18-epi-O-ethyl-deserpidate, methyl 10-methoxy-18-epi-O-methyl-deserpidate and the like.

*Example 12*

A mixture of 1.9 g. of methyl 18-O-(4-bromo-phenyl-sulfonyl)-reserpate, 0.36 g. of N,N,N-triethylamine and 240 ml. of methanol is sealed in a thick-walled hydrogenation bottle after squirting with nitrogen. The reaction mixture is heated on the steam-bath for 21 hours; the light yellow solution is evaporated, the residue is extracted into methylene chloride, and the organic solution is washed with a 5 percent aqueous sodium carbonate solution and subsequently with a saturated aqueous sodium chloride solution, and is then dried and evaporated to yield a tan solid, which is muddled with diethyl ether. The latter is dissolved in a 1:2-mixture of benzene and cyclohexane, the solution is passed through charcoal, and the filtrate is evaporated to a small volume, whereupon crystallization occurs. The resulting methyl 18-epi-O-methyl-reserpate melts at 241–244° (with decomposition); yield: 0.86 g.

The starting material used in the above procedure may be prepared as shown in Example 11.

Other 18α-etherified hydroxy-3-epi-allo-yohimbane 16β-carboxylic acid esters which may be prepared according to the above procedure by selecting the appropriate starting materials, are, for example,
lower alkyl-18-epi-O-lower alkyl-5-methyl-reserpates, e.g.
methyl 5-methyl-18-epi-O-methyl-reserpates,
methyl-18-epi-O-ethyl-5-methyl-reserpate,
ethyl-5-methyl-18-epi-O-n-propyl-reserpate and the like,
lower alkyl 18-epi-O-lower alkyl-5-methyl-deserpidates, e.g.
methyl 5-methyl-18-epi-O-methyl-deserpidate,
methyl 5-methyl-18-epi-O-n-propyl-deserpidate,
ethyl 18-epi-O-ethyl-5-methyl-deserpidate and the like,
lower alkyl 18-epi-O-lower alkyl-6-methyl-reserpates, e.g.
methyl 6-methyl-18-epi-O-methyl-reserpate,
methyl 18-epi-O-ethyl-6-methyl-reserpate,
n-propyl 18-epi-O-methyl-6-methyl-reserpate and the like,
lower alkyl 18-epi-O-lower alkyl-9-methyl-deserpidates, e.g.
methyl 9-methyl-18-epi-O-methyl-deserpidate,
methyl 18-epi-isopropyl-9-methyl-deserpidate,
ethyl 9-methyl-18-epi-O-methyl-deserpidate and the like,
lower alkyl 10-methyl-18-epi-O-lower alkyl-deserpidates, e.g.
methyl 10-methyl-18-epi-O-methyl-deserpidate, methyl 18-epi-O-ethyl-10-methyl-18-epi-O-isopropyl-deserpidate and the like,
lower alkyl 18-epi-O-lower alkyl-11-methyl-deserpidates, e.g.
methyl 11-methyl-18-epi-O-methyl-deserpidate,
methyl 11-methyl-18-epi-O-n-propyl-deserpidate,
n-propyl 11-methyl-18-epi-O-methyl-deserpidate and the like,
lower alkyl 18-epi-O-lower alkyl-9-methoxy-deserpidates, e.g.
methyl 9-methoxy-18-epi-O-methyl-deserpidate,
methyl 18-epi O-ethyl-9-methoxy-deserpidate,
ethyl 18-epi-O-isopropyl-9-methoxy-deserpidate and the like,
lower alkyl 18-epi-O-lower alkyl-10-methoxy-reserpates, e.g.
methyl 10-methoxy-18-epi-O-methyl-reserpate,
methyl 18-epi-O-ethyl-10-methoxy-reserpate,
ethyl 10-methoxy-18-epi-O-n-propyl-reserpate and the like,
lower alkyl 9,10-dimethoxy-18-epi-O-lower alkyl-reserpates, e.g.
methyl 9,10-dimethoxy-18-epi-O-methyl-reserpate,
methyl 9,10-dimethoxy-18-epi-O-ethyl-reserpate,
ethyl 9,10-dimethoxy-18-epi-O-n-propyl-reserpate and the like,
lower alkyl 10-ethoxy-18-epi-O-lower alkyl-deserpidates, e.g.
methyl 10-ethoxy-18-epi-O-methyl-deserpidate,
methyl 10-ethoxy-18-epi-O-n-propyl-deserpidate,
n-propyl 10-ethoxy-18-epi-O-ethyl-deserpidate and the like,
lower alkyl 11-ethoxy-18-epi-O-lower alkyl-deserpidates, e.g.
methyl 11-ethoxy-18-epi-O-methyl-deserpidate,
methyl 11-ethoxy-18-epi-O-ethyl-deserpidate,
ethyl 11-ethoxy-18-epi-O-n-butyl-deserpidate and the like,
lower alkyl 18-epi-O-lower alkyl-11-n-propyloxy-deserpidates, e.g.
methyl 18-epi-O-methyl-11-n-propyloxy-deserpidate,
methyl 18-epi-O-n-propyl-11-n-propyloxy-deserpidate,
ethyl 18-epi-O-ethyl-11-n-propyloxy-deserpidate and the like,
lower alkyl 11-isopropyloxy-18-epi-O-lower alkyl-deserpidates, e.g.
methyl 11-isopropyloxy-18-epi-O-methyl-deserpidate,
methyl 18-epi-O-ethyl-11-isopropyloxy-deserpidate,
n-butyl 11-isopropyloxy-18-epi-O-methyl-deserpidate and the like,
lower alkyl 11-n-butyloxy-18-epi-O-lower alkyl-deserpidates, e.g.
methyl 11-n-butloxy-18-epi-O-methyl-deserpidate,
methyl 11-n-butyloxy-18-epi-O-ethyl-deserpidate,
ethyl 11-n-butyloxy-18-epi-O-methyl-deserpidate and the like,
lower alkyl 18-epi-O-lower alkyl - 12 - methoxy-deserpidates, e.g.
methyl 12-methoxy-18-epi-O-methyl-deserpidate,
methyl 18-epi-O-ethyl-12-methoxy-deserpidate,
n-propyl 12-methoxy-18-epi-O-methyl-deserpidate and the like,
lower alkyl 18-epi-O-lower alkyl-10,11-methylenedioxy-deserpidates, e.g.
methyl 18-epi-O-methyl-10,11-methylenedioxy-deserpidate,
methyl 18-epi-O-ethyl-10,11-methylenedioxy-deserpidate,
n-propyl 18-epi-O-ethyl-10,11-methylenedioxy-deserpidate and the like,
lower alkyl 10-benzyloxy-18-epi-O-lower alkyl-deserpidates, e.g.
methyl 10-benzyloxy-18-epi-O-methyl-deserpidate,
methyl 10-benzyloxy-18-epi-O-ethyl-deserpidate,
n-propyl 10-benzyloxy-18-epi-O-methyl-deserpidate and the like,
lower alkyl 11-benzyloxy-18-epi-O-lower alkyl-deserpidates, e.g.
methyl 11-benzloxy-18-epi-O-methyl-deserpidate,
methyl 11-benzyl-oxy-18-epi-O-ethyl-deserpidate,
ethyl 11-benzyloxy-18-epi-O-methyl-deserpidate and the like,
lower alkyl 18-epi-O-lower alkyl-10-methylmercapto-deserpidates, e.g.
methyl 18-epi-O-methyl-10-methylmercapto-deserpidate,
methyl 18-epi-O-ethyl-10-methylmercapto-deserpidate,
ethyl 18-epi-O-ethyl-10-methylmercapto-deserpidate and the like,
lower alkyl 18-epi-O-lower alkyl-11-methylmercapto-deserpidates, e.g.
methyl 18-epi-O-methyl-11-methylmercapto-deserpidate,
methyl 18-epi-O-ethyl-11-methylmercapto-deserpidate,
n-propyl 18-epi-O-methyl-11-methylmercapto-deserpidate and the like,
lower alkyl 11-ethylmercapto-18-epi-O-lower alkyl-deserpidates, e.g.
methyl 11-ethylmercapto-18-epi-O-methyl-deserpidate,
methyl 11-ethylmercapto-18-epi-O-n-propyl-deserpidate,
ethyl 11-ethylmercapto-18-epi-O-n-propyl-deserpidate and the like,
lower alkyl 10-chloro-18-epi-O-lower alkyl-deserpidates, e.g.
methyl 10-chloro-18-epi-O-methyl-deserpidate,
methyl 10-chloro-18-epi-O-n-propyl-deserpidate,
isopropyl 10-chloro-18-epi-O-methyl-deserpidate and the like,
lower alkyl 10-bromo-18-epi-O-lower alkyl reserpates, e.g.
methyl 10-bromo-18-epi-O-methyl-reserpate,
methyl 10-bromo-18-epi-O-ethyl-reserpate,
ethyl 10-bromo-18-epi-O-methyl-reserpate and the like,
lower alkyl 11-fluoro-18-epi-O-lower alkyl-deserpidates, e.g.
methyl 11-fluoro-18-epi-O-methyl-deserpidate,
methyl 18-epi-O-ethyl-11-fluoro-deserpidate,
n-propyl 11-fluoro-18-epi-O-n-propyl-deserpidate,
lower alkyl 17α-desmethoxy-17α-ethoxy-18-epi-O-lower alkyl-reserpates, e.g.
methyl 17α-desmethoxy-17α-ethoxy-18-epi-O-methyl-reserpate,
methyl 17α-desmethoxy-17α-ethoxy-18-epi-O-ethyl-reserpate,
n-propyl 17α-desmethoxy-17α-ethoxy-18-epi-O-methyl-reserpate and the like,
lower alkyl 17α-desmethoxy-18-epi-O-lower alkyl-17α-n-propyloxy-reserpates, e.g.
methyl 17α-desmethoxy-18-epi-O-methyl-17α-n-propyloxy-reserpate,
methyl 17α-desmethoxy-18-epi-O-n-propyl-17α-n-propyloxy-reserpate,
ethyl 17α-desmethoxy-18-epi-O-ethyl-17α-n-propyloxy-reserpate and the like,
lower alkyl 17α-desmethoxy-17α-isopropyloxy-18-epi-O-lower alkyl-reserpates, e.g.
methyl 17α-desmethoxy-17α-isopropyloxy-18-epi-O-methyl-reserpate,
methyl 17α-desmethoxy-18-epi-O-ethyl-17α-isopropyloxy-reserpate,
ethyl 17α-desmethoxy-18-epi-O-ethyl-17α-isopropyloxy-reserpate and the like,
lower alkyl 17α-desmethoxy-17α-ethoxy-18-epi-O-lower alkyl-deserpidates, e.g.
methyl 17α-desmethoxy-17α-ethoxy-18-epi-O-methyl-deserpidate,
methyl 17α-desmethoxy-17α-ethoxy-18-epi-O-propyl-deserpidate,
ethyl 17α-desmethoxy-17α-ethoxy-18-epi-O-methyl-deserpidate and the like,
lower alkyl 17α-cyano-17α-desmethoxy-18-epi-O-lower alkyl-reserpates, e.g.

methyl 17α-cyano-17a-desmethoxy-18-epi-O-methyl-
reserpate,
methyl 17α-cyano-17α-desmethoxy-18-epi-O-ethyl-reser-
pate,
ethyl 17a-cyano-17α-desmethoxy-18-epi-O-n-propyl-
reserpate and the like,
lower alkyl 17α-cyano-17α-desmethoxy-18-epi-O-lower
alkyl-deserpidates, e.g.
methyl 17α-cyano-17α-desmethoxy-18-epi-O-methyl-
deserpidate,
methyl 17α-cyano-17α-desmethoxy-18-epi-O-ethyl-
deserpidate,
ethyl 17α-cyano-17α-desmethoxy-18-epi-O-n-propyl-
deserpidate and the like, as well as acid addition salts, such as, for example, the hydrochlorides and the like, thereof.

Example 13

To a solution of 6.35 g. of methyl 18-epi-O-methyl-reserpate in 100 ml. of acetone is added a solution of 1.4 ml. of concentrated hydrochloric acid in 16 ml. of acetone. A gel-like material precipitates immediately, which on scratching becomes crystalline. The mixture is chilled in an ice-bath for thirty minutes, the solid material is filtered off and washed with cold acetone to yield the desired methyl 18 - epi-O-methyl-reserpate hydrochloride, M.P. 239–242° (decomposition).

Example 14

A solution of 0.43 g. of methyl 18-O-methyl-reserpate in 40 ml. of methylene chloride is cooled to 0°, and, while stirring, 3 ml. of 0.339 M perbenzoic acid is chloroform is added over a period of seven minutes. The cold, pink solution is stirred for an additional fifteen minutes in an ice-bath, then extracted twice with a cold five percent aqueous sodium carbonate solution and washed with a saturated aqueous sodium chloride solution. The organic layer is separated, dried over sodium sulfate and evaporated to dryness under reduced pressure. The residue is dissolved in methylene chloride, and the solution is placed on a column of aluminum oxide (Woelm, neutral, activity II–III). The column is washed with methylene chloride and the product is eluted with methylene chloride containing one percent of methanol. The solvent is evaporated, and the residue is triturated with acetone to yield 0.11 g. of crystalline material, which is recrystallized by dissolving it in methylene chloride, adding acetone and evaporating most of the methylene chloride. The white, crystalline methyl 18-O-methyl-reserpate N-oxide melts at 238° with decomposition.

Upon treatment of the methyl 18-O-methyl-reserpate N-oxide with hydrochloric acid as shown in Example 6, the desired 18-O-methyl-reserpate N-oxide hydrochloride can be prepared.

The methyl 18-O-ethyl-reserpate N-oxide may be prepared by reacting methyl 18-O-ethyl-reserpate with perbenzoic acid according to the procedure described hereinbefore; the resulting free compound may be converted into the methyl 18-O-ethyl-reserpate N-oxide hydrochloride by treatment with hydrochloric acid in an appropriate solvent, as, for example, described in Example 13.

Example 15

To a solution of 0.8 g. of benzyl reserpate in 100 ml. of methylene chloride is added 20 ml. of the standard fluoboric acid preparation (described in Example 1) and then an excess of diazomethane (using a methylene chloride solution of the reagent). The reaction mixture is kept at temperatures below −10° and is worked up according to the procedure of Example 1 to yield the desired benzyl 18-O-methyl-reserpate.

The benzyl 18-epi-O-methyl-reserpate may be obtained, for example, by reacting a mixture of benzyl 18-epi-reserpate, fluoboric acid and diazomethane in an appropriate inert solvent according to the previously given procedure.

Example 16

A solution of 2.58 g. of methyl 18-epi-reserpate monohydrate in 700 ml. of methylene chloride is cooled to −10° and 90 ml. of an 0.1 M stock solution of fluoboric acid is added (the latter is prepared by concentrating commercial 50 percent fluoboric acid to a concentration of about 14 M and diluting the concentrate with the appropriate quantity of an 11:3-mixture of absolute diethyl ether and methylene chloride). The turbid solution is cooled to −12° and 135 ml. of an 0.265 M solution of diazomethane in methylene chloride is added over a period of seven minutes and while stirring. The reaction mixture is stirred for an additional 15 minutes, a small amount of glacial acetic acid is added to destroy the excess of diazomethane, and the solution is then washed twice with 5 percent aqueous sodium carbonate and one with a saturated aqueous solution of sodium chloride. The organic layer is separated, dried over anhydrous sodium sulfate and evaporated under reduced pressure. The residue contains about 20 to 30 percent of the desired methyl 18-epi-O-methyl-reserpate. The identity of the product with the methyl 18-epi-O-methyl-reserpate, prepared according to the procedure of Example 12 is established paper chromatographically: The $Rf$-value of methyl 18-epi-O-methyl-reserpate on paper impregnated with a 1:1-mixture of formamide (adjusted to pH 5.6 with benzoic acid) and methanol, using chloroform as the mobile phase, is $Rf=0.45$, with chloroform containing 10 percent pyridine as the mobile phase, $Rf=0.80$, and with a 1:1-mixture of chloroform and benzene as the mobile phase, $Rf=0.15$, as compared with $Rf=0.13$, $Rf=0.55$ and $Rf=0.04$ in the respective systems for methyl 18-epi-reserpate used as the starting material.

Example 17

A mixture of 3.17 g. of methyl 18-O-(4-bromo-phenylsulfonyl)-reserpate, 0.6 g. of N,N,N-triethylamine and 240 ml. of absolute ethanol is heated in a sealed vessel on the steam bath for five days while maintaining a nitrogen atmosphere and stirring. The solvent is evaporated under reduced pressure, the residue is dissolved in methylene chloride and the solution is washed twice with a five percent aqueous solution of sodium carbonate and once with a saturated aqueous solution of sodium chloride. The organic solution is dried, the solvent is evaporated, the residue is triturated with diethyl ether and the organic solvent is evaporated to leave 2.01 g. of crude methyl 18--epi-O-ethyl-reserpate. The crude product is recrystallized several times from a mixture of benzene and cyclohexane and melts at 229–230° (decomposition); $[\alpha]_D^{26}=$ −27° (chloroform).

Example 18

To a solution of 0.88 g. of methyl 18-epi-O-ethyl-reserpate in 15 ml. of acetone is added a solution of 0.2 ml. of concentrated hydrochloric acid in 2.2 ml. of acetone. A crystalline product is obtained on scratching; the slurry is chilled and the methyl 18-O-ethyl-reserpate hydrochloride is obtained in white plates, which are filtered off and washed with cold acetone, M.P. 233–235° (decomposition).

Example 19

A mixture of 5.56 g. of methyl 18-O-(4-bromo-phenylsulfonyl)-reserpate, 0.90 g. of N,N,N-triethylamine and 250 ml. of n-propanol is refluxed in a nitrogen atmosphere for 95 hours. After evaporating the solvent the reaction mixture is worked up as shown in Example 17 to yield the desired methyl 18-epi-O-n-propyl-reserpate, which melts at 223–235° (decomposition) after recrystallization from a mixture of benzene and cyclohexane; $[\alpha]_D^{29}=-26°$ (chloroform).

Example 20

A total of 0.91 g. of methyl 18-epi-O-n-propyl-reserpate is dissolved in 25 ml. of 0.1 N aqueous hydrochloric acid; the solution is frozen and lyophilized to yield the semi-crystalline methyl 18-epi-O-n-propyl-reserpate hydrochloride, which crystallizes as the dihydrate, M.P. 213–223° (decomposition).

Example 21

A mixture of 5.56 g. of methyl 18-O-(4-bromo-phenylsulfonyl)-reserpate, 0.9 g. of N,N,N-triethylamine and 240 ml. of isopropanol is heated for thirteen days in a sealed vessel at 100° while stirring. The reaction mixture is worked up as shown in Example 17 to yield the methyl 18-epi-O-isopropyl-reserpate, which melts at 225–229° (decomposition) after recrystallization from a mixture of benzene and cyclohexane; $[\alpha]_D^{24}=-23°$ (chloroform).

The hydrochloride, which is prepared according to the lyophilization procedure of Example 20, crystallizes with 1½ moles of water, M.P. 224–228° (decomposition).

Example 22

A mixture of 5.56 g. of methyl 18-O-(4-bromo-phenylsulfonyl)-reserpate, 0.9 g. of N,N,N-triethylamine and 333 ml. of n-butanol is refluxed under an atmosphere of nitrogen for 15½ hours. The reaction mixture is worked up according to the method described in Example 17 to yield the methyl 18-epi-O-n-butyl-reserpate, which melts at 224–226° (decomposition) after recrystallizations from the mixture of benzene and cyclohexane;

$$[\alpha]_D^{25}=-18° \text{ (chloroform)}$$

The hydrochloride, M.P. 220–225° (decomposition) is prepared according to the lyophilization procedure described in Example 20 and crystallizes with 1½ moles of water.

Example 23

A mixture of 3.17 g. of methyl 18-O-(4-bromo-phenylsulfonyl)-reserpate, 0.6 ml. of N,N,N,-triethylamine and 10 ml. of benzyl alcohol is heated at 100° for four days while maintaining a nitrogen atmosphere. The benzyl alcohol is evaporated under reduced pressure, the residue is taken up in methylene chloride, which solution is washed with an aqueous solution of sodium carbonate and a saturated solution of sodium chloride, dried and then evaporated. The oily residue is crystallized by stirring with diethyl ether. The solid material is separated by filtration, is washed with diethyl ether and recrystallized from 95 percent ethanol to yield methyl 18-epi-O-benzyl-reserpate, which melts at 225–226° (decomposition) after recrystallization from a mixture of benzene and cyclohexane; $[\alpha]_D^{25}=+12°$ (chloroform).

Example 24

A mixture of 4.75 g. of methyl 18-O-(4-bromo-phenylsulfonyl)-reserpate, 0.9 g. N,N,N-triethylamine, 50 ml. of ethylene glycol and 50 ml. of p-dioxane (purified by filtration through a column of aluminum oxide, basic, Woelm activity I) is heated at 100° in a nitrogen atmosphere while stirring at 100° for a period of 4½ days. The dioxane is evaporated under reduced pressure, and the remaining solution is taken up in methylene chloride. The organic solution is washed several times with 300 ml. portions of dilute (about 3 percent) aqueous sodium carbonate, with water and with saturated aqueous sodium chloride. On evaporation of the solvents an amorphous residue which crystallizes upon stirring with diethyl ether. The solid material is filtered off, washed with diethyl ether and recrystallized from acetonitrile to yield the methyl 18-epi-O-(2-hydroxyethyl)-reserpate, M.P. 237–239° (decomposition); $[\alpha]_D^{25}=-26°$ (chloroform).

The hydrochloride of methyl 18-epi-O-(2-hydroxyethyl)-reserpate, prepared according to the procedure of Example 18, melts at 220–226° (decomposition) and crystallized from the acetone solution as the hemihydrate.

Example 25

A mixture of 4.75 g. of methyl 18-O-(4-bromo-phenylsulfonyl)-reserpate, 0.90 g. of N,N,N-triethylamine and 370 ml. of n-pentanol is refluxed for 24 hours in an atmosphere of nitrogen and then worked up as shown in Example 17. The residue obtained from the methylene chloride solution is triturated with diethyl ether, the solid material is filtered off, and washed with diethyl ether to yield methyl 18-epi-O-n-pentyl-reserpate, M.P. 231–233° (decomposition); $[\alpha]_D^{25}=-15°$ (chloroform).

Example 26

0.97 g. of methyl 18-epi-O-n-pentyl-reserpate is dissolved as completely as possible in 100 ml. of 0.1 N aqueous hydrochloric acid, the insoluble material is filtered off, and the solution is freeze-dried to yield methyl 18-epi-O-n-pentyl-reserpate hydrochloride, which melts at 222–224° (decomposition) and crystallizes with 1½ moles of water.

Example 27

A mixture of 4.75 g. of methyl 18-O-(4-bromo-phenylsulfonyl)-reserpate, 0.9 g. of N,N,N-triethylamine and 310 ml. of isobutanol is refluxed for four days; the reaction is worked up as shown in Example 17 to yield the methyl 18-epi-O-isobutyl-reserpate, which melts at 234–236° (decomposition); $[\alpha]_D^{25}=-18°$ (chloroform).

The hydrochloride is prepared according to the lyophilization procedure described in Example 20 and is obtained as the monohydrate, M.P. 215–224° (decomposition).

Example 28

A mixture of 0.1 g. of methyl 18-O-(4-nitro-phenylsulfonyl)-reserpate, 0.02 g. of N,N,N-triethylamine and 25 ml. of methanol is heated at 100 ml. in a sealed vessel for 17½ hours; the reaction mixture is worked up as shown in Example 17 to yield the methyl 18-epi-O-methyl-reserpate, M.P. 239–241° (decomposition). The product is identical with the compound described according to the procedure of Example 12.

The starting material is prepared as follows: A mixture of 4.14 g. of methyl reserpate, 5.2 g. of 4-nitrobenzene sulfonyl chloride and 17 ml. of pyridine is allowed to stand at room temperature for three days and is then poured into 200 ml. of ice-water. The aqueous mixture is extracted twice with methylene chloride, the organic extracts are washed with cold aqueous sodium bicarbonate and with saturated aqueous sodium chloride and then evaporated under reduced pressure after drying. The residue is dissolved in methylene chloride, the solution is filtered through a column containing a diatomaceous earth preparation and further elution with methylene chloride yields the crude methyl 18-O-(4-nitro-phenyl-sulfonyl)-reserpate. The pure compound melts at 202–204° (decomposition) after recrystallization from acetonitrile.

Example 29

A mixture of 0.64 g. of methyl 18-epi-O-(4-bromophenyl-sulfonyl)-reserpate and 50 ml. of methanol is heated at 100° in a sealed vessel for seven days. The solvent is evaporated, the residue is dissolved as completely as possible in methylene chloride, and the solid material is removed after shaking with a 5 percent aqueous solution of sodium carbonate. The organic solution is washed with saturated aqueous sodium chloride and then evaporated; the residue is taken up in methylene chloride, which solution is passed through a column containing a diatomaceous earth preparation. The column is eluted with methylene chloride and methylene chloride containing 5 percent methanol. The combined eluted product is recrystallized from a mixture of benzene and cyclohexane. The first crystalline crop is discarded, the filtrate is concentrated to yield a small amount of methyl 18-O-methyl-reserpate, M.P. 224–228°. The slightly impure product is identical with the compound prepared according to the procedure of Example 1.

The starting material may be prepared as follows: To a solution of 4.32 g. of methyl 18-epi-reserpate in 50 ml. of pyridine is added 6.7 g. of 4-bromo-benzene sulfonyl chloride. After warming to ensure complete solution, the reaction mixture is cooled and allowed to stand for three days and is then poured into 80 ml. of cold water. The organic material is extracted with methylene chloride, the organic solution is washed with a five percent aqueous solution of sodium carbonate and a saturated sodium chloride solution and evaporated under reduced pressure at a temperature below 50°. The residue is washed with acetonitrile to yield the methyl 18-epi-O-(4-bromo-phenyl)-sulfonyl-reserpate, which is purified by recrystallization from acetonitrile, M.P. 210–212° (decomposition); $[\alpha]_D^{26} = -33°$ (chloroform).

*Example 30*

To a solution of 0.75 g. of methyl 18-O-methyl-$\Delta^3$-dehydro-reserpate, in which the double bond probably extends from the 3-position to the 14-position, in a mixture of 8 ml. of tetrahydrofuran, 8 ml. of acetone and 7.2 ml. of water are added 0.8 ml. of concentrated perchloric acid of about 70 percent strength and then 0.7 g. of powdered zinc. The mixture is refluxed while constantly stirring for fifteen minutes under an atmosphere of nitrogen, and then evaporated to dryness under reduced pressure. The oily residue is dissolved in 20 ml. of a 3:2-mixture of acetone and water, the solution is made basic with aqueous ammonia and the organic solvent is evaporated off. 25 ml. of water is added, the organic material is extracted with methylene chloride and the organic solution is dried over sodium sulfate and then evaporated to dryness to leave 0.72 g. of a foamy material.

The residue is chromatographed on 20 g. of alumina (Woelm, neutral, activity II to III). The following fractions are collected and each of the fractions subjected to paper chromatography in the system chloroform/formamide to determine the identity of the various fractions:

| Fraction | Solvent | Amount, grams | Rf-value |
| --- | --- | --- | --- |
| 1 | 50 ml. of benzene | 0.200 | 0.15(trace). 0.83(trace). 0.90 |
| 2 | do | 0.025 | 0.15(trace). 0.83 |
| 3 | 50 ml. of methylene chloride | 0.160 | 0.15(trace). 0.83 |
| 4 | do | 0.080 | 0.83. |
| 5 | do | 0.060 | 0.83. |
| 6 | do | 0.010 | 0.83. |
| 7 | 150 ml. of methylene chloride, containing 0.5 percent of methanol. | 0.160 | 0.83. |
| 8 | 100 ml. of methanol | 0.030 | 0.00 and impurities. |

Fractions 2 to 7 inclusive are combined and dissolved in a hot 1:3 mixture of benzene and cyclohexane, and the solution is concentrated until crystalline material is formed. A first crop of 0.35 g. representing methyl 18-O-methyl-reserpate melts at 230–233° and has a rotation of $[\alpha]_D^{25} = -108°$. The infrared absorption curve is identical with the one of methyl 18-O-methyl-reserpate prepared according to the procedure described in Example 1. The ultraviolet absorption spectrum in ethanol shows the following characteristic bands (values given in m$\mu$): $\lambda_{max.}$ at 226–228 ($\epsilon$=34,350), 270–272 ($\epsilon$=4960) and 296–299 ($\epsilon$=6200); $\lambda_{shoulder}$ at 264 ($\epsilon$=4710); $\lambda_{min.}$ 252 ($\epsilon$=3620) and 281–282 ($\epsilon$=4120).

The starting material may be prepared by treating methyl 3-oxo-2,3-seco-reserpate with diazomethane in the presence of a fluoboric acid preparation described in Example 1 and treating the resulting methyl 18-O-methyl-3-oxo-2,3-seco-reserpate with phosphorus oxychloride. A mixture of the resulting salt in dilute acetic acid is made basic with aqueous ammonia, the yellow precipitate is extracted with methylene chloride, the organic solution is dried over sodium sulfate and evaporated to dryness to yield the desired methyl 18-O-methyl-$\Delta^3$-dehydro-reserpate, in which the double bond probably extends from the 3-position to the 14-position, as a foam, which is directly used in the above reaction. A small amount is recrystallized from ethyl acetate, M.P. 201–205°; it has a rotation of $[\alpha]_D^{25°} + 122 \pm 10$, and the ultraviolet absorption spectrum shows the following characteristic bands in ethanol (values in m$\mu$): $\lambda_{max.}$ at 255–256 ($\epsilon$=9220), 264–265 ($\epsilon$=9020), 290–295 ($\epsilon$=8990), 317–319 ($\epsilon$=17,100), 330–331 ($\epsilon$=16,980) and 390 ($\epsilon$=4720); $\lambda_{shoulder}$ at 221 ($\epsilon$=20,520); $\lambda_{plateau}$ at 227–232 ($\epsilon$=18,770); $\lambda_{min.}$ at 252 ($\epsilon$=9130), 260–262 ($\epsilon$=8960), 273–278 ($\epsilon$=7490); 294–295 ($\epsilon$=8900), 324–325 ($\epsilon$=15,780) and 348 ($\epsilon$=3800); and the following characteristic bands and in ethanol, containing a small amount of hydrochloric acid: $\lambda_{max.}$ at 239 ($\epsilon$=4920), 258–260 ($\epsilon$=6200), and 386–388 ($\epsilon$=25,480); $\lambda_{plateau}$ at 297–302 ($\epsilon$=1170); and $\lambda_{min.}$ at 230–232 ($\epsilon$=4860), 242–246 ($\epsilon$=4500) and 280–282 ($\epsilon$=60).

The methyl 18-O-methyl-$\Delta^3$-dehydro-reserpate perchlorate, in which the double bond extends from the 3-position to the 4-position may be prepared as follows: To a solution of 0.035 g. of the previously described methyl $\Delta^3$-dehydro-18-O-methyl-reserpate in 10 ml. of a 1:1-mixture of methanol and water are added several drops of aqueous perchloric acid of 35 percent strength. The solid material is filtered off and recrystallized from ethanol to yield the methyl 18-O-methyl-$\Delta^3$-dehydro-reserpate perchlorate, M.P. 149–154°. This salt may be used in the above reduction procedure to form the desired methyl 18-O-methyl-reserpate.

The methyl 18-O-methyl-3-oxo-2,3-seco-reserpate used as the intermediate in the preparation of the starting material may also be obtained, for example, by etherifying in methyl 3$\beta$-hydroxy-2$\alpha$-methoxy-7-oxo-1$\alpha$,2$\beta$,3$\alpha$,4,7,8,9$\alpha$,10$\alpha$-octohydro-naphthalene 1$\beta$-carboxylate the free hydroxyl group with diazomethane in the presence of fluoboric acid. The resulting methyl 2$\alpha$,3$\beta$-dimethoxy-7-oxo-1$\alpha$,2$\beta$,3$\alpha$,4,7,8,9$\alpha$,10$\alpha$-octahydro-naphthalene 1$\beta$-carboxylate is then oxidized first with osmium tetroxide to the methyl 5$\alpha$,6$\alpha$-dihydroxy-2$\alpha$,3$\beta$-dimethoxy-7-oxo-1$\alpha$,2$\beta$,3$\alpha$,4,5$\beta$,6$\beta$,7,8,9$\alpha$,10$\alpha$-decahydro-naphthalene 1$\beta$-carboxylate and then with periodic acid hydrate to the methyl 5$\beta$-aldehydo-6$\beta$-carboxymethyl - 2$\alpha$,3$\beta$ - dimethoxy-1$\alpha$,2$\beta$,3$\alpha$,4,5$\alpha$,6$\alpha$-hexahydro-benzene 1$\beta$-carboxylate, which is then esterified with diazomethane to the methyl 5$\beta$-aldehydo-6$\beta$-carbomethoxy-methyl - 2$\alpha$,3$\beta$ - dimethoxy-1$\alpha$,2$\beta$,3$\alpha$,4,5$\alpha$,6$\alpha$-hexahydro-benzene 1$\beta$-carboxylate. The latter is then condensed with 6-methoxy-tryptamine in benzene to form the methyl $\Delta^{4(21)}$-dehydro-3-methoxy-18-O-methyl-3-oxo-2,3;3,4-bis-seco-reserpate, which in turn is treated with sodium borohydride to reduce the Schiff-base type double bond. After re-esterification of any hydrolized carboxyl groups the resulting methyl 3-methoxy-18-O-methyl-3-oxo-2,3;3,4-bis-seco-reserpate is treated with acetic acid anhydride in pyridine to yield the desired methyl 18-O-methyl-3-oxo-2,3-seco-reserpate used as the intermediate in the preparation of the starting material.

Other lower alkyl 18-O-lower alkyl-$\Delta^3$-dehydro-reserpates, which may be used in the above procedure for the preparation of the compounds of this invention are, for example, methyl 18-O-ethyl-$\Delta^3$-dehydro-reserpate, methyl 18-O-n-propyl-$\Delta^3$-dehydro-reserpate, methyl 18-O-n-butyl-$\Delta^3$-dehydro-reserpate, ethyl 18-O-methyl-$\Delta^3$-dehydro-reserpate, ethyl 18-O-n-propyl-$\Delta^3$-dehydro-reserpate, n-propyl 18-O-methyl-$\Delta^3$-dehydro-reserpate, n-propyl 18-O-ethyl-$\Delta^3$-dehydro reserpate, isopropyl 18-O-methyl-$\Delta^3$-dehydro-reserpate, n-butyl 18-O-methyl-$\Delta^3$-dehydro reserpate, iso-butyl 18-O-methyl-$\Delta^3$-dehydro-reserpate and the like, in which the double bond probably extends from the 3-position to the 14-position, and salts of these compounds, such as the perchlorate and the like, in which the double bond extends from the 3-position to the 4-position.

Other highly useful intermediates are the lower alkyl 18-O-lower alkyl-10-methoxy - Δ³ - dehydro-deserpidates, e.g. methyl 10-methoxy-18-O-methyl-Δ³-dehydro-deserpidate, methyl 18-O-ethyl-10-methoxy-Δ³-dehydro-deserpidate, methyl 10-methoxy-18-O-n-propyl - Δ³ - dehydro-deserpidate, ethyl 10-methoxy-18-O-methyl-Δ³-dehydro-deserpidate, n-propyl 10-methoxy - 18 - O - methyl-Δ³-dehydro-deserpidate and the like, or lower alkyl 18-O-lower alkyl-Δ³-dehydro-deserpidates, e.g. methyl 18-O-methyl-Δ³-dehydro-deserpidate, methyl 18-O-ethyl-Δ³-dehydro-deserpidate, ethyl 18-O-methyl-Δ³-dehydrodeserpidate, n-propyl 18-O-methyl-Δ³-dehydro-deserpidate and the like, in which compounds the double bond probably extends from the 3-position to the 14-position, or salts thereof, such as the perclorate and the like, in which the double bond extends from the 3-position to the 4-position, as well as lower alkyl 18-O-lower alkyl-5-methyl-Δ³-dehydro-reserpates, e.g. methyl 5-methyl-18-O-methyl-Δ³-dehydro-reserpate and the like, lower alkyl 18-O-lower alkyl-6-methyl-Δ³-dehydro-reserpates, e.g. methyl 6-methyl-18-O-methyl-Δ³-dehydro-reserpate and the like, lower alkyl 18-O-lower alkyl-6-methyl- Δ³-dehydro-deserpidates, e.g. methyl 6-methyl-18-O-methyl-Δ³-dehydro-deserpidate and the like, lower alkyl 18-O-lower alkyl-9-methyl-Δ³-dehydro-deserpidates, e.g. methyl 9-methyl-18-O-methyl-Δ³ - dehydro - deserpidate and the like, lower alkyl 18 - O - lower alkyl-11-methyl-Δ³-dehydro-deserpidates, e.g. methyl 11-methyl-18-O-methyl - Δ³ - dehydro-deserpidate and the like, lower alkyl 18-O-lower alkyl-9-methoxy-Δ³-dehydro-deserpidates, e.g. methyl 9-methoxy-18-O-methyl-Δ³-dehydro-deserpidate and the like, lower alkyl 18-O-lower alkyl-10-methoxy-Δ³-dehydro-reserpates, e.g. methyl 10-methoxy-18-O-methyl-Δ³-dehydro-reserpate and the like, lower alkyl 11-ethoxy-18-O-lower alkyl-Δ³-dehydro-deserpidates, e.g. methyl 11-ethoxy-18-O-methyl-Δ³-dehydro-deserpidate and the like, lower alkyl 18-O-lower alkyl-11-n-propyloxy-Δ³-dehydro-deserpidates, e.g. methyl 18-O-methyl-11-n-propyloxy - Δ³ - dehydro-deserpidate and the like, lower alkyl 11-isopropyloxy-18-O-lower alkyl-Δ³-dehydro-deserpidates, e.g. methyl 11-isopropyloxy-18-O-methyl-Δ³-dehydro-deserpidate and the like, lower alkyl 11-n-butyloxy-18-O-lower alkyl-Δ³-dehydro-deserpidates, e.g. methyl 11-n-butyloxy-18-O-methyl-Δ³-dehydro-deserpidate and the like, lower alkyl 18-O-lower alkyl-12-methoxy-Δ³-dehydro-deserpidates, e.g. methyl 12-methoxy-18-O-methyl-Δ³-dehydro - deserpidate and the like, lower alkyl 10-benzyloxy-18-O-lower alkyl-Δ³-dehydro-deserpidates, e.g. methyl 10-benzyloxy-18-O-methyl-Δ³-dehydro-deserpidate and the like, lower alkyl 11-benzyloxy-18-O-lower alkyl-Δ³-dehydro-deserpidates, e.g. methyl 11-benzyloxy-18-O-methyl-Δ³-dehydro-deserpidate and the like, lower alkyl 18-O-lower alkyl-10,11-methylenedioxy-Δ³-dehydro-deserpidates, e.g. methyl 18-O-methyl-10,11-methylenedioxy - Δ³ - dehydro-deserpidate and the like, lower alkyl 18-O-lower alkyl-11-methyl-mercapto-Δ³-dehydro-deserpidates, e.g. methyl 18-O-methyl-11-methylmercapto-Δ³-dehydro-deserpidate and the like, lower alkyl 11-ethylmercapto-18-O-lower alkyl-Δ³-dehydro-deserpidates, e.g. methyl 11-ethylmercapto-18-O-methyl-Δ³-dehydro-deserpidate and the like, lower alkyl 10-chloro-18-O-lower alkyl-Δ³-dehydro-deserpidates, e.g. methyl 10-chloro-18-O-methyl - Δ³ - dehydro-deserpidate and the like, lower alkyl 10-bromo-18-O-lower alkyl-Δ³-dehydro-reserpates, e.g. methyl 10-bromo-18-O-methyl-Δ³-dehydro-reserpate and the like, lower alkyl 17α-desmethoxy-17α-ethoxy-18-O-lower alkyl-Δ³-dehydro-reserpates, e.g. methyl 17α-desmethoxy-17α-ethoxy-18-O-methyl-Δ³-dehydro-reserpate and the like, lower alkyl 17α-desmethoxy-18-O-lower alkyl-17α-n-propyloxy-Δ³-dehydro-reserpates, e.g. methyl 17α-desmethoxy - 18 - O - methyl-17α-n-propyloxy - Δ³ - dehydro-reserpate and the like, lower alkyl 17α-desmethoxy-17α-ethoxy-18-O-lower alkyl - Δ³ - dehydro-deserpidates, e.g. methyl 17α-des- methoxy-17α-ethoxy - 18 - O - methyl-Δ³-dehydro-deserpidate and the like, or analogous compounds, such as those previously mentioned in the description, in which the double bond probably extends from the 3-position to the 14-position, and salts of these compounds, in which the double bond extends from the 3-position to the 4-position. Upon reduction of the double bond extending from the 3-position, these compounds can be converted into the desired compounds of this invention.

Important intermediates used for the preparation of these starting materials are lower alkyl 18-O-lower alkyl-3-oxo-2,3-seco-reserpates, such as the above-mentioned methyl 18-O-methyl-3-oxo-2,3-seco-reserpate, as well as the methyl 18-O-ethyl-3-oxo-2,3-seco-reserpate, methyl 18-O-n-propyl-3-oxo-2,3-seco-reserpate, ethyl-18-O-methyl-3-oxo-2,3-seco-reserpate, n-propyl 18-O-methyl-3-oxo-2,3-seco-reserpate and the like, lower alkyl 18-O-lower alkyl-10-methoxy-3-oxo-2,3-seco-deserpidates, e.g. methyl 10-methoxy - 18 - O - methyl-3-oxo-2,3-seco-deserpidate, methyl 18-O-ethyl-10-methoxy-3-oxo-2,3-seco-deserpidate, ethyl 10-methoxy-18-O-methyl-3-oxo-2,3-seco-deserpidate, n-propyl 10 - methoxy-18-O-methyl-3-oxo-2,3-seco-deserpidate and the like, or lower alkyl 18-O-lower alkyl-3-oxo-2,3-seco-deserpidates, e.g. methyl 18-O-methyl-3-oxo-2,3-seco-deserpidate, methyl 18-O-ethyl-3-oxo-2,3-seco-deserpidate, ethyl 18-O-methyl-3-oxo-2,3-seco-deserpidate, n-propyl 18-O-methyl-3-oxo-2,3-seco-deserpidate and the like, as well as other 18β-etherified hydroxy-3-oxo-2,3-seco-yohimbane 16β-carboxylic acid esters such as lower alkyl 18-O-lower alkyl-5-methyl-3-oxo-2,3-seco-reserpates, e.g. methyl 5-methyl-18-O-methyl-3-oxo-2,3-seco-reserpate and the like, lower alkyl 18-O-lower alkyl-6-methyl-3-oxo-2,3-seco-reserpates, e.g. methyl 6-methyl-18-O-methyl-3-oxo-2,3-seco-reserpate and the like, lower alkyl 18-O-lower alkyl-6-methyl-3-oxo-2,3-seco-deserpidates, e.g. methyl 6-methyl-18-O-methyl-3-oxo-2,3-seco-deserpidate and the like, lower alkyl 18-O-lower alkyl-9-methyl-3-oxo-2,3-seco-deserpidates, e.g. methyl 9-methyl-18-O-methyl-3-oxo-2,3-seco-deserpidate and the like, lower alkyl 18-O-lower alkyl-10-methyl-3-oxo-2,3-seco-deserpidates, e.g. methyl 10-methyl-18-O-methyl-3-oxo-2,3-seco-deserpidate and the like, lower alkyl 18-O-lower alkyl-11-methyl-3-oxo-2,3-seco-deserpidates, e.g. methyl 11-methyl-18-O-methyl-3-oxo-2,3-seco-deserpidate and the like, lower alkyl 18-O-lower alkyl-9-methoxy-3-oxo-2,3-seco-deserpidates, e.g. methyl 9-methoxy-18-O-methyl-3-oxo-2,3-seco-deserpidate and the like, lower alkyl 18-O-lower alkyl-10-methoxy-3-oxo-2,3-seco-reserpates, e.g. methyl 10-methoxy-18-O-methyl-3-oxo-2,3-seco-reserpate and the like, lower alkyl 10-ethoxy-18-O-lower alkyl-3-oxo-2,3-seco-deserpidates, e.g. methyl 10-ethoxy-18-O-methyl-3-oxo-2,3-seco-deserpidate and the like, lower alkyl 9,10-dimethoxy-18-O-lower alkyl-3-oxo-2,3-seco-reserpates, e.g. methyl 9,10 - dimethoxy-18-O-methyl-3-oxo-2,3-seco-reserpate and the like, lower alkyl 11-ethoxy-18-O-lower alkyl-3-oxo-2,3-seco-deserpidates, e.g. methyl 11-ethoxy-18-O-methyl-3-oxo-2,3-seco-deserpidate and the like, lower alkyl 18-O-lower alkyl-11-n-propyloxy-3-oxo-2,3-seco-deserpidates, e.g. methyl 18-O-methyl-11-n-propyloxy-3-oxo-2,3-seco-deserpidate and the like, lower alkyl 11-isopropyloxy-18-O-lower alkyl-3-oxo-2,3-seco-deserpidates, e.g. methyl 11-isopropyloxy-18-O-methyl-3-oxo-2,3-seco-deserpidate and the like, lower alkyl 11-n-butyloxy-18-O-lower alkyl - 3 - oxo-2,3-seco-deserpidates, e.g. methyl 11-n-butyloxy-18-O-methyl-3-oxo-2,3-seco-deserpidate and the like, lower alkyl 18-O-lower alkyl-12-methoxy-3-oxo-2,3-seco-deserpidates, e.g. methyl 12-methoxy-18-O-methyl-3-oxo-2,3-seco-deserpidate and the like, lower alkyl 10-benzyloxy-18-O-lower alkyl-3-oxo-2,3-seco-deserpidates, e.g. methyl 10-benzyloxy-18-O-methyl-3-oxo-2,3-seco-deserpidates and the like, lower alkyl 11-benzyloxy-18-O-lower alkyl-3-oxo-2,3-seco-deserpidates, e.g. methyl 11-benzyloxy-18-O-methyl-3-oxo-2,3-seco-deserpidate and the like, lower alkyl 18-O-lower alkyl-10,11-methylenedioxy - 3 - oxo - 2,3 - seco-deserpidates, e.g. methyl 18-O-methyl-10,11-methylenedioxy-3-oxo-2,3-seco-deserpidate and the like, lower alkyl 18-O-lower alkyl - 10 - methylmercapto-3-oxo-2,3-seco-deserpidates, e.g. methyl 18-O-methyl-10-methylmercapto-3-oxo-2,3-seco-deserpidate and the like, 18-O-lower alkyl-11-methylmercapto - 3 - oxo - 2,3 - seco-deserpidates, e.g. methyl 18-O-methyl-11-methylmercapto-3-oxo-2,3 - seco-deserpidate and the like, lower alkyl 11-ethylmercapto-18-O-lower alkyl-3-oxo-2,3-seco-deserpidates, e.g. methyl 11-ethylmercapto - 18 - O - methyl-3-oxo-2,3-seco-deserpidate and the like, lower alkyl 10-chloro-18-O-lower alkyl-3-oxo-2,3-seco-deserpidates, e.g. methyl 10-chloro-18-O-methyl-3-oxo-2,3-seco-deserpidate and the like, lower alkyl 10-bromo-18-O-lower alkyl-3-oxo-2,3-seco reserpates, e.g. methyl 10-bromo-18-O-methyl-3-oxo-2,3-seco-reserpate and the like, lower alkyl 11-fluoro-18-O-lower alkyl-3-oxo-2,3-seco-deserpidates, e.g. methyl 11-fluoro-18-O-methyl-3-oxo-2,3-seco-deserpidate and the like, lower alkyl 17α-desmethoxy-17α-ethoxy-18-O-lower alkyl-3-oxo-2,3-seco-reserpates, e.g. methyl 17α-desmethoxy-17α-ethoxy-18-O-methyl - 3 - oxo-2,3-seco-reserpate and the like, lower alkyl 17α-desmethoxy-18-O-lower alkyl-17α-n-propyloxy - 3 - oxo-2,3-seco-reserpates, e.g. methyl 17α - desmethoxy-18-O-methyl-17α-n-propyloxy-3-oxo-2,3-seco-reserpate and the like, lower alkyl 17α-desmethoxy-17α-ethoxy-18-O-lower alkyl-3-oxo-2,3-seco-deserpidates. e.g. methyl 17α-desmethoxy-17α-ethoxy-18-O-methoxy-3-oxo-2,3-seco-deserpidate and the like, lower alkyl 17α-cyano-17α-desmethoxy-18-O-lower alkyl-3-oxo-2,3-seco-deserpidates, e.g. methyl 17α-cyano - 17α - desmethoxy-18-O-methyl-3-oxo-2,3-seco-deserpidate and the like, lower alkyl 17α-cyano-17α-desmethoxy-18-O-lower alkyl-3-oxo-2,3-seco-reserpates, e.g. methyl 17α-cyano-17α-desmethoxy-18-O-methyl-3-oxo-2,3-seco-reserpate and the like, or any other 18β-etherified hydroxy-3-oxo-2,3-seco-yohimbane 16β-carboxylic acid ester, such as one of those previously mentioned in the description. These compounds, upon ring closure, for example, with phosphorus oxychloride and the like, yield the desired Δ³-18β-etherified hydroxy-allo-yohimbene 16β-carboxylic acid esters or salts thereof, which are used as the starting materials in the previously described procedure.

The starting material may also be prepared as follows: To a solution of methyl Δ³-dehydro-reserpate in 1200 ml. is added 1.4 ml. of the standard fluoboric acid preparation in 145 ml. of diethyl ether and 40 ml. of methylene chloride, the reaction mixture is cooled to −11½° and 0.092 mol of diazomethane in 300 ml. of methylene chloride is added in three portions over a period of five minutes. The reaction mixture is stirred for twenty minutes and then allowed to stand in an atmosphere of nitrogen for one hour. The solution is washed with 300 ml. of a five percent aqueous sodium carbonate solution, 500 ml. of a five percent aqueous sodium carbonate solution and 500 ml. of a saturated aqueous sodium chloride solution. All aqueous solutions are washed with methylene chloride, the combined organic solutions are dried over magnesium sulfate and evaporated to dryness to leave 5.0 g. of crude methyl 18-O-methyl-Δ³-dehydro-reserpate.

The above procedure for the preparation of the starting material may be generalized, for example, by the treatment of a Δ³-18-hydroxy-allo-yohimbane 16-carboxylic acid ester, particularly of a compound having one of the formulae:

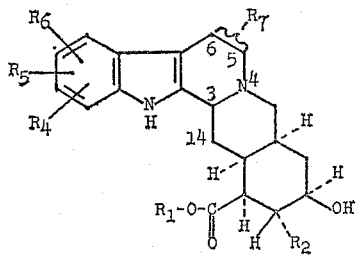

or

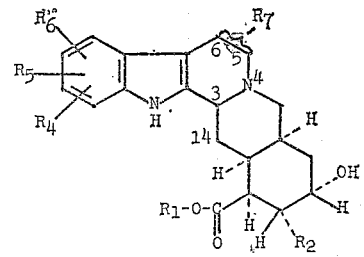

in which $R_1$, $R_2$, $R_4$, $R_5$, $R_6$ and $R_7$ have the previously given meaning, and in which a double bond extends probably from the 3-position to the 14-position, or a salt thereof, in which a double bond extends from the 3-position to the 4-position, with a diazo-compound, particularly a diazo-compound of the formula $R_3-N_2$, in which $R_3$ has the previously given meaning, in the presence of a strong Lewis acid, and, if desired, converting a resulting salt into the free compound, and/or, if desired, converting a resulting compound into a salt thereof.

The above procedure is carried out according to previously described etherification methods; a lower diazoalkane, e.g. diazomethane, in the presence of fluoboric acid represents the etherification reagent of choice.

The intermediates used in the above procedure may be prepared, for example, by oxidizing an 18-hydroxy-3-epi-allo-yohimbane 16-carboxylic acid ester, by treatment, for example, with potassium dichromate and the like, preferably in an acidic medium, for example, in the presence of acetic acid and the like.

The crude methyl 18-O-methyl-Δ³-dehydro-reserpate, resulting in the above procedure, may be converted into the desired methyl 18-O-methyl-reserpate as follows: A mixture of 5.0 g. of the crude material obtained according to the previously described procedure, 50 ml. of tetrahydrofuran, 45 ml. of water, 5 ml. of perchloric acid and 5 g. of zinc is refluxed for fifteen minutes under an atmosphere of nitrogen while stirring. The solid material is filtered off, the solution is taken to dryness and the residue is dissolved in 70 ml. of 60 percent aqueous acetic acid. The solution is made basic with aqueous ammonia, concentrated, diluted with water and then extracted with methylene chloride. The organic solution is dried over sodium sulfate, and evaporated to dryness. A benzene solution of the residue is placed on a column containing 200 g. of neutral aluminum oxide (activity II to III, neutral) and eluted as follows:

| Fraction | Solvent | Amount, grams |
| --- | --- | --- |
| 1 | 800 ml. of benzene | 0.000 |
| 2 | 200 ml. of methylene chloride | 0.150 |
| 3 | 450 ml. of methylene chloride | 0.400 |
| 4 | 400 ml. of methylene chloride | 0.280 |
| 5 | 450 ml. of methylene chloride, containing 0.1 percent methanol | 0.180 |
| 6 | 450 ml. of methylene chloride, containing 0.2 percent methanol | }0.850 |
| 7 | 450 ml. of methylene chloride, containing 0.5 percent methanol | |
| 8 | 400 ml. of methylene chloride, containing 0.5 percent methanol | 0.320 |
| 9 | 200 ml. of methylene chloride, containing 5 percent methanol | 1.340 |
| 10 | do | 1.310 |
| 11 | 300 ml. of methylene chloride, containing 5 percent methanol | }0.007 |
| 12 | 500 ml. of methanol | |

Fractions 3 to 5 are crystallized from a 1:3-mixture of benzene and cyclohexane, and fractions 6 to 8 are rechromatographed on 40 g. aluminum oxide, using methylene chloride as an eluting solvent and the solid is recrystallized. A total of 0.85 g. of methyl 18-O-methyl-reserpate is recovered, which compound is identical with the product obtained according to the above procedure or the method disclosed in Example 1.

Example 31

A solution of 1.0 g. of methyl 18-O-methyl-3-iso-reserpate is heated in 45 ml. of glacial acetic acid for about twenty-four hours under an atmosphere of nitrogen. The reaction mixture is concentrated under reduced pressure to a small volume, water is added to the residue and the solution is extracted with chloroform. The organic solution is separated, washed with water and evaporated under reduced pressure. From the residue, the desired methyl 18-O-methyl-reserpate, which is identified by paper chromatography, can be isolated by chromatography on aluminum oxide; the resulting product is identical with the compound obtained according to the procedure of Example 1.

The starting material used in the above procedure may be prepared, for example, by treating an ethanol solution of methyl 18-O-methyl-$\Delta^3$-dehydro-reserpate, if desired, in the form of a salt thereof, with sodium borohydride.

Further compounds, which may be used as starting materials in the above-described isomerization procedure are, apart from the methyl 18-O-methyl-3-iso-reserpate or salts thereof, other lower alkyl 18-O-lower alkyl-3-iso-reserpates, e.g.
methyl 18-O-ethyl-3-iso-reserpate,
methyl 18-O-n-propyl-3-iso-reserpate,
methyl 18-O-isobutyl-3-iso-reserpate,
ethyl 18-O-methyl-3-iso-reserpate and the like,
lower alkyl 18-O-lower alkyl-10-methoxy-3-iso-deserpidates, e.g.
methyl 10-methoxy-18-O-methyl-3-iso-deserpidate,
methyl 18-O-ethyl-10-methoxy-3-iso-deserpidate,
methyl 10-methoxy-18-O-n-propyl-3-iso-deserpidate,
ethyl 10-methoxy-18-O-methyl-3-iso-deserpidate, and the like, or
lower alkyl 18-O-lower alkyl-3-iso-deserpidates, e.g.
methyl 18-O-methyl-3-iso-deserpidate,
methyl 18-O-ethyl-3-iso-deserpidate,
methyl 18-O-n-propyl-3-iso-deserpidate,
ethyl 18-O-methyl-3-iso-deserpidate,
n-propyl 18-O-methyl-3-iso-deserpidate
and the like, or salts of these compounds, as well as other 18β-etherified hydroxy-allo-yohimbane 16β-carboxylic acid esters, which contain substituents, such as those previously mentioned, attached to portions available for substitution. These compounds are useful as starting materials in the isomerization procedure described in the example hereinbefore.

The starting material used in the above procedure may also be prepared, for example, by etherifying in methyl 3-iso-reserpate or any other 18β-hydroxy-allo-yohimbane 16β-carboxylic acid ester, the free hydroxy group in the 18β-position by treatment with a diazo-reagent, such as lower diazo-alkane, in the presence of fluoboric acid.

Example 32

To a solution of 2.48 g. of methyl reserpate in 120 ml. of methylene chloride, kept at room temperature, is added 1 ml. of chloromethyl methyl ether. The reaction mixture is concentrated to dryness under reduced pressure and the residue, containing the quaternary salt of methyl reserpate with chloromethyl methyl ether, is dried for one hour under reduced pressure on the steam bath.

The above residue is dissolved in 400 ml. of methylene chloride and 270 ml. of a solution of 1 ml. of 14 N fluoboric acid in 110 ml. of dry diethyl ether and 30 ml. of methylene chloride is added. The solution is chilled to $-10°$ and stirred while 150 ml. of 0.326 M diazomethane in methylene chloride is added over a period of about five minutes. After standing for fifteen minutes, the solution is washed with 5 percent aqueous sodium carbonate and then with a saturated aqueous solution of sodium chloride. The organic layer is dried over sodium sulfate and concentrated to dryness under reduced pressure to yield 1.06 g. of a residue, containing the desired quaternary salt of methyl 10-O-methyl-reserpate with chloromethyl methyl ether.

The residue is dissolved in a solution of 15 ml. of methanol in 50 ml. of water, the solution is made acid to a pH of about 3 with concentrated hydrochloric acid and allowed to stand at room temperature for 1¼ hours. It is then made basic with ammonia and extracted with methylene chloride; the organic layer is separated, dried and concentrated to dryness, and the residue is extracted with 50 ml. of benzene. The benzene solution is evaporated to yield 1 g. of solid material. The desired methyl 18-O-methyl-reserpate is identified paper-chromatographically by comparing it with the product obtained according to the procedure of Example 1.

Example 33

A mixture of 1.0 g. of methyl 18-epi-O-(4-bromophenyl-sulfonyl)-reserpate in 80 ml. of methanol and 0.5 ml. of pyridine is heated for seven days in a sealed bottle on the steam bath. The solid material is filtered off, the filtrate is taken to dryness under reduced pressure, and the residue is dissolved in methylene chloride. The organic solution is washed twice with a five percent aqueous solution of sodium carbonate and with a saturated aqueous sodium chloride solution, then filtered through a diatomaceous earth preparation and evaporated. A benzene solution of the foamy residue is place on a column containing 15 g. of aluminum oxide, the chromatogram is developed with benzene, methylene chloride and methanol. The methanol fraction is recrystallized from a mixture of 5 ml. of benzene and 15 ml. of cyclohexane, the mother liquors are concentrated and diluted with diethyl ether. A powder precipitates and is recrystallized from a small amount of a 1:3-mixture of benzene and cyclohexane; the solid material is filtered off and washed with the same solvent mixture to yield methyl 18-O-methyl-reserpate, M.P. 225–230°; $[\alpha]_D^{25} = -101°$ (chloroform). The product is identical in every respect with the compound obtained from the procedures described in Examples 1 and 30.

Example 34

A mixture of 0.75 g. of methyl 18-O-(4-bromo-phenyl-sulfonyl)-10-methoxy-deserpidate, 75 ml. of methanol and 0.2 ml. of N,N,N-triethylamine is heated for 13 days in a sealed bottle on the steam bath, while stirring with a magnetic stirring. The solution is evaporated under reduced pressure, the residue is dissolved in methylene chloride, the organic solution is washed twice with a 5 percent aqueous sodium carbonate and once with a saturated aqueous sodium chloride, then filtered through a diatomaceous earth preparation and evaporated. The residue is taken up in 50 ml. of diethyl ether, the solid material is filtered off, the solvent is evaporated and the diethyl ether soluble material (0.44 g.) is dissolved in benzene and placed on a column containing aluminum oxide (Woelm neutral, activity II to III). The methylene chloride eluate yields 0.15 g. of methyl 10-methoxy-18-epi-O-methyl-deserpidate, which melts at 233–236° after recrystallization from a mixture of benzene and cyclohexane. It crystallizes as the hemihydrate; $[\alpha]_D^{25} = -85°$ (chloroform).

The starting material may be prepared as follows: A mixture of 1.5 g. of methyl 10-methoxy-deserpidate, 2.4 g. of p-bromo-benzene sulfonyl chloride and 15 ml. of pyridine is allowed to stand at room temperature for two days and is then poured into ice-water. The precipitate is filtered off, is washed with water and dissolved in methylene chloride. The organic solution is filtered through a diatomaceous earth preparation and evaporated; the residue yields a powder by treatment with petroleum-ether. 1.1 g. of this material is dissolved in methylene chloride, which solution is washed twice with a five percent aqueous sodium carbonate solution and once with a saturated aqueous sodium chloride solution and then filtered through a diatomaceous earth preparation. The solvent is evaporated; the residue is crystallized from diethyl ether to yield 0.75 of methyl 18-O-(4-bromo-phenyl-sulfonyl)-10-methoxy-deserpidate, M.P. 218–221°; $[\alpha]_D^{28} = -123°$ (chloroform).

*Example 35*

A solution of 1.5 g. of methyl 10-methoxy-deserpidate in 250 ml. of methylene chloride is cooled to −10°; 0.4 ml. of the standard fluoboric acid solution in 45 ml. of diethyl ether and 12 ml. of methylene chloride is added, and the solution is cooled to −14°. 70 ml. of a 0.338 M solution of diazomethane in methylene chloride is given to the cold mixture and stirring is continued for one hour. The reaction product is worked up as shown in Example 1; the organic solution is washed with a five percent aqueous sodium carbonate solution and a saturated sodium chloride solution, is dried over sodium sulfate and evaporated under reduced pressure. 0.17 g. of benzene-insoluble material is filtered off and discarded; the benzene filtrate is evaporated to yield 1.14 g. of solid material. A benzene solution of the latter is placed on a column containing 30 g. of aluminum oxide (Woelm neutral, atcivity II–III) and eluted with benzene and methylene chloride. The fractions from these solvents are combined, crystallized and recrytsallized from a mixture of benzene and cyclohexane to yield 0.125 g. of methyl 10 - methoxy - 18-O-methyl-deserpidate, M.P. 209–212°; $[\alpha]_D^{26} = -152°$ (chloroform).

*Example 36*

A mixture of 3.0 g. of n-propyl 18-O-(4-bromo-phenyl-sulfonyl)-reserpate, 220 ml. of methanol and 0.55 ml. of N,N,N-triethylamine is heated in a sealed pressure bottle on the steam bath for 24 hours while stirring. The solvent is evaporated to dryness and the residue is taken up in methylene chloride; the organic solution is washed twice with a five percent solution of sodium carbonate in water and with a saturated aqueous sodium chloride solution, dried over sodium sulfate and evaporated. The residue is crystallized from diethyl ether, the crystalline material is filtered off, dried and dissolved in methylene chloride. The solution is filtered through charcoal and evaporated to dryness. The residue is crystallized from diethyl ether to yield 1.52 g. of n-propyl 18-epi-O-methyl-reserpate, M.P. 192–196°; $[\alpha]_D^{24} = -25°$ (chloroform).

The starting material may be prepared as follows: A solution of 4.0 g. of n-propyl reserpate and 6.0 g. of 4-bromo-benzene sulfonyl chloride in 50 ml. of dry pyridine is cooled in an ice-water bath for fifteen minutes and is then allowed to stand at room temperature in the dark for two days. The reaction mixture is poured into ice-water and the organic material is extracted with methylene chloride; the organic solution is washed twice with a five percent aqueous sodium carbonate solution, with water and a saturated aqueous sodium chloride solution, dried over sodium sulfate and evaporated to a small volume. Toluene is added, the solvents are stripped off, and the residue is dissolved in methylene chloride. This solution is filtered through charcoal, the solvent is evaporated and the residue is recrystallized from benzene to yield 3.9 g. of n-propyl 18-O-(4-bromo-phenyl-sulfonyl)-reserpate, M.P. 198–200°; $[\alpha]_D^{24} = -70°$ (chloroform).

*Example 37*

A mixture of 2.8 g. of 2-methoxyethyl 18-O-(4-bromo-phenyl-sulfonyl)-reserpate, 220 ml. of methanol and 0.55 ml. of N,N,N-triethylamine is heated in a sealed vessel on a steam bath for two days while stirring. The reaction mixture is worked up as shown in Example 36 to yield 1.25 g. of 2-methoxyethyl 18-epi-O-methyl-reserpate, M.P. 151–154°, $[\alpha]_D^{25} = -39°$ (chloroform), which crystallizes as the hydrate, when dried at 110°, and as the hemihydrate when dried at 140°.

Other lower alkoxy-lower alkyl 18-epi-O-lower alkyl-reserpate or lower alkoxy-lower alkyl 18-epi-O-lower alkyl-deserpidate, such as those mentioned in the description, may be prepared according to the above procedure.

The starting material may be prepared by reacting a mixture of 3.0 g. of 2-methoxyethyl reserpate, 4.2 g. of 4-bromo-benzene sulfonyl chloride and 35 ml. of dry pyridine according to the procedure given in Example 37; the 2-methoxyethyl 18-O-(4-bromo-phenyl-sulfonyl)-reserpate melts at 185–187°; $[\alpha]_D^{26} = -76°$ (chloroform); yield: 3.0 g.

Other lower alkoxy-lower alkyl 18-epi-O-lower alkyl-reserpates, which may be prepared according to the above procedure are, for example, 2-methoxyethyl 18-epi-O-ethyl-reserpate, 2-methoxyethyl 18-epi-O-n-propyl-reserpate, 2-ethoxyethyl 18-epi-O-methyl-reserpate, 3-methoxypropyl 18-epi-O-ethyl-reserpate and the like. Lower alkoxy-lower alkyl 18-epi-O-lower alkyl-deserpidates, such as, for example, 2-methoxyethyl 18-epi-O-methyl-deserpidate, 2-methoxyethyl 18-epi-O-ethyl-deserpidate, 2-ethoxyethyl 18-epi-O-n-propyl-deserpidate, and the like may be prepared according to the above procedure by selecting the appropriate starting materials.

*Example 38*

A mixture of 3.2 g. of isopropyl 18-O-(4-bromo-phenyl-sulfonyl)-reserpate, 250 ml. of methanol and 0.55 of N,N,N-triethylamine is heated in a sealed pressure bottle on the steam bath for three days while stirring; the reaction mixture is worked up as shown in Example 36 to yield 1.65 g. of isopropyl 18-epi-O-methyl-reserpate, M.P. 206–210°; $[\alpha]_D^{26} = -9°$ (chloroform).

The starting material may be prepared by reacting a mixture of 4.0 g. of isopropyl reserpate, 6.0 g. of 4-bromo-benzene sulfonyl chloride and 50 ml. of benzene as shown in Example 36; the desired isopropyl 18-O-(4-bromo-phenyl-sulfonyl)-reserpate melts at 198–201°, $$[\alpha]_D^{28} = -37°$$

(chloroform); yield: 3.4 g.

*Example 39*

A mixture of 2.0 g. of ethyl 18-O-(4-bromo-phenyl-sulfonyl)-reserpate, 160 ml. of methanol and 0.4 g. of N,N,N-triethylamine is heated in a sealed pressure bottle on the steam bath for 24 hours while stirring. The desired ethyl 18-epi-O-methyl-reserpate, M.P. 195–198° and $[\alpha]_D^{24} = -22°$ (chloroform), is obtained by working up the reaction mixture as shown in Example 36; yield: 0.93 g.

The starting material may be prepared by reacting 2.0 g. of ethyl reserpate, 3.0 g. of 4-bromo-benzene sulfonyl chloride and 20 ml. of dry benzene as shown in Example 36 and isolating the desired ethyl 18-O-(4-bromo-phenyl-sulfonyl)-reserpate, M.P. 210–212°; yield: 2.0 g.

*Example 40*

To a solution of 5.0 g. of methyl reserpate benzyl quaternary bromide (dried on the steam bath and under reduced pressure for 1½ hours) in 1200 ml. of methylene chloride is added 1.4 ml. of the stock fluoboric acid preparation and 0.109 mol of diazomethane in methylene chloride. The diazomethane solution is added in four portions while cooling to −10°; the reaction mixture is stirred for thirty minutes at this temperature and then allowed to stand for 1½ hours at room temperature. The organic solution is washed with a 100 ml. and a 50 ml. portion of a 5 percent aqueous sodium carbonate solution and with 50 ml. of water; the aqueous extracts are washed with 150 ml. of methylene chloride, the organic solutions are combined, dried over sodium sulfate and evaporated. The residue (5.81 g.), containing the methyl 18-O-methyl-reserpate benzyl quaternary bromide, is used without further purification.

A mixture of 2.0 g. of the above residue and 2 g. of palladium catalyst (10 percent on carbon) in 160 ml. of methanol is hydrogenated at atmospheric pressure. The catalyst is filtered off and washed with methylene chloride; the methanol solution and the methylene chloride washing are taken to dryness individually. Paper chromatography reveals that both residues contain methyl 18-O-methyl-reserpate, identical with the compound described in Example 1.

The starting material may be prepared as follows: 5.0 g. of methyl reserpate, and 35 ml. of benzyl bromide in 45 ml. of methylene chloride and 20 ml. of N,N-dimethylformamide in a closed vessel is allowed to stand at room temperature for two days and is then evaporated to a small volume under reduced pressure. The residue is poured into diethyl ether, the gummy solid is triturated with diethyl ether, filtered off and dissolved in methanol. The alcoholic solution is poured into diethyl ether, the precipitate is filtered off and washed with diethyl ether to yield 5.0 g. of a powder representing impure methyl reserpate benzyl quaternary bromide (containing about 2–5 percent methyl reserpate), M.P. 192–197°.

*Example 41*

A mixture of 1.3 g. of 2-N,N-dimethylaminoethyl 18-O-(4-bromo-phenyl-sulfonyl)-reserpate, 100 ml. of methanol and 0.4 g. of N,N,N-triethylamine is heated in a sealed pressure bottle on the steam bath for two days while stirring. The resulting 2-N,N-dimethylaminoethyl 18-epi-O-methyl-reserpate, M.P. 202–205°, $[\alpha]_D^{25} = -41°$ (chloroform), is isolated according to the procedure of Example 36; yield: 0.425 g.

The starting material used in the above reaction may be prepared as follows: A mixture of 88 g. of a 33 percent aqueous N,N-dimethyl-ethylenediamine solution and 150 ml. of ether is cooled to 5° and a total of 108.5 g. of ethyl chloroformate is added in portions. A solution of 40 g. of sodium hydroxide in 60 ml. of water is given to the reaction mixture simultaneously with the second half of the ethyl chloroformate; stirring is continued for an additional hour. The ether layer is separated, the aqueous portion is extracted with ether and the ether extracts are combined and dried over anhydrous potassium carbonate. The ether is evaporated, the residue is distilled, B.P. 118–122° at 17–20 mm., to yield the ethyl N-(2-N,N-dimethylaminoethyl)-carbamate.

A solution of 40 g. of ethyl N-(2-N,N-dimethylaminoethyl)-carbamate in 125 ml. of methylene chloride is cooled to 0°, and 19.5 g. of nitrosyl chloride in 300 ml. of methylene chloride is added over a period of approximately one hour while stirring and keeping the temperature between 0° and 5°. Stirring is continued for an additional two hours, the precipitate is filtered off and recrystallized from ethyl acetate to yield ethyl N-(2-N,N-dimethylaminoethyl)-N-nitroso-carbamate hydrochloride, M.P. 133–135°.

A suspension of 11.3 g. of ethyl N-(2-N,N-dimethylaminoethyl)-N-nitroso-carbamate hydrochloride in 100 ml. of ether is added to a mixture of 40 g. of a 25 percent methanol solution of potassium hydroxide and 300 ml. of ether while gently refluxing. After fifteen minutes of additional heating the ether layer, containing the 2-N,N-dimethylamino-diazoethane, is decanted and immediately used.

To the above-described ether solution is added portionwise 12.0 g. of reserpic acid in methylene chloride and methanol. The mixture is allowed to stand overnight at room temperature, the solvents are evaporated under reduced pressure, and the residue is added to 400 ml. of water containing 20 ml. of ammonium hydroxide. The water solution is extracted with methylene chloride, the organic solution is filtered through a column containing a diatomaceous earth and evaporated. This 2-N,N-dimethylaminoethyl reserpate is recrystallized from a mixture of ethyl acetate and petroleum ether, M.P. 110–114°.

The desired 2-N,N-dimethylaminoethyl 18-O-(4-bromo-phenyl-sulfonyl)-reserpate may be preposed by reacting a mixture of 3.0 g. of 2-N,N-dimethylaminoethyl reserpate, 4.5 g. of 4-bromo-benzene sulfonyl chloride and 35 ml. of dry pyridine according to the procedure shown in Example 36; it melts at 140–143°, $[\alpha]_D^{25} = -34°$ (chloroform); yield: 1.4 g.

Other tertiary amino-lower alkyl 18-epi-O-lower alkyl-deserpidates are, for example, 3-N,N-dimethylaminopropyl 18-epi-O-methyl-reserpate, 2-(1-piperidino)-ethyl 18-epi-O-ethyl-reserpate, 2-N,N-dimethylaminoethyl 18-epi-O-ethyl-reserpate, 2-N,N-dimethylaminoethyl 18-epi-O - methyl - deserpidate, 2-N,N-dimethylaminoethyl 10-chloro - 18 - epi - O-methyl-deserpidate, 2-N,N-dimethylaminoethyl 18 - epi - O-ethyl-11-n-propyloxy-deserpidate and the like; these compounds may be prepared as shown hereinabove by selecting the appropriate starting materials.

*Example 42*

A mixture of 2.0 g. of ethyl 18-O-(4-bromo-phenylsulfonyl)-reserpate, 160 ml. of absolute ethanol and 0.45 g. of N,N,N-triethylamine is heated in a sealed pressure bottle on the steam bath for two days while stirring. The reaction mixture is worked up as shown in Example 36 to yield 0.73 g. of ethyl 18-epi-O-ethyl-reserpate, M.P. 190–193°; $[\alpha]_D^{25} = -16°$ (chloroform).

*Example 43*

A solution of 3.31 g. of methyl reserpate N-oxide benzoate in methylene chloride is treated at about −10° with 150 ml. of 0.326 M of diazomethane in methylene chloride in the presence of 270 ml. of the solution of fluoboric acid described in Example 1. The reaction is carried out as shown in the previous example; the methylene chloride solution is concentrated to give 1.5 g. of a solid material containing the desired methyl 18-O-methyl-reserpate N-oxide.

The residue is dissolved in 85 ml. of glacial acetic acid, 8.5 g. of zinc dust is added, and the mixture is heated on the steam bath for fifteen minutes, then filtered and cooled. The filtrate is poured into 150 ml. of cold water, the mixture is extracted with methylene chloride, and the aqueous portion is made basic with a twenty percent solution of sodium carbonate. The aqueous portion is extracted with methylene chloride, the organic layer is separated, dried and evaporated to dryness. The residue is extracted with benzene, the benzene solution is concentrated to dryness to yield a residue, which contains the desired methyl 18-O-methyl-reserpate. The compound is identified by paper chromatography and found identical with the methyl 18-O-methyl-reserpate obtained according to the procedure of Example 1.

*Example 44*

A mixture of 0.5 g. of methyl 18-epi-O-methyl-$\Delta^3$-dehydro-reserpate, 5 ml. of tetrahydrofuran, 5 ml. of acetone, 4.5 ml of water, 0.6 ml. of aqueous perchloric acid (of 70–72 percent strength) and 0.5 g. of powdered zinc dust is refluxed under an atmosphere of nitrogen for thirty minutes. After filtering off the solid material, the filtrate is evaporated to dryness, the residue is dissolved in a 1:1-mixture of acetone and water, the acetone is stripped off and the aqueous solution is made basic by adding aqueous ammonia. The organic material is extracted with methylene chloride, the residue from the extract is dissolved in 10 ml. of benzene and placed on a column containing 20 g. of aluminum oxide (neutral, activity II to III). The chromatogram is developed as follows:

| Fractions | Solvents | Eluted Amounts |
| --- | --- | --- |
| 1 | 50 ml. of benzene | no residue. |
| 2 | do | 0.035 g. |
| 3 | do | smear. |
| 4 | 50 ml. of methylene chloride | 0.185 g. |
| 5 | do | 0.080 g. |
| 6 | 100 ml. of methylene chloride, containing 1 percent of methanol. | 0.180 g. |
| 7 | 100 ml. of methylene chloride, containing 5 percent of methanol. | 0.010 g. |
| 8 | 100 ml. of methanol | smear. |

Fraction 6 is crystallized from diethyl ether to yield 0.15 g. of methyl 18-epi-O-methyl-reserpate, M.P. 233–236°, $[\alpha]_D^{26} = -38°$ (in chloroform). The compound is identical in every respect with the product obtained according to the procedure of Example 12.

The starting material may be prepared, for example, by esterifying methyl 3-oxo-2,3-seco-reserpate with 4-bromo-benzene sulfonyl chloride in the presence of pyridine, and alcoholyzing the resulting methyl 18-O-(4-bromo-phenyl-sulfonyl)-3-oxo-2,3-seco-reserpate with methanol, preferably in the presence of a weak base, e.g. N,N,N-triethylamine and the like as shown hereinbefore. The resulting methyl 18-epi-O-methyl-3-oxo-2,3-seco-reserpate is treated with phosphorus oxychloride. The ring closing reagent is stripped off, a slurry of the residue in water is made basic with aqueous ammonia, the organic material is extracted with methylene chloride, the organic solution is dried over sodium sulfate and evaporated to dryness. 0.74 g. of methyl 18-epi-O-methyl-$\Delta^3$-dehydro-reserpate is obtained after recrystallization from methanol, M.P. 226–231°, $[\alpha]_D^{27} = +90°$ (in chloroform), ultraviolet absorption spectrum in ethanol shows the following bands (expressed in m$\mu$): $\lambda_{max}$ at 255–258 ($\epsilon$=9450), 265 ($\epsilon$=9310), 290 ($\epsilon$=9250), 317 ($\epsilon$=14,620), 330 ($\epsilon$=15,060) and 387 ($\epsilon$=6540); $\lambda_{shoulder}$ at 234 ($\epsilon$=16,930); $\lambda_{min.}$ at 252 ($\epsilon$=9340), 260–261 ($\epsilon$=9220), 273–276 ($\epsilon$=7610), 293–295 ($\epsilon$=9070), 324 ($\epsilon$=13,790) and 348 ($\epsilon$=3490).

The starting material may also be prepared, for example, by ring closing the methyl 18-O-(4-bromo-phenyl-sulfonyl)-3-oxo-2,3-seco-reserpate with phosphorus oxychloride, and alcoholyzing the resulting methyl 18-O-(4-bromo-phenyl-sulfonyl)-$\Delta^3$-dehydro-reserpate with methanol in the presence of N,N,N-triethylamine. The resulting methyl 18-epi-O-methyl-$\Delta^3$-dehydro-reserpate, may also be obtained, for example, by oxidizing methyl 18-epi-reserpate with potassium dichromate, preferably in an acidic medium, and etherifying the resulting methyl 18-epi-$\Delta^3$-dehydro-reserpate by treatment with diazomethane in the presence of fluoboric acid as shown in Example 30.

The methyl 18-epi-O-methyl-3-oxo-2,3-seco-reserpate used as an intermediate for the preparation of the methyl 18-epi-O-methyl-$\Delta^3$-dehydro-reserpate may also be obtained, for example, by esterifying in methyl 3$\beta$-hydroxy-2$\alpha$-methoxy-7-oxo-1$\alpha$,2$\beta$,3$\alpha$,4,7,8,9$\alpha$,10$\alpha$-octahydro-naphthalene 1$\beta$-carboxylate the free hydroxyl group by treatment with a strong organic sulfonic acid halide, e.g. 4-bromo-benzene sulfonic acid chloride, and the like, in the presence of pyridine and reacting the methyl 3$\beta$-(4-bromo-benzene sulfonyloxy)-2$\alpha$-methoxy-7-oxo-1$\alpha$,2$\beta$,3$\alpha$,4,7,8,9$\alpha$,10$\alpha$-octahydro-naphthalene 1$\beta$-carboxylate thus formed with methanol preferably in the presence of a weak base, for example, N,N,N-triethylamine. The resulting methyl 2$\alpha$,3$\alpha$-dimethoxy-7-oxo-1$\alpha$,2$\beta$,3$\beta$,4,7,8,9$\alpha$,10$\alpha$-octahydro-naphthalene 1$\beta$-carboxylate is then oxidized first with osmium tetroxide to the methyl 5$\alpha$,6$\alpha$-dihydroxy-2$\alpha$,3$\alpha$-dimethoxy-7-oxo-1$\alpha$,2$\beta$,3$\beta$,4,5$\beta$,6$\beta$,7,8,9$\alpha$,10$\alpha$-decahydro-naphthalene 1$\beta$-carboxylate and then with periodic acid hydrate to the methyl 5$\beta$-aldehydo-6$\beta$-carboxymethyl-2$\alpha$,3$\alpha$-dimethoxy-1$\alpha$,2$\beta$,3$\beta$,4,5$\alpha$,6$\alpha$-hexahydro-benzene 1$\beta$-carboxylate, which is then esterified with diazomethane to the methyl 5$\beta$-aldehydo-6$\beta$-carbomethoxy-methyl-2$\alpha$,3$\alpha$-dimethoxy-1$\alpha$,2$\beta$,3$\beta$,4,5$\alpha$,6$\alpha$-hexahydro-benzene 1$\beta$-carboxylate. The latter is condensed with 6-methoxy-tryptamine in benzene to form the methyl 3-methoxy-18-epi-O-methyl-3-oxo-2,3;3,4-bis-seco-$\Delta^{4(21)}$-dehydro-reserpate, which in turn is treated with sodium borohydride to reduce the Schiff-base type double bond. After re-esterification of hydrolyzed carboxyl groups the resulting methyl 3-methoxy-18-epi-O-methyl-3-oxo-2,3;3,4-bis-seco-reserpate is treated with acetic acid anhydride in pyridine to yield the desired methyl 18-epi-O-methyl-3-oxo-2,3-seco-reserpate used as the intermediate in the preparation of the starting material.

Other lower alkyl 18-epi-O-lower alkyl-$\Delta^3$-dehydro-reserpates are, for example, methyl 18-epi-O-ethyl-$\Delta^3$-dehydro-reserpate,
methyl 18-epi-O-n-propyl-$\Delta^3$-dehydro-reserpate,
methyl 18-epi-O-n-butyl-$\Delta^3$-dehydro-reserpate,
ethyl 18-epi-O-methyl-$\Delta^3$-dehydro-reserpate,
ethyl 18-epi-O-n-propyl-$\Delta^3$-dehydro-reserpate,
n-propyl 18-epi-O-methyl-$\Delta^3$-dehydro-reserpate,
n-propyl 18-epi-O-ethyl-$\Delta^3$-dehydro-reserpate,
isopropyl 18-epi-O-methyl-$\Delta^3$-dehydro-reserpate,
n-butyl 18-epi-O-methyl-$\Delta^3$-dehydro-reserpate,
isobutyl 18-epi-O-ethyl-$\Delta^3$-dehydro-reserpate and the like, in which the double bond probably extends from the 3-position to the 14-position, and salts of these compounds, such as the perchlorate and the like, in which the double bond extends from the 3-position to the 4-position.

Other highly useful intermediates are the lower alkyl 18-epi-O-lower alkyl-10-methoxy-$\Delta^3$-dehydro-deserpidates, e.g.
methyl 10-methoxy-18-epi-O-methyl-$\Delta^3$-dehydro-deserpidate,
methyl 18-epi-O-ethyl-10-methoxy-$\Delta^3$-dehydro-deserpidate,
methyl 10-methoxy-18-epi-O-n-propyl-$\Delta^3$-dehydro-deserpidate,
ethyl 10-methoxy-18-epi-O-methyl-$\Delta^3$-dehydro-deserpidate,
n-propyl 10-methoxy-18-epi-O-methyl-$\Delta^3$-dehydro deserpidate and the like, or
lower alkyl 18-epi-O-lower alkyl-$\Delta^3$-dehydro-deserpidates, e.g.
methyl 18-epi-O-methyl-$\Delta^3$-dehydro-deserpidate,
methyl 18-epi-O-ethyl-$\Delta^3$-dehydro-deserpidate,
ethyl 18-epi-O-methyl-$\Delta^3$-dehydro-deserpidate,
n-propyl 18-epi-O-methyl-$\Delta^3$-dehydro-deserpidate and the like, in which compounds the double bond probably extends from the 3-position to the 14-position, or salts thereof, such as the perchlorate and the like, in which the double bond extends from the 3-position to the 4-position, as well as lower alkyl 18-epi-O-lower alkyl-5-methyl-$\Delta^3$-dehydro-reserpates, e.g.
methyl 5-methyl-18-epi-O-methyl-$\Delta^3$-dehydro-reserpate and the like,
lower alkyl 18-epi-O-lower alkyl-6-methyl-$\Delta^3$-dehydro-reserpates, e.g.
methyl 6-ethyl-18-epi-O-methyl-$\Delta^3$-dehydro-reserpate and the like,
lower alkyl 18-epi-O-lower alkyl-6-methyl-$\Delta^3$-dehydro-deserpidates, e.g.
ethyl 6-methyl-18-epi-O-n-propyl-$\Delta^3$-dehydro-deserpidate and the like,
lower alkyl 18-epi-O-lower alkyl-9-methyl-$\Delta^3$-dehydro-deserpidates, e.g.
methyl 9-methyl-18-epi-O-methyl-$\Delta^3$-dehydro-deserpidate and the like,
lower alkyl 18-epi-O-lower alkyl-10-methyl-$\Delta^3$-dehydro-deserpidates, e.g.
methyl 18-epi-O-ethyl-10-methyl-$\Delta^3$-dehydro-deserpidate and the like,
lower alkyl 18-epi-O-lower alkyl-11-methyl-$\Delta^3$-dehydro-deserpidates, e.g.
methyl 18-epi-O-isopropyl-11-methyl-$\Delta^3$-dehydrodeserpidate and the like,
lower alkyl 18-epi-O-lower alkyl-9-methoxy-$\Delta^3$-dehydro-deserpidates, e.g.
ethyl 9-methoxy-18-epi-O-methyl-$\Delta^3$-dehydro-deserpidate and the like,
lower alkyl 10-ethoxy-18-epi-O-lower alkyl-$\Delta^3$-dehydro-deserpidates, e.g.
methyl 10-ethoxy-18-epi-O-n-propyl-$\Delta^3$-dehydro-deserpidate and the like, lower alkyl-18-epi-O-lower alkyl-10-methoxy-Δ³-dehydro-reserpates, e.g.
methyl 10-methoxy-18-epi-O-methyl-Δ³-dedydro-reserpate and the like,
lower alkyl 9,10-dimethoxy-18-epi-O-lower alkyl-Δ³-dehydro-reserpates, e.g.
methyl 9,10-dimethoxy-18-epi-O-ethyl-Δ³-dehydro-reserpate and the like,
lower alkyl 11-ethoxy-18-epi-O-lower alkyl-Δ³-dehydro-deserpidates, e.g.
methyl-11-ethoxy-18-epi-O-methyl-Δ³-dehydro-deserpidate and the like,
lower alkyl 18-epi-O-lower alkyl-11-n-propyloxy-Δ³-dehydro-deserpidates, e.g.
ethyl 18-epi-O-ethyl-11-n-propyloxy-Δ³-dehydro-deserpidate and the like,
lower alkyl 11-isopropyloxy-18-epi-O-lower alkyl-Δ³-dehydro-deserpidates, e.g.
methyl 11-isopropyloxy-18-epi-O-n-propyl-Δ³-dehydro-deserpidate and the like,
lower alkyl 11-n-butyloxy-18-epi-O-lower alkyl-Δ³-dehydro-deserpidates, e.g.
methyl 11-n-butyloxy-18-epi-O-methyl-Δ³-dehydro-deserpidate and the like,
lower alkyl 18-epi-O-lower alkyl-12-methoxy-Δ³-dehydro-deserpidates, e.g.
methyl 12-methoxy-18-epi-O-n-propyl-Δ³-dehydro-deserpidate and the like,
lower alkyl 18-epi-O-lower alkyl-10,11-methylenedioxy-Δ³-dehydro-deserpidates, e.g.
methyl 18-epi-O-methyl-10,11-methylenedioxy-Δ³-dehydro-deserpidate and the like,
lower alkyl 18-epi-O-lower alkyl-10-methylmercapto-Δ³-dehydro-deserpidates, e.g.
methyl 18-epi-O-ethyl-10-methylmercapto-Δ³-dehydro-deserpidate and the like,
lower alkyl 18-epi-O-lower alkyl-11-methylmercapto-Δ³-dehydro-deserpidates, e.g.
methyl 18-epi-O-methyl-11-methylmercapto-Δ³-dehydro-deserpidate and the like,
lower alkyl 11-ethylmercapto-18-epi-O-lower alkyl-Δ³-dehydro-deserpidates, e.g.
methyl 11-ethyl-mercapto-18-epi-O-methyl-Δ³-dehydro-deserpidate and the like,
lower alkyl 10-chloro-18-epi-O-lower alkyl-Δ³-dehydro-deserpidates, e.g.
methyl 10-chloro-18-epi-O-ethyl-Δ³-dehydro-deserpidate and the like,
lower alkyl 10-bromo-18-epi-O-lower alkyl-Δ³-dehydro-reserpates, e.g.
methyl 10-bromo-18-epi-O-methyl-Δ³-dehydro-reserpate and the like,
lower alkyl 11-fluoro-18-epi-O-lower alkyl-Δ³-dehydro-deserpidates, e.g.
methyl 11-fluoro-18-epi-isopropyl-Δ³-dehydro-deserpidate and the like,
lower alkyl 17α-desmethoxy-17α-ethoxy-18-epi-O-lower alkyl-Δ³-dehydro-reserpates, e.g.
methyl 17α-desmethoxy-17α-ethoxy-18-epi-O-methyl-Δ³-dehydro-reserpate, and the like,
lower alkyl 17α-desmethoxy-18-epi-O-lower alkyl-17α-n-propyloxy-Δ³-dehydro-reserpates, e.g.
methyl 17α-desmethoxy-18-epi-O-ethyl-17α-n-propyloxy-Δ³-dehydro-reserpate and the like,
lower alkyl 17α-desmethoxy-17α-ethoxy-18-epi-O-lower alkyl-Δ³-dehydro-deserpidates, e.g.
methyl 17α-desmethoxy-17α-ethoxy-18-epi-O-methyl-Δ³-dehydro-deserpidate and the like,
lower alkyl 17α-cyano-17α-desmethoxy-18-epi-O-lower alkyl-Δ³-dehydro-reserpates, e.g.
methyl 17α-cyano-17α-desmethoxy-18-epi-O-ethyl-Δ³-dehydro-reserpate and the like,
lower alkyl 17α-cyano-17α-desmethoxy-18-epi-O-lower alkyl-Δ³-dehydro-deserpidates, e.g.
ethyl 17α-cyano-17α-desmethoxy-18-O-methyl-Δ³-dehydro-deserpidate and the like,
or any other analogous compounds such as those mentioned hereinbefore, in which the double bond probably extends from the 3-position to the 14-position, or salts of these compounds, in which the double bond extends from the 3-position to the 4-position. Upon reduction of the double bond extending from the 3-position, these compounds can be converted into the desired compounds of this invention.

Important intermediates used for the preparation of the above starting materials are lower alkyl 18-epi-O-lower alkyl-3-oxo-2,3-seco-reserpates other than the above-mentioned methyl 18-epi-O-methyl-3-oxo-2,3-seco-reserpate, such as, for example,
methyl 18-epi-O-ethyl-3-oxo-2,3-seco-reserpate,
methyl 18-epi-O-n-propyl-3-oxo-2,3-seco-reserpate,
ethyl 18-epi-O-methyl-3-oxo-2,3-seco-reserpate,
n-propyl 18-epi-O-methyl-3-oxo-2,3-seco-reserpate and the like,
lower alkyl 18-epi-O-lower alkyl-10-methoxy-3-oxo-2,3-seco-deserpidates, e.g.
methyl 10-methoxy-18-epi-O-methyl-3-oxo-2,3-seco-deserpidate,
methyl 18-epi-O-ethyl-10-methoxy-3-oxo-2,3-seco-deserpidate,
ethyl 10-methoxy-18-epi-O-methyl-3-oxo-2,3-seco-deserpidate,
n-propyl 10-methoxy-18-epi-O-methyl-3-oxo-2,3-seco-deserpidate and the like, or
lower alkyl 18-epi-O-lower alkyl-3-oxo-2,3-seco-deserpidates, e.g.
methyl 18-epi-O-methyl-3-oxo-2,3-seco-deserpidate,
methyl 18-epi-O-ethyl-3-oxo-2,3-seco-deserpidate,
ethyl 18-epi-O-methyl-3-oxo-2,3-seco-deserpidate,
n-propyl 18-epi-O-methyl-3-oxo-2,3-seco-deserpidate and the like,
as well as
lower alkyl 18-epi-O-lower alkyl-5-methyl-3-oxo-2,3-seco-reserpates, e.g.
methyl 5-methyl-18-epi-O-methyl-3-oxo-2,3-seco-reserpate and the like,
lower alkyl 18-epi-O-lower alkyl-6-methyl-3-oxo-2,3-seco-reserpates, e.g.
methyl 18-epi-O-ethyl-6-methyl-3-oxo-2,3-seco-reserpate and the like,
lower alkyl 18-epi-O-lower alkyl-6-methyl-3-oxo-2,3-seco-deserpidates, e.g.
methyl 6-methyl-18-epi-O-methyl-3-oxo-2,3-seco-deserpidate and the like,
lower alkyl 18-epi-O-lower alkyl-9-methyl-3-oxo-2,3-seco-deserpidates, e.g.
methyl 9-methyl-18-epi-O-n-propyl-3-oxo-2,3-seco-deserpidate and the like,
lower alkyl 10-methyl-18-epi-O-lower alkyl-3-oxo-2,3-seco-deserpidates, e.g.
methyl 18-epi-O-ethyl-10-methyl-3-oxo-2,3-seco-deserpidate and the like,
lower alkyl 18-epi-O-lower alkyl-11-methyl-3-oxo-2,3-seco-deserpidates, e.g.
methyl 11-methyl-18-epi-O-methyl-3-oxo-2,3-seco-deserpidate and the like,
lower alkyl 18-epi-O-lower alkyl-9-methoxy-3-oxo-2,3-seco-deserpidates, e.g.
methyl 18-epi-O-ethyl-9-methoxy-3-oxo-2,3-seco-deserpidate and the like,
lower alkyl 10-ethoxy-18-epi-O-lower alkyl-3-oxo-2,3-seco-deserpidates, e.g.
methyl 10-ethoxy-18-O-methyl-3-oxo-2,3-seco-deserpidate and the like,
lower alkyl 18-epi-O-lower alkyl-10-methoxy-3-oxo-2,3-seco-reserpates, e.g.
methyl 10-methoxy-18-epi-O-methyl-3-oxo-2,3-seco-reserpate and the like,
lower alkyl 9,10-dimethoxy-18-epi-O-lower alkyl-3-oxo-2,3-seco-reserpates, e.g.
methyl 9,10-dimethoxy-18-epi-O-methyl-3-oxo-2,3-seco-reserpate and the like, lower alkyl 11-ethoxy-18-epi-O-lower alkyl-3-oxo-2,3-seco-deserpidates, e.g.
methyl 11-ethoxy-18-epi-O-ethyl-3-oxo-2,3-seco-deserpidate and the like,
lower alkyl 18-epi-O-lower alkyl-11-n-propyloxy-3-oxo-2,3-seco-deserpidates, e.g.
methyl 18-epi-O-methyl-11-n-propyloxy-3-oxo-2,3-seco-deserpidate and the like,
lower alkyl 11-isopropyloxy-18-epi-O-lower alkyl-3-oxo-2,3-seco-deserpidates, e.g.
methyl 11-isopropyloxy-18-epi-O-n-propyl-3-oxo-2,3-seco-deserpidate and the like,
lower alkyl 11-n-butyloxy-18-epi-O-lower alkyl-3-oxo-2,3-seco-deserpidates, e.g.
methyl 11-n-butyloxy-18-epi-O-methyl-3-oxo-2,3-seco-deserpidate and the like,
lower alkyl 18-epi-O-lower alkyl-12-methoxy-3-oxo-2,3-seco-deserpidates, e.g.
methyl 12-methoxy-18-epi-O-methyl-3-oxo-2,3-seco-deserpidate and the like,
lower alkyl 18-epi-O-lower alkyl-10-11-methylenedioxy-3-oxo-2,3-seco-deserpidates, e.g.
ethyl 18-epi-O-methyl-10,11-methylenedioxy-3-oxo-2,3-seco-deserpidate and the like,
lower alkyl 18-epi-O-lower alkyl-10-methylmercapto-3-oxo-2,3-seco-deserpidates, e.g.
methyl 18-epi-O-isopropyl-10-methylmercapto-3-oxo-2,3-seco-deserpidate and the like,
lower alkyl 18-epi-O-lower alkyl-11-methylmercapto-3-oxo-2,3-seco-deserpidates, e.g.
methyl 18-epi-O-methyl-11-methylmercapto-3-oxo-2,3-seco-deserpidate and the like,
lower alkyl 11-ethylmercapto-18-epi-O-lower alkyl-3-oxo-2,3-seco-deserpidates, e.g.
methyl 11-ethylmercapto-18-epi-O-n-propyl-3-oxo-2,3-seco-deserpidate and the like,
lower alkyl 10-chloro-18-epi-O-lower alkyl-3-oxo-2,3-seco-deserpidates, e.g.
methyl 10-chloro-18-epi-O-methyl-3-oxo-2,3-seco-deserpidate and the like,
lower alkyl 10-bromo-18-epi-O-lower alkyl-3-oxo-2,3-seco-reserpates, e.g.
methyl 10-bromo-18-epi-O-ethyl-3-oxo-2,3-seco-reserpate and the like,
lower alkyl 11-fluoro-18-epi-O-lower alkyl-3-oxo-2,3-seco-deserpidates, e.g.
methyl 11-fluoro-18-epi-O-isopropyl-3-oxo-2,3-seco-deserpidate and the like,
lower alkyl 17α-desmethoxy-17α-ethoxy-18-epi-O-lower alkyl-3-oxo-2,3-seco-reserpates, e.g.
methyl 17α-desmethoxy-17α-ethoxy-18-epi-O-methyl-3-oxo-2,3-seco-reserpate and the like,
lower alkyl 17α-desmethoxy-18-epi-O-lower alkyl-17α-n-propyloxy-3-oxo-2,3-seco-reserpates, e.g.
methyl 17α-desmethoxy-18-epi-O-ethyl-17α-n-propyloxy-3-oxo-2,3-seco-reserpate and the like,
lower alkyl 17α-desmethoxy-17α-ethoxy-18-epi-O-lower alkyl-3-oxo-2,3-seco-deserpidates, e.g.
methyl 17α-desmethoxy-17α-ethoxy-18-epi-O-methyl-3-oxo-2,3-seco-deserpidate and the like,
lower 17α-cyano-17α-desmethoxy-18-epi-O-lower alkyl-3-oxo-2,3-seco-deserpidates, e.g.
methyl 17α-cyano-17α-desmethoxy-18-epi-O-ethyl-3-oxo-2,3-seco-deserpidate and the like,
lower alkyl 17α-cyano-17α-desmethoxy-18-epi-O-lower alkyl-reserpates, e.g.
methyl 17α-cyano-17α-desmethoxy-18-epi-O-methyl-3-oxo-2,3-seco-reserpate and the like, or any other analogous compound, such as one of those mentioned hereinbefore. These compounds, upon ring closure, for example, with phosphorus oxychloride yield the desired Δ³-dehydro-allo-yohimbene 16-carboxylic acid esters or salts thereof, which are used as the starting materials in the previously described procedure.

*Example 45*

A solution of 1.5 g. of methyl 18-epi-O-methyl-3-iso-reserpate is heated in 50 ml. of glacial acetic acid for about twenty-four hours under an atmosphere of nitrogen. The reaction mixture is concentrated under reduced pressure to a small volume, water is added to the residue and the solution is extracted with chloroform. The organic solution is separated, washed with water and evaporated under reduced pressure. From the residue, the desired methyl 18-epi-O-methyl-reserpate, which is identified by paper chromatography, can be isolated by chromatography on aluminum oxide; the resulting product is identical with the compound obtained according to the procedure of Example 12.

The starting material used in the above procedure may be prepared as follows: A mixture of 0.125 g. of methyl 18-epi-O-methyl-Δ³-dehydro-reserpate in 20 ml. of methanol is warmed gently to solubilize the material and then cooled in an ice-water bath. 0.25 g. of sodium borohydride in small portions is added over a period of one-half hour, the reaction mixture is allowed to stand for an additional one-half hour while cooling and is diluted with water. The organic material is extracted with methylene chloride, the organic solution is dried over sodium sulfate and evaporated to dryness. The residue is crystallized from diethyl ether to yield methyl 18-epi-O-methyl - 3 - iso-reserpate, M.P. 225–229°; $[\alpha]_D^{26} = -37°$ (chloroform); yield: 0.11 g.

Other compounds, which may be used as starting materials in the above-described isomerization procedure are lower alkyl 18-epi-O-lower alkyl-3-iso-reserpates other than
methyl 18-epi-O-methyl-3-iso-reserpate, e.g.
methyl 18-epi-O-ethyl-3-iso-resperpate,
methyl 18-epi-O-n-propyl-3-iso-reserpate,
methyl 18-epi-O-isobutyl-3-iso-reserpate,
ethyl 18-epi-O-methyl-3-iso-reserpate and the like,
lower alkyl 18-epi-O-lower alkyl-10-methoxy - 3 - iso-deserpidates, e.g.
methyl 10-methoxy-18-epi-O-methyl-3-iso-deserpidate,
methyl 18-epi-O-ethyl-10-methoxy-3-iso-deserpidate,
methyl 10-methoxy-18-epi-O-n-propyl-3-iso-deserpidate,
ethyl 10-methoxy-18-epi-O-methyl - 3 - iso-deserpidate and the like, or
lower alkyl 18-epi-O-lower alkyl-3-iso-deserpidates, e.g.
methyl 18-epi-O-methyl-3-iso-deserpidate,
methyl 18-epi-O-ethyl-3-deserpidate,
methyl 18-epi-O-n-propyl-3-iso-deserpidate,
ethyl 18-epi-O-methyl-3-iso-deserpidate,
n-propyl 18-epi-O-methyl-3-iso-deserpidate and the like, or salts of these compounds, or any other 18α-etherified hydroxy-allo-yohimbane 16-carboxylic acid esters, which contain substituents, such as those previously mentioned, attached to positions available for substitution. These compounds are useful as starting materials in the isomerization procedure described in the example hereinbefore.

*Example 46*

A mixture of 3.17 g. of methyl 18-O-(4-bromo-phenylsulfonyl)-reserpate in 200 ml. of allyl alcohol containing 1 ml. of N,N,N-triethylamine is stirred and refluxed in an atmosphere of nitrogen for 45 hours. The solution is concentrated to dryness under reduced pressure and the residue is dissolved in methylene chloride; the organic solution is washed with a aqueous sodium carbonate solution and with water, and is dried over sodium sulfate. After evaporating the solvent, the residue is recrystallized from acetone to yield methyl 18-epi-O-allyl-reserpate, M.P. 208–210°; yield: 0.9 g.

The hydrochloride, M.P. 198–201°, is prepared by lyophilizing a solution of the free base in 0.1 N hydrochloric acid.

Other 18-allyloxy-3-epi-allo-yohimbane 16-carboxylic acid esters, such as ethyl 18-epi-O-allyl-reserpate, methyl 18-epi-O-allyl-deserpidate and the like, may be prepared according to the above procedure.

*Example 47*

A mixture of 2.12 g. of methyl 18-O-(4-bromo-phenyl-sulfonyl)-deserpidate, 160 ml. of methanol and 0.40 g. of N,N,N-triethylamine is heated in a sealed pressure bottle on the steam bath for 24 hours while stirring. The reaction mixture is worked up as shown in Example 36 to yield 0.75 g. of methyl 18-epi-O-methyl-deserpidate, M.P. 123–127° (foaming), $[\alpha]_D^{27}=-62°$ (chloroform).

The starting material may be prepared by reacting a mixture of 5.67 g. of methyl deserpidate, 9.6 g. of 4-bromobenzene sulfonyl chloride and 80 ml. of pyridine as shown in Example 36 to yield the desired methyl 18-O-(4-bromo-phenyl-sulfonyl)-deserpidate, M.P. 198–200°, $[\alpha]_D^{26}=-90°$ (chloroform); yield: 5.0 g.

*Example 48*

A mixture of n-propyl 18-O-(4-bromo-phenyl-sulfonyl)-reserpate, 160 ml. of n-propanol and 0.45 g. of N,N,N-triethylamine is heated for one week as shown in Example 19; the reaction mixture is worked up as described in Example 36 to yield the n-propyl 18-epi-O-n-propyl-reserpate, M.P. 192–195°, $[\alpha]_D^{24}=-12$ (chloroform); yield: 0.67 g.

*Example 49*

A mixture of 5.0 g. of methyl 18-O-(4-bromo-phenyl-sulfonyl)-reserpate, 250 ml. of 2-methoxyethanol and 1.5 ml. of N,N,N-triethylamine is heated for one week; 2.5 g. of methyl 18-epi-O-(2-methoxyethyl)-reserpate is obtained by working up the reaction mixture as shown in Example 36. It melts at 217–219°, $[\alpha]_D^{26}=-24°$ (chloroform) and it hydrochloride melts at 209–210°.

Other 18-etherified hydroxy-lower alkoxy-3-epi-allo-yohimbane 16-carboxylic acid esters, such as methyl 18-epi-O-(2-ethoxyethyl)-reserpate, ethyl 18-epi-O-(2-methoxyethyl)-reserpate, methyl 18-epi-O-(2-methoxyethyl)-deserpidate, n-propyl 18-epi-O-(3-methoxypropyl)-deserpidate and the like may be prepared according to the above procedure.

*Example 50*

A mixture of 3.17 g. of methyl 18-O-(4-bromo-phenyl-sulfonyl)-reserpate, 50 ml. of crotyl alcohol (2-butenol) and 2 ml. of N,N,N-triethylamine is refluxed for 70 hours in an atmosphere of nitrogen and worked up as shown in Example 36. The resulting methyl 18-epi-O-(2-butenyl)-reserpate is recrystallized from methanol, M.P. 212–213°; yield: 0.8 g. first crop.

Other 18-(2-butenyloxy)-3-epi-allo-yohimbane 16-carboxylic acid esters, such as ethyl 18-epi-O-(2-butenyl)-reserpate, methyl 18-epi-O-(2-butenyl)-deserpidate, ethyl 18-epi-O-(2-butenyl)-10-methoxy-deserpidate and the like, may be prepared according to the above procedure by selecting the proper starting materials.

*Example 51*

A mixture of 4.3 g. of methyl 18-O-(3-nitro-phenyl-sulfonyl)-reserpate, 25 g. of cyclopropylmethanol and 2 ml. of N,N,N-triethylamine is stirred in a sealed flask and under an atmosphere of nitrogen for 4½ days while maintaining a temperature of 100°. The solution is concentrated under reduced pressure and the residue is dissolved in methylene chloride; the organic solution is washed with a five per cent aqueous solution of sodium carbonate and with a saturated aqueous solution of sodium chloride, dried over sodium sulfate and then concentrated to dryness under reduced pressure. The oily residue crystallizes in a mixture of methanol and water, and the resulting methyl 18-epi-O-cyclopropyl-methyl-reserpate is recrystallized from methanol and water, M.P. 225–227°; yield: 2.6 g.

Other 18α-cycloalkyl-lower alkoxy-3-epi-allo-yohimbane 16-carboxylic acid esters, particularly lower alkyl 18-epi-O-cycloalkyl-lower alkyl-reserpates and lower alkyl 18-epi-O-cycloalkyl-lower alkyl deserpidates, are, for example, methyl 18-epi-O-cyclobutylmethyl-reserpate, methyl 18-epi-O-cyclopentylmethyl-reserpate, methyl 18-epi-O-(2-cyclopentylethyl)-reserpate, methyl 18-epi-O-cyclohexylmethyl-reserpate, methyl 18-epi-O-cycloheptylmethyl-reserpate, ethyl 18-epi-O-cyclopropylmethyl-reserpate, n-propyl 18-epi-O-cyclopentylmethyl-reserpate, methyl 18-epi-O-cyclopropylmethyl-deserpidate, methyl 18-epi-O-cyclopentylmethyl-deserpidate, ethyl 18-epi-O-cyclopropylmethyl-deserpidate and the like may be prepared according to the above procedure using the appropriate starting materials.

*Example 51A*

A solution of 4.25 g. of n-propyl reserpate and 130 ml. of the stock fluoboric acid solution described in Example 1 is treated with about five to six times the theoretical amount of a diazomethane solution in methylene chloride at −10°. The reaction mixture is worked up as shown in Example 1; the n-propyl 18-O-methyl-reserpate melts at 164–165° after recrystallization from a 1:4-mixture of benzene and cyclohexane $[\alpha]_D^{25}=-93°$ (chloroform); yield: 0.25 g.

*Example 52*

A mixture of 18.0 g. of methyl 18-O-(3-nitro-phenyl-sulfonyl)-reserpate, 1440 ml. of ethanol and 3.6 g. of N,N,N-triethylamine is refluxed for about 40 hours. After decolorizing with charcoal the solution is taken to dryness under reduced pressure, the residue is dissolved in 200 ml. of methylene chloride, the organic solution is washed with two portions of 100 ml. of a five percent aqueous sodium carbonate solution and then with 200 ml. of a saturated aqueous sodium chloride solution. The aqueous washings are extracted with 50 ml. of methylene chloride, the organic solutions are combined, dried over sodium sulfate and evaporated to dryness under reduced pressure. The residue is recrystallized by dissolving it in 170 ml. of hot isopropanol and chilling overnight to 0–5°. The resulting methyl 18-epi-O-ethyl-reserpate is filtered off, washed with cold isopropanol and dried, M.P. 220–223°; yield: 10.28 g. The compound is identical with the product obtained according to the procedure of Example 17.

The starting material may be prepared as follows: To a mixture of 20.70 g. of methyl reserpate and 31.5 ml. of pyridine is added 13.8 g. of 3-nitro-benzene sulfonyl chloride in an atmosphere of nitrogen. The solution is cooled while stirring and is allowed to stand at 18° for 16 hours. 165 ml. of methanol and 4.30 ml. of glacial acetic acid is added, followed by a solution of 7.30 g. of potassium thiocyanate in 7.30 ml. of water. The precipitate formed after scratching is filtered off, the solid material is washed with cold methanol and dried at 60° under reduced pressure to yield 31.0 g. of methyl 18-O-(3-nitro-phenyl-sulfonyl)-reserpate thiocyanate, which melts over a range of 25° at 190–215°.

31.0 g. of methyl 18-O-(3-nitro-phenyl-sulfonyl)-reserpate thiocyanate is added to a mixture of 775 ml. of methanol and 39 ml. of water; the mixture is heated to reflux to ensure complete solution, is cooled to about 50° and treated with 5.25 g. of N,N,N-triethylamine. The mixture is stirred at 35° for about 45 minutes, chilled to 10° and then filtered. The solid material is washed with a cold 1:1-mixture of methanol and water, dried at 60° under reduced pressure (weight: 20.1 g.) and recrystallized from a large volume of methanol to yield methyl 18-O-(3-nitro-phenyl-sulfonyl)-reserpate, M.P. 189–190°.

*Example 53*

To a solution of 1.1 g. of methyl 18-epi-O-methyl-reserpate in 5 ml. of methylenechloride, kept at 0° is added while stirring 7.2 ml. of a 0.36 M perbenzoic acid solution in chloroform over a period of five minutes. Stirring is continued for an additional twenty minutes; the organic solution is washed twice with a five percent aqueous sodium carbonate solution, with water and with a saturated aqueous sodium chloride solution. The dried organic layer is evaporated, the frothy residue (0.9 g.) is dissolved in methylene chloride and the solution is placed on a column containing 25 g. of aluminum oxide (neutral, activity II–III). After washing with methylene chloride, the desired methyl 18-epi-O-methyl-reserpate N-oxide is eluted with methylene chloride, containing 0.5 percent methanol, and methylene chloride, containing 1 percent methanol, and is crystallized by stirring the residue from these eluates with moist ethyl acetate. It is recrystallized by dissolving it in a boiling mixture of methylene chloride and moist ethyl acetate, followed by evaporating most of the former solvent. The monohydrate of methyl 18-epi-O-methyl-reserpate N-oxide melts at 234–236° (with sintering).

*Example 54*

The 18-etherified hydroxy-3-epi-allo-yohimbane 16-carboxylic acid esters of the present invention, salts, N-oxides or salts of N-oxides thereof, may be used in the form of pharmaceutically acceptable preparations. For example, methyl 18-O-methyl reserpate may be employed in therapeutically acceptable tablets containing 0.00025 g. of the active substance (procedure for 10,000 tablets).

Ingredients: G.
  Methyl 18-O-methyl-reserpate _____ 2.500
  Lactose, spray dried _____ 942.500
  Corn starch _____ 50.000
  Magnesium stearate, U.S.P _____ 5.000

The methyl 18-O-methyl-reserpate is triturated with the corn starch and the mixture is forced through a No. 60 screeen. The lactose and the magnesium stearate is passed through a No. 20 screen, and all ingredients are mixed in a suitable mixer until the mix is homogenous. Tablets weighing 0.1 g. are compressed using 0.25 inch punches and dies.

Tablets containing 0.0005 g. of methyl 18-O-methyl-reserpate are prepared as follows (procedure for 10,000 tablets).

Ingredients: G.
  Methyl 18-O-methyl-reserpate _____ 5.000
  Lactose, U.S.P _____ 1420.000
  Tragacanth 550 _____ 15.000
  Polyethylene glycol 6000 _____ 30.000
  Talc, U.S.P _____ 22.500
  Magnesium stearate, U.S.P _____ 7.500
  3A alcohol, 50% _____ Q.s.

The methyl 18-O-methyl reserpate is triturated with the tragacanth and forced through a No. 60 screen. The lactose, the talc and the magnesium stearate are forced through a No. 20 screen, and all ingredients are mixed until homogenous. The polyethylene glycol is dissolved in 40 ml. of the alcohol, and the above-mixed powder is wetted with this solution, if necessary, by adding an additional amount of alcohol. The moist mass is passed through a No. 10 screen and dried at about 37°. The resulting granules are broken on a No. 16 screen. Tablets weighing 0.150 g. are compressed using 9/32 inch dies and standard concave punches, uppers bisected.

Tablets containing 0.00025 g. of methyl 18-O-methyl-reserpate hydrochloride as the active ingredient may be prepared as follows (for 16,000 tablets).

Ingredients: G.
  Methyl 18-O-methyl-reserpate hydrochloride _____ 4.000
  Lactose, spray dried _____ 1508.000
  Corn starch _____ 80.000
  Magnesium stearate, U.S.P _____ 8.000

The methyl 18-O-methyl-reserpate hydrochloride is triturated with the corn starch; the mixture is forced through a No. 60 sieve; the tools and the sieve are rinsed with a small amount of lactose. The remaining lactose and the magnesium stearate are passed through a No. 20 screen. All ingredients are mixed for thirty minutes and then compressed into tablets weighing 0.100 g., using 9/32 inch die, standard concave punches, uppers bisected, lowers plain.

Tablets containing 0.0005 g. of methyl 18-O-methyl-reserpate hydrochloride may be prepared as follows (for 800 tablets).

Ingredients: G.
  Methyl 18-O-methyl-reserpate hydrochloride _____ 0.400
  Lactose, spray dried _____ 112.600
  Corn starch _____ 6.000
  Magnesium stearate _____ 1.000

The ingredients are carefully mixed and passed through a No. 60 screen. Tablets weighing 0.15 g. are compressed, using 9/32 punches and dies.

An injectable solution containing 0.0025 g. of methyl 18-O-methyl-reserpate hydrochloride per milliliter may be prepared as follows (for 1200.00 ml.).

Ingredients: G.
  Methyl 18-O-methyl-reserpate hydrochloride _____ 3.0000
  Sodium acetate, anhydrous _____ 7.2000
  Acetic acid, glacial _____ 5.1000
  Ethylenediamine tetraacetic acid Fe-3 ___ 0.1200
  Thiourea _____ 1.2000
  Water for injection, q.s., 1200.0000 ml.

The sodium acetate, acetic acid, ethylenediamine tetraacetic acid Fe-3 and thiourea are dissolved in 1150 ml. of water for injection. The methyl 18-O-methyl-reserpate is added, the solution is mixed and water is added to complete the total volume of 1200 ml. The solution is flushed with nitrogen for fifteen minutes, filtered through a medium porosity glass filter and filled into 2 ml. amber ampuls, flushed with nitrogen. The ampuls are sealed, sterilized at 10 pounds pressure at 115° for thirty minutes, washed and inspected.

Tablets containing 0.0005 g. of methyl 18-epi-O-methyl-reserpate hydrochloride as the active ingredient may be prepared as follows (for 20,000 tablets).

Ingredients: G.
  Methyl 18-epi-O-methyl reserpate hydrochloride _____ 10.000
  Lactose, spray dried _____ 2675.000
  Corn starch _____ 300.000
  Magnesium stearate _____ 15.000

The methyl 18-epi-O-methyl-reserpate hydrochloride is triturated with the corn starch and forced through a No. 60 sieve; the tools and the sieve are rinsed with a small amount of lactose. The remainder of the lactose and the magnesium stearate are passed through a No. 20 screen, placed in a mixer and the triturate is added. The mass is mixed together for twenty minutes, and the mix is compressed into tablets weighing 0.150 g., using 9/32 inch die, standard concave punches, uppers bisected, lowers plain.

An injectable solution containing 0.5 mg./ml. of methyl 18-epi-O-methyl-reserpate hydrochloride as the active ingredient may be prepared as follows (for 120 ml.).

Ingredients: G.
  Methyl 18-epi-O-methyl-reserpate hydrochloride _____ 0.600
  Sodium acetate, anhydrous _____ 0.720
  Acetic acid, glacial _____ 0.510
  Ethylenediamine tetraacetic acid Fe-3 ___ 0.012
  Thiourea _____ 0.120
  Water for injection q.s., 120.000 ml.

The ingredients with the exception of methyl 18-epi-O-methyl-reserpate hydrochloride are dissolved in 110 ml. of water. Nitrogen gas is bubbled through the solution and the active compound is dissolved therein. Sufficient water is added to complete the volume of 120 ml., the solution is filtered, and 5 ml. portions are filled into 5 ml. clear glass ampules which are sterilized at 110° for thirty minutes.

The single pharmaceutical preparation for oral use (e.g. tablets, capsules, pills and the like) contains from about 0.00005 g. to about 0.05 g. of one of the 18-etherified hydroxy-3-epi-allo-yohimbane 16-carboxylic acid esters, salts, N-oxides or salts of the N-oxides of the present invention as the active ingredient. More especially, a single, orally administered tablet may contain from about 0.00005 g. to about 0.05 g., particularly from about 0.0001 g. to about 0.01 g., of a lower alkyl 18-O-lower alkyl-reserpate, e.g. methyl 18-O-lower alkyl-reserpate and the like, or of a lower alkyl 18-epi-O-lower alkyl-reserpate, e.g. methyl 18-epi-O-methyl-reserpate, methyl 18-epi-O-ethyl-reserpate, methyl 18-epi-O-n-propyl-reserpate and the like or of a therapeutically acceptable, non-toxic acid addition salt, such as the hydrochloride and the like, of such compound.

Solutions, for example, for injectable use, contain from about 0.001 g./ml. to about 0.05 g./ml. of an 18-etherified hydroxy-3-epi-allo-yohimbane 16-carboxylic acid ester, a therapeutically acceptable acid addition salt, an N-oxide or a therapeutically acceptable acid addition salt, an N-oxide or a therapeutically acceptable acid addition salt thereof. These solutions may be illustrated by injectable solutions containing from about 0.0001 g./ml. to about 0.05 g./ml., especially from about 0.001 g./ml. to about 0.01 g./ml. of a lower alkyl 18-O-lower alkyl-reserpate, e.g. methyl 18-O-methyl-reserpate and the like, or of a lower alkyl 18-epi-O-lower alkyl-reserpate, e.g. methyl 18-epi-O-methyl-reserpate, methyl 18-epi-O-ethyl-reserpate, methyl 18-epi-O-n-propyl-reserpate and the like, or a therapeutically acceptable acid addition salt, such as the hydrochloride and the like, of such compound.

*Example 55*

The compounds of the present invention can also be used in the veterinary field. For example, they may be employed as tranquilizing agents for quieting animals to facilitate handling, primarily at the time of vaccination, shipment and the like.

For example, a composition suitable for veterinary use, containing methyl 18-O-methyl-reserpate hydrochloride, may be prepared as follows.

Premix:

| | G. |
|---|---|
| Methyl 18-O-methyl-reserpate hydrochloride | 22.000 |
| Wheat standard middlings, 30–80 mesh | 10,978.000 |
| Total weight | 11,000.000 |

Feed formula:

| | |
|---|---|
| Corn meal | 1,062.875 |
| Fat | 80.000 |
| Fish meal, 60% protein | 100.000 |
| Soybean meal, 50% protein | 500.000 |
| Corn gluten meal | 100.000 |
| Dehydrated alfalfa meal | 50.000 |
| Corn distiller solubles | 40.000 |
| Di-calcium phosphate | 28.000 |
| Calcium carbonate | 20.000 |
| Iodized salt | 10.000 |
| Vitamins A and D (1,000,000 A and 250,000 D/pound) | 4.000 |
| Calcium pantothenate | 0.250 |
| Butylated hydroxy toluene | 0.250 |
| Choline chloride 25% | 2.500 |
| Riboflavin conc. (24 g. per pound) | 0.125 |
| Vitamin $B_{12}$ (0.02 g. per pound) | 1.000 |
| Methionine | 0.500 |
| Manganese sulfate | 0.500 |
| Total weight | 2,000.000 |

The premix is made by adding the methyl 18-O-methyl-reserpate hydrochloride to the wheat and then mixing until uniformity is obtained.

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish meal, soy bean meal, corn gluten meal and corn distiller solubles. After a uniform mixture has been obtained, vitamins A and D, calcium pantothenate, choline chloride, riboflavin, vitamin $B_{12}$ and methionine are added in that order. Mixing is continued after the addition of butylated hydroxy toluene, and maintained until a uniform product is obtained.

The premix is added to the feed formula prepared as described above in an amount sufficient to provide a concentration of 0.02 g. of methyl 18-O-methyl-reserpate hydrochloride per 1000 g. of feed in the uniformly blended mix.

For sedation and quieting of birds one may desirably use from about 0.00025 g. to about 0.100 g. of methyl 18-O-methyl-reserpate hydrochloride per 1000 g. of feed. The dosage of the active ingredient depends largely on the type of treatment intended. Thus, long-term application of medicated feed require smaller amounts of active compound, whereas short term treatment has to be carried out at higher dose levels.

Sedation in animals, particularly in poultry, may also be accomplished by adding, for example, the water-soluble methyl 18-O-methyl-reserpate hydrochloride to the drinking water; aqueous solutions of methyl 18-O-methyl-reserpate hydrochloride of about 0.0004 to about 0.01 percent, particularly of about 0.0015 to about 0.005 percent, strength are adequate for quieting animals.

In the above mentioned preparations the methyl 18-O-methyl-reserpate hydrochloride may be replaced by other 18-etherified hydroxy-3-epi-allo-yohimbane 16-carboxylic acid esters, salts, N-oxides or salts of N-oxides thereof, particularly by lower alkyl 18-epi-O-lower alkyl-reserpate or salts thereof, such as, for example, methyl 18-epi-O-methyl-reserpate hydrochloride, methyl 18-epi-O-etheyl-reserpate hydrochloride and the like.

For example, a composition suitable as a medicated feed, containing methyl 18-epi-O-methyl-reserpate hydrochloride, may be prepared as follows.

Premix:

| | G. |
|---|---|
| Methyl 18-epi-O-methyl-reserpate hydrochloride | 44.000 |
| Wheat standard middlings, 30–80 mesh | 10,956.000 |
| Total weight | 11,000.000 |

The premix and the complete feed is prepared as described hereinbefore.

Sedation of animals particularly poultry, may also be achieved by adding from about 0.001 to about 0.02 percent, especially from about 0.002 to about 0.016 percent, of methyl 18-epi-O-methyl-reserpate hydrochloride to drinking water. Other 18α-etherified hydroxy-3-epi-allo-yohimbane 16-carboxylic acid esters, particularly lower alkyl 18-epi-O-lower alkyl-reserpates, such as methyl 18-epi-O-ethyl-reserpate, methyl 18-epi-O-n-propyl-reserpate and the like, or salts, such as the hydrochlorides and the like, thereof, may replace the methyl 18-epi-O-methyl-reserpate hydrochloride in the above examples.

*Example 56*

A mixture of 2.0 g. of methyl 18-O-methylsulfonyl-reserpate, 0.5 g. of N,N,N-triethylamine and 120 ml. of methanol is placed in a pressure flask, which is then flushed with nitrogen and sealed. The mixture is heated on the steam bath for twenty days; the solvents are evaporated under reduced pressure and the residue is taken up in methylene chloride. The organic solution is washed twice with a five percent aqueous solution of sodium carbonate and once with a saturated aqueous sodium chloride solution, then filtered through a diatomaceous earth preparation and evaporated under reduced pressure. The residue is taken up in 25 ml. of hot benzene, the solution is filtered, the filtrate is clarified with charcoal and diluted with 75 ml. of cyclohexane and then cooled. 1.19 g. of crystalline methyl 18-epi-O-methyl-reserpate, M.P. 230–233° precipitates and is collected; the product is identical with the compound obtained according to the procedure of Example 12, $[\alpha]_D^{25} = -37°$ (chloroform).

The starting material may be prepared by adding 2.12 g. of methane sulfonyl chloride and 45 ml. of pyridine to a solution of 6 g. of methyl reserpate in 105 ml. of pyridine while cooling in an ice bath, allowing the mixture to stand at room temperature for three days and diluting it with 750 ml. of a 2.5 percent aqueous sodium hydrogen carbonate solution. The resulting methyl 18-O-methylsulfonyl-reserpate is recrystallized from a mixture of methanol and methylene chloride, M.P. 244–245°; yield: 5.4 g.

*Example 57*

To a solution of 0.5 g. of 18-epi-O-methyl-reserpic acid hydrochloride in a mixture of methanol and methylene chloride is added an excess of diazoethane in diethyl ether while cooling. The reaction mixture is allowed to stand in the cold, a few drops of acetic acid are added to destroy the excess of diazoethane and the solution is evaporated to dryness. The residue is taken up in methylene chloride, the organic solution is washed twice with a five percent aqueous solution of sodium carbonate and once with saturated aqueous sodium chloride, dried and evaporated to dryness to yield the desired ethyl 18-epi-O-methyl-reserpate, M.P. 195–198°, which is identical with the compound obtained according to the procedure of Example 39.

The starting material may be prepared as follows: A mixture of 1.0 g. of methyl 18-epi-O-methyl-resperpate, 14 ml. of 1 N aqueous sodium hydroxide, 43 ml. of methanol and 7.2 ml. of water is refluxed for fifty-five minutes. After standing for an additional hour, the solution is concentrated to a volume of 15 ml., 6 ml. of water is added and the solution is acidified with 2 ml. of concentrated hydrochloric acid. The solution is concentrated while adding ethanol and the aqueous phase is decanted from the resulting oil. Addition of acetone precipitates inorganic material, which is filtered off; the solution is concentrated to a jelly and on addition of a small amount of fresh acetone and while warming, crystallization occurs. The desired 18-epi-O-methyl-reserpic acid hydrochloride monohydrate is filtered off and washed with acetone, M.P. 245–250°; $[\alpha]_D^{26°} = -17°$ (chloroform-methanol); yield: 0.78 g.

What is claimed is:

1. A member selected from the group consisting of a compound of the formula

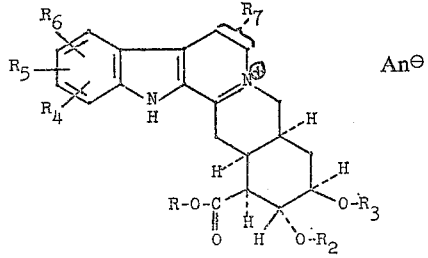

and of the formula:

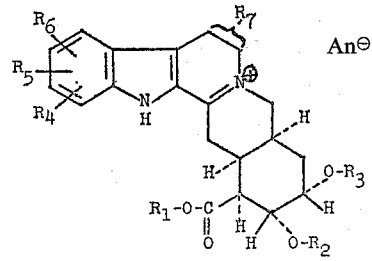

in which $R_1$ is a member selected from the group consisting of lower alkyl, phenyl-lower alkyl, lower alkoxy-lower alkyl and N,N-di-lower alkyl-amino-lower alkyl, $R_2$ stands for a member selected from the group consisting of lower alkoxy and cyano, $R_3$ is a member selected from the group consisting of lower alkyl, lower alkenyl, lower alkynyl, cycloalkyl having from three to eight carbon atoms, cycloalkenyl having from five to six carbon atoms, cycloalkyl-lower alkyl, in which cycloalkyl has from three to eight carbon atoms, phenyl-lower alkyl, hydroxy-lower alkyl, lower alkoxy-lower alkyl, lower alkoxy-carbonyloxy-lower alkyl, lower alkanoyloxy-lower alkyl, halogeno-lower alkyl, lower alkanoyl-lower alkyl, lower alkyl-mercapto-lower alkyl and N,N-di-lower alkyl-amino-lower alkyl, each of the radicals $R_4$, $R_5$, and $R_6$ stands for a member selected from the group consisting of hydrogen, lower alkyl, lower alkoxy, halogeno and lower alkyl-mercapto, and for lower alkylenedioxy representing two of the groups $R_4$, $R_5$ and $R_6$ attached to two adjacent positions and taken together, and $R_7$, attached to one of the position 5 and 6, stands for a member selected from the group consisting of hydrogen and lower alkyl, and in which $An^\ominus$ stands for the anion of an acid.

2. A compound of the formula

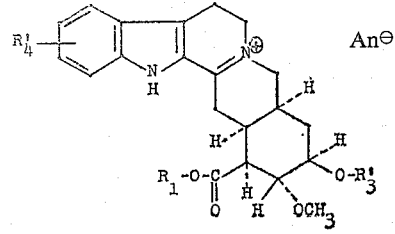

in which each of the group $R_1'$ and $R_3'$ stands for lower alkyl and $R_4'$ is lower alkoxy, and in which $An^\ominus$ is the anion of an acid.

3. A salt of lower alkyl 18-O-lower alkyl-3-dehydro-reserpate with an acid, in which salt the double bond extends from the 3-position to the 4-position.

4. A salt of methyl 18-O-methyl-3-dehydro-reserpate with an acid, in which salt the double bond extends from the 3-position to the 4-position.

5. A compound of the formula

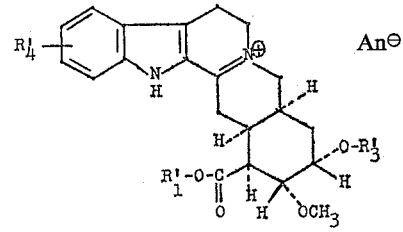

in which each of the group $R_1'$ and $R_3'$ stands for lower alkyl, and $R_4'$ is lower alkoxy, and in which $An^\ominus$ is the anion of an acid.

6. A salt of lower alkyl 18-epi-O-lower alkyl-3-dehydro-reserpate with an acid, in which salt the double bond extends from the 3-position to the 4-position.

7. A salt of methyl 18-O-methyl-3-dehydro-reserpate with an acid, in which salt the double bond extends from the 3-position to the 4-position.

8. A salt of methyl 18-epi-O-n-propyl-3-dehydro- reserpate with an acid, in which salt the double bond extends from the 3-position to the 4-position.

9. A member selected from the group consisting of a compound of the formula:

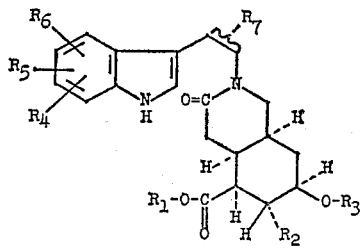

and of the formula:

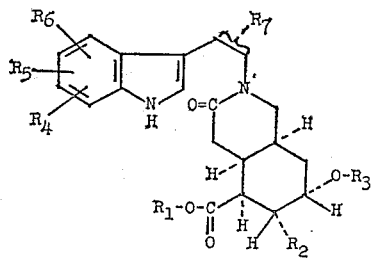

in which $R_1$ is a member of the group consisting of lower alkyl, phenyl-lower alkyl, lower alkoxy-lower alkyl and N,N-di-lower alkyl-amino-lower akyl, $R_2$ stands for a member selected from the group consisting of lower alkoxy and cyano, $R_3$ is a member selected from the group consisting of lower alkyl, lower alkenyl, lower alkynyl, cycloalkyl having from three to eight carbon atoms, cycloalkenyl having from five to six carbon atoms, cycloalkyl-lower alkyl, in which cycloalkyl has from three to eight carbon atoms, phenyl-lower alkyl, hydroxy-lower alkyl, lower alkoxy-lower alkyl, lower alkoxy-carbonyloxy-lower alkyl, lower alkanoyloxy-lower alkyl, halogeno-lower alkyl, lower alkanoyl-lower alky, lower akyl-mercapto-lower alkyl and N,N-di-lower alkyl-amino-lower alkyl, each of the radicals $R_4$, $R_5$ and $R_6$ stands for a member selected from the group consisting of hydrogen, lower alkyl lower alkoxy, halogeno and lower alkyl-mercapto, and for lower alkylenedioxy representing two of the groups $R_4$, $R_5$ and $R_6$ attached to two adjacent positions and taken together, and $R_7$, attached to one of the positions 5 and 6, stands for a member selected from the group consisting of hydrogen and lower alkyl.

10. A compound of the formula:

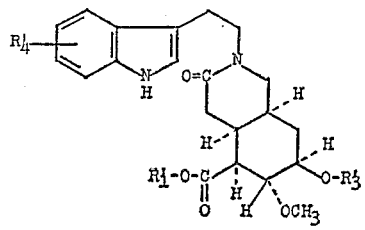

in which each of the groups $R_1'$ and $R_3'$ stands for lower alkyl, and $R_4'$ is lower alkoxy.

11. Lower alkyl 18 - O - lower alkyl-3-oxo-2,3-seco-reserpate.

12. Methyl 18-O-methyl-3-oxo-2,3-seco-reserpate.

13. A compound of the formula:

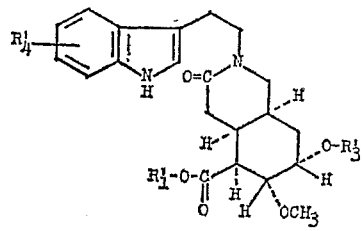

in which each of the groups $R_1'$ and $R_3'$ stands for lower alkyl and $R_4'$ is lower alkoxy.

14. Lower alkyl 18-epi-O-lower alkyl-3-oxo-2,3-seco-reserpate.

15. Methyl 18-epi-O-methyl-3-oxo-2,3-seco-reserpate.

References Cited in the file of this patent

Burwell et al.: Jour. Amer. Chem. Soc., volume 70 (1948), page 878.

Drahowzal et al.: Monatshefte für Chemi, volume 82 (1951), pages 594–599.

Dudley et al.: Jour. Amer. Chem. Soc., volume 73 (1951), page 2987.

Burwell: Jour. Amer. Chem. Soc., volume 74 (1952 pages 1462–1466).

Groggins: Unit Processes in Org. Chem., McGraw-Hill Company, New York (1952), page 656.